United States Patent
Pelosi

(10) Patent No.: US 12,488,222 B1
(45) Date of Patent: Dec. 2, 2025

(54) INTEGER GATE LOGIC (IGL) ARTIFICIAL NEURAL NETWORK WITH PARRALLELIZATION AND INTERNAL VISUALIZATION CAPABILITIES

(71) Applicant: MLIGLON, INC., Clarksville, TX (US)

(72) Inventor: Michael J. Pelosi, Clarksville, TX (US)

(73) Assignee: MLIGLON, Inc., Clarksville, TX (US)

( * ) Notice: Subject to any disclaimer, the term of this patent is extended or adjusted under 35 U.S.C. 154(b) by 0 days.

(21) Appl. No.: 18/985,282

(22) Filed: Dec. 18, 2024

Related U.S. Application Data

(63) Continuation-in-part of application No. 18/776,350, filed on Jul. 18, 2024, now Pat. No. 12,242,946.

(60) Provisional application No. 63/667,022, filed on Jul. 2, 2024.

(51) Int. Cl.
  *G06N 3/0464* (2023.01)
  *G06N 3/0499* (2023.01)

(52) U.S. Cl.
  CPC ......... *G06N 3/0464* (2023.01); *G06N 3/0499* (2023.01)

(58) Field of Classification Search
  CPC ...... G06N 3/0442; G06N 3/063; G06N 3/082; G06N 3/0464; G06N 3/0499
  See application file for complete search history.

(56) References Cited

U.S. PATENT DOCUMENTS

| | | | |
|---|---|---|---|
| 10,228,911 B2 | 3/2019 | Henry et al. | |
| 10,540,588 B2 | 1/2020 | Burger et al. | |
| 10,733,794 B2 | 8/2020 | He et al. | |
| 10,867,247 B1 * | 12/2020 | Teig | G06N 3/084 |
| 10,949,736 B2 | 3/2021 | Deisher et al. | |
| 11,010,516 B2 | 5/2021 | Sikka et al. | |
| 11,315,012 B2 | 4/2022 | Anderson et al. | |
| 11,335,387 B2 | 5/2022 | Shan et al. | |
| 11,386,307 B2 | 7/2022 | Batchelor et al. | |
| 11,669,585 B2 | 6/2023 | del Mundo et al. | |
| 12,026,219 B2 | 7/2024 | Storm et al. | |

(Continued)

OTHER PUBLICATIONS

Choromanska, Anna, et al. "Beyond backprop: Online alternating minimization with auxiliary variables." International Conference on Machine Learning. PMLR, 2019. (Year: 2019).*

(Continued)

*Primary Examiner* — Randall K. Baldwin
(74) *Attorney, Agent, or Firm* — Hall Estill Law Firm

(57) ABSTRACT

Method and apparatus for training an artificial neural network having an input layer, an output layer and at least one intervening hidden layer. A training circuit stores, in a memory, node input and output values and a loss function value at the output layer responsive to input data applied to the input layer. For a selected node, a set of downstream nodes interconnected along a single chain path from the selected node to the output layer are identified. The parameter values of the selected node are adjusted, a new node output value for the selected node is determined, and an updated loss function value at the output layer is generated by feeding forward the new node output value to each of the downstream nodes using chain isolation optimization without backpropagation. Look up tables can be used to eliminate mathematical calculations for the updates to each node.

20 Claims, 30 Drawing Sheets

(56) References Cited

U.S. PATENT DOCUMENTS

| | | |
|---|---|---|
| 12,242,946 B1* | 3/2025 | Pelosi ............... G06N 3/0442 |
| 2016/0003481 A1 | 1/2016 | Taniguchi et al. |
| 2018/0144240 A1 | 5/2018 | Garbin et al. |
| 2019/0114531 A1 | 4/2019 | Torkamani et al. |
| 2019/0332944 A1 | 10/2019 | Bai et al. |
| 2019/0378210 A1 | 12/2019 | Merrill et al. |
| 2020/0097818 A1 | 3/2020 | Li et al. |
| 2020/0364508 A1 | 11/2020 | Gurel et al. |
| 2020/0380369 A1 | 12/2020 | Case et al. |
| 2021/0027147 A1* | 1/2021 | Baker ............... G06N 3/084 |
| 2021/0142177 A1 | 5/2021 | Mallya et al. |
| 2022/0036176 A1 | 2/2022 | Megretski et al. |
| 2022/0284582 A1* | 9/2022 | Yang ............... G06N 3/082 |
| 2023/0237323 A1* | 7/2023 | Mehnert ............... G06N 3/08 706/15 |
| 2024/0005161 A1 | 1/2024 | Baker |
| 2024/0087175 A1* | 3/2024 | Huang ............... G06N 3/0464 |
| 2024/0212328 A1 | 6/2024 | Loo et al. |

OTHER PUBLICATIONS

Tabaza, T. A., et al. "Hysteresis modeling of impact dynamics using artificial neural network." Journal of Mechanics 37 (2021): 333-338. (Year: 2021).*

Cheng, Qi, et al. "A Classfication Algorithm based on Self-organizing Neural Network Using Growing-Combination Structure." 2020 39th Chinese Control Conference (CCC). IEEE, 2020. (Year: 2020).*

Bland, Richard "Learning XOR: Exploring the Space of a Classic Problem" University of Stirling, Department of Computing Science and Mathematics: Computing Science Technical Report, Jun. 1998 https://cs.stir.ac.uk/~kit/techreps/pdf/TR148.pdf.

Lee, Dong-Hyun; Zhang, Saizheng; Fischer, Asja; Bengio, Yoshua "Difference Target Propagation" In: Appice, A., Rodrigues, P., Santos Costa, V., Soares, C., Gama, J., Jorge, A. (eds) Machine Learning and Knowledge Discovery in Databases. ECML PKDD 2015. Lecture Notes in Computer Science(), vol. 9284. Springer, Cham. https://doi.org/10.1007/978-3-319-23528-8_31; Dec. 2014. https://arxiv.org/pdf/1412.7525.

Szegedy, C., et al.; "Going deeper with convolutions" (2014) 12 pages.

Dettmers, Tim "8-Bit Approximations for Parallelism in Deep Learning" International Conference on Learning Representations (ICLR); Nov. 2015. https://arxiv.org/pdf/1511.04561.

Ioffe, S., et al.; "Batch Normalization: Accelerating Deep Network Training by Reducing Internal Covariate Shift"; (2015) 11 pages.

Kingma, D.P., et al.; Adam: A Method for Stochastic Optimization; ICLR Conference (2015) 15 pages.

Jaderberg, Max; Czarnecki, Wojciech Marian; Osindero, Simon; Vinyals, Oriol; Graves, Alex; Silver, David; Kavukcuoglu, Koray "Decoupled Neural Interfaces Using Synthetic Gradients" Proceedings of the 34th International Conference on Machine Learning, Sydney, Australia,PMLR70, 2017; Jul. 3, 2017 https://arxiv.org/pdf/1608.05343.

Wang, G.; "A Novel Neural Network Model Specified for Representing Logical Relations"; (2017) 10 pages.

Yang, J., et al.; "Robustness of classification ability of spiking neural networks"; (2018) 7 pages.

Choromanska, Anna; Cowen, Benjamin; Kumaravel, Sadhana; Luss, Ronny; Rigotti, Mattia; Rish, Irina; Kingsbury, Brian; DiAchille, Paolo; Gurev, Viatcheslav; Tejwani, Ravi; and Bouneffouf, Djallel "Beyond Backprop: Online Alternating Minimization with Auxiliary Variables" Proceedings of the 36th International Conference on Machine Learning, PMLR 97:1193-1202; Jun. 2019. https://arxiv.org/pdf/1806.09077.

Ma, Wan-Duo Kurt; Lewis, J.P.; and Kleijn, W. Bastiaan "The HSIC Bottleneck: Deep Learning Without Back-Propagation" The Thirty-Fourth AAAI Conference on Artificial Intelligence (AAAI-20); Aug. 2019. https://arxiv.org/odf/1908.01580v1.

Zhang, G., et al.; "Which Algorithmic Choices Matter at Which Batch Sizes? Insights From a Noisy Quadratic Model"; (2019) 17 pages.

Xu, Feiyu; Uszkoreit, Hans; Du, Yangzhou; Fan, Wei; Zhao, Dongyan; and Zhu, Jun "Explainable AI: A Brief Survey on History Research Areas, Approaches and Challenges" In: Tang, J., Kan, My., Zhao, D., Li, S., Zan, H. (eds) Natural Language Processing and Chinese Computing. NLPCC 2019. Lecture Notes in Computer Science, vol. 11839. Springer, Cham. https://doi.org/10.1007/978-3-030-32236-6_51 https://www.researchgate.net/publication/336131051_Explainable_AI_A_Brief_Survey_on_History_Research_Areas_Approaches_and_Challenges.

Chen, T., et al.; "A Simple Framework for Contrastive Learning of Visual Representations"; (2020) 20 pages.

Wu, Y., et al.; "Autoformalization with Large Language Models"; (2022) 44 pages.

Wu, Y., et al.; "Memorizing Transformers"; ICLR (2022) 19 pages.

Ahmad, N.; "Correlations Are Ruining Your Gradient Descent"; (2024) 13 pages.

Crulis, B., et al.; "An experimental comparative study of backpropagation and alternatives for training binary neural networks for image classification"; (2024) 17 pages.

Pal, D., et al.; "Modeling Linear and Non-linear Layers: An MILP Approach Towards Finding Differential and Impossible Differential Propagations"; (2024) 42 pages.

Pirillo, A., et al.; "NITRO-D: Native Integer-only Training of Deep Convolutional Neural Networks"; (2024) 15 pages.

Terres-Escudero, E.B., et al.; "On the Robustness of Fully-Spiking Neural Networks in Open-World Scenarios using Forward-Only Learning Algorithms"; (2024) 25 pages.

Triantafyllou, N., et al.; "Deep learning enhanced mixed integer optimization: Learning to reduce model dimensionality"; Department of Chemical Engineering, Imperial College London (2024) 47 pages.

PCT/US2025/012793; "International Search Report and Written Opinion"; mailed Apr. 4, 2025; 14 pages.

* cited by examiner

Existing Art

Existing Art

NORMALIZED* GATE LOGIC EMULATION SETTINGS

| GATE TYPE | BIAS (B) | WEIGHT (W1) | WEIGHT (W2) |
|---|---|---|---|
| NULL (ALWAYS OFF) | 0 | 0 | 0 |
| NOR | 1 | -1 | -1 |
| XA | 0 | 1 | -1 |
| XB | 0 | -1 | 1 |
| AND | -1 | 1 | 1 |
| NOTB | 1 | 0 | -1 |
| XOR | 0 | 1 | 1 |
| B | 0 | 0 | 1 |
| NOTA | 1 | -1 | 0 |
| A | 0 | 1 | 0 |
| NXOR | 1 | 1 | 1 |
| NAND | 3 | -2 | -2 |
| OR | -1 | 2 | 2 |
| NXB | 1 | 2 | -2 |
| NXA | 1 | -2 | 2 |
| ALL (ALWAYS ON) | 1 | 0 | 0 |
| WEIGHTED SUM | 0 | 0.5 | 0.5 |

* ALL VALUES ARE MULTIPLIED BY P

NON-DIFFERENTIABLE LINEAR LOGIC OFFSET ACTIVATION FUNCTION

NODE PRUNING SEQUENCE

BATCH LEARNING SCHEDULING

| LAYER | SIZE | TOTAL NODES |
|---|---|---|
| LAYER 1 (INPUT) | 112 X 56 | 6272 |
| LAYER 2 | 56 X 56 | 3136 |
| LAYER 3 | 56 X 28 | 1568 |
| LAYER 4 | 28 X 28 | 784 |
| LAYER 5 | 28 X 14 | 392 |
| LAYER 6 | 14 X 14 | 196 |
| LAYER 7 | 14 X 8 | 112 |
| LAYER 8 | 8 X 8 | 64 |
| LAYER 9 | 8 X 4 | 32 |
| LAYER 10 | 4 X 4 | 16 |
| LAYER 11 | 4 X 2 | 8 |
| LAYER 12 | 2 X 2 | 4 |
| LAYER 13 | 2 X 1 | 2 |
| LAYER 14 | 1 X 1 | 1 |
| | TOTAL NODES | 12,587 |

CURVE POINT (CVPT) PROCESSING

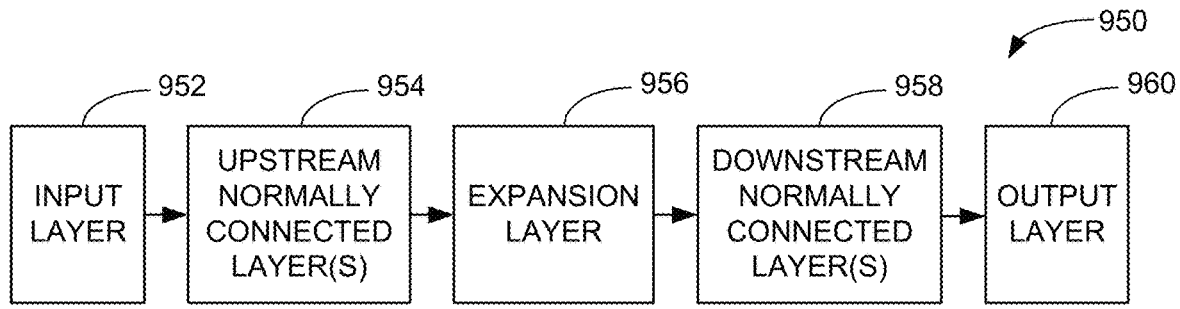
FIG. 46
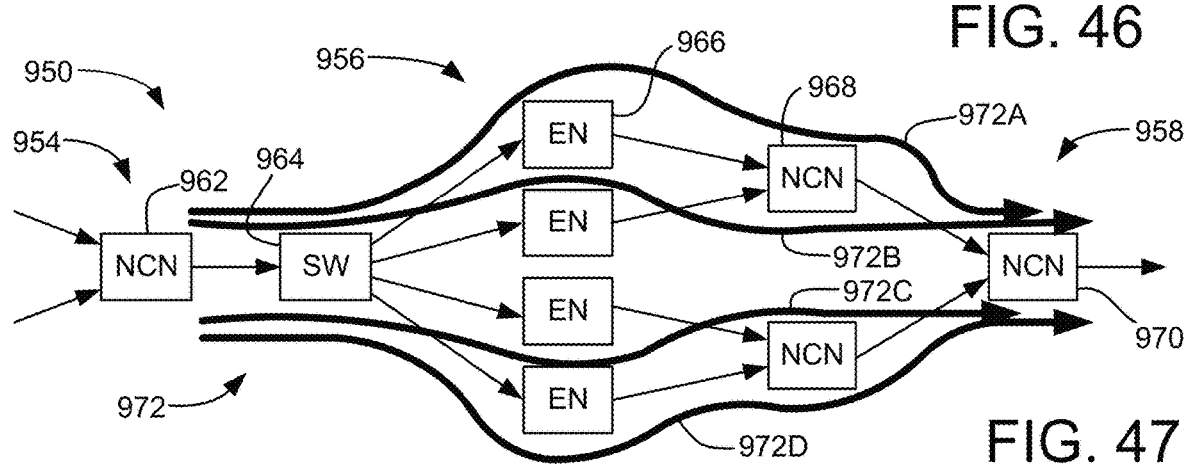
FIG. 47
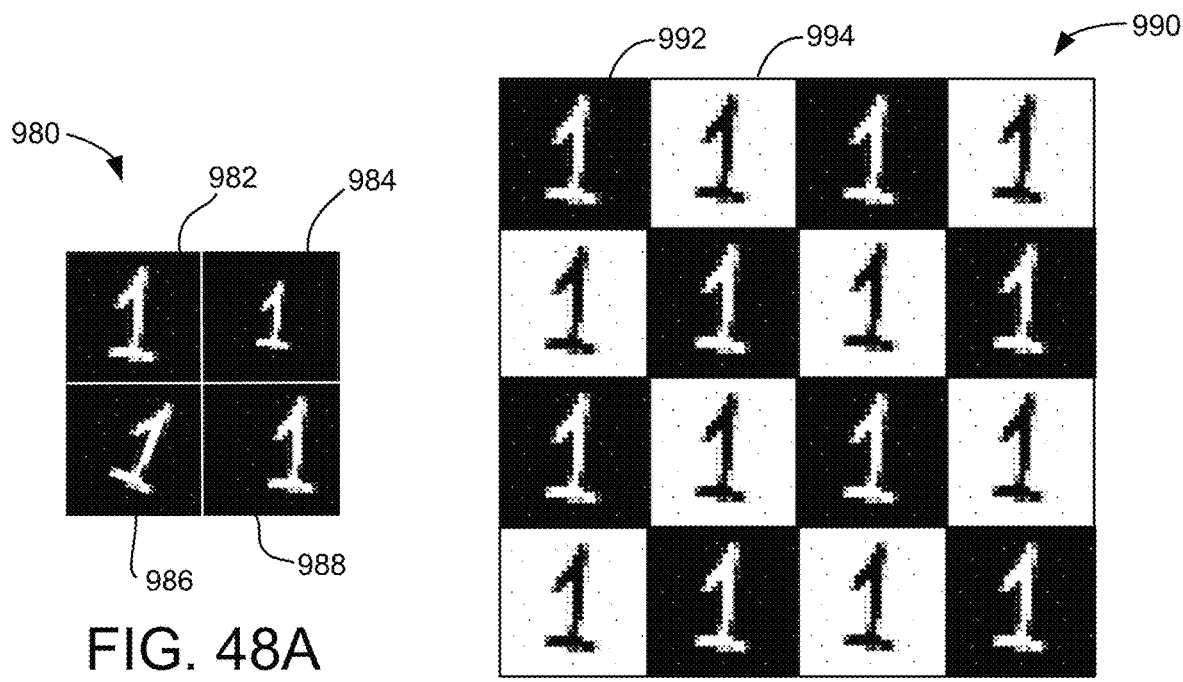
FIG. 48A
FIG. 48B

INTEGER GATE LOGIC (IGL) ARTIFICIAL NEURAL NETWORK WITH PARRALLELIZATION AND INTERNAL VISUALIZATION CAPABILITIES

RELATED APPLICATIONS

The present application is a continuation-in-part of U.S. Pat. No. 12,242,946 issued Mar. 4, 2025, and makes a claim of domestic priority to U.S. Provisional Patent Application No. 63/667,022 filed Jul. 2, 2024. The contents of both of these references are hereby incorporated by reference.

BACKGROUND

The so-called backpropagation ("backward propagation of errors") algorithm, as utilized for machine learning (ML) in the context of artificial intelligence (AI), has remained largely unchanged in implementation for the past 50 years. Backpropagation is a technique used to train a feedforward Artificial Neural Network (ANN) in which the gradient of an observed loss function (error) with respect to the weights of the network is estimated. The weights are incrementally adjusted in an effort to reduce the observed error.

While a variety of backpropagation techniques have been proposed, most involve the calculation or estimation of partial derivatives using the so-called chain rule via gradient descent beginning at the output and working backwards through the network. The technique operates in a recursive fashion in an attempt to solve for the optimum weights in the system that minimize the loss function.

Backpropagation is computationally complex and requires significant memory, computing, and energy resources, as well as specialized and often expensive hardware (e.g., GPUs, TPUs, supercomputers, etc.) for large models. With the advent of deep learning and other advanced techniques that potentially require billions or more nodes and tens or hundreds of layers or more, backpropagation will likely continue to be a limiting factor in efficient ANN design, training and operation.

SUMMARY

Various embodiments of the present disclosure are generally directed to an apparatus and method for implementing an artificial neural network (ANN) that can be trained without the need for backpropagation or other complex calculations.

Without limitation, some embodiments provide the ANN with an input layer, an output layer and at least one intervening hidden layer. A training circuit stores, in a memory, node input and output values and a loss function value at the output layer responsive to input data applied to the input layer. For a selected node, a set of downstream nodes interconnected along a single chain path from the selected node to the output layer are identified. The parameter values of the selected node are adjusted, a new node output value for the selected node is determined, and an updated loss function value at the output layer is generated by feeding forward the new node output value to each of the downstream nodes using chain isolation optimization without backpropagation. Look up tables can be used to eliminate mathematical calculations for the updates to each node.

These and other features and advantages of various embodiments can be understood from a review of the following detailed description in conjunction with the accompanying drawings.

BRIEF DESCRIPTION OF DRAWINGS

FIG. 46 shows a functional block representation of another IGL-ANN having one or more expansion layers in accordance with further embodiments.

FIG. 47 shows aspects of the IGL-ANN of FIG. 46 in greater detail.

FIGS. 48A and 48B show pre-processing that can be provided to training samples supplied to an IGL-ANN in further embodiments.

DETAILED DISCUSSION

Figure 1:
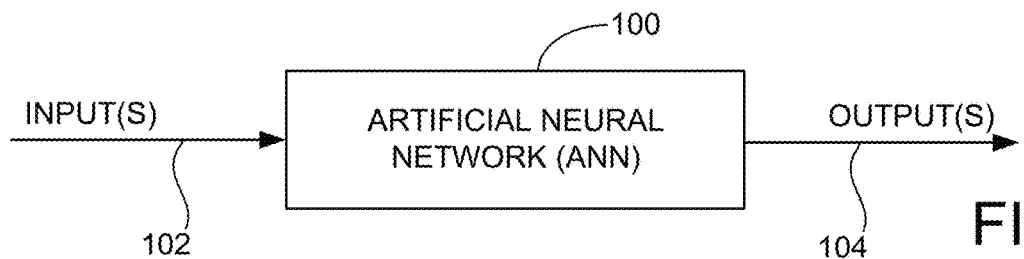
FIG. 1 is a simplified functional block representation of an Artificial Neural Network (ANN) in accordance with the existing art.

Various embodiments of the present disclosure are generally directed to systems and methods for efficiently training a specially configured Artificial Neural Network (ANN) without the need for backpropagation to minimize loss function (error).

As explained below, some embodiments configure the ANN as an array of integer gate logic (IGL) nodes in multiple layers. Each IGL node has multiple inputs, such as two, and a single output which is connected to a downstream node in the array. Each node has a number of parameters including weight (W) values for each input, a bias (B) value, and a globally selected constant precision (CP) value.

Each node further has a non-linear activation function. While not necessarily limiting, in at least some cases the non-linear activation function, sometimes referred to herein as a Linear Logic Output (LLO) activation function (AF), is non-differentiable and has one or more local minimum and/or local maximum points apart from the origin.

During processing, a weighted sum (WS) is calculated responsive to the W, B and CP values, and the WS is supplied to the LLO-AF to generate the node output. Because the output is only supplied to one downstream node in the array, a chain isolation optimization technique can be efficiently carried out to adjust the parameters of each node in turn. Generally, the only nodes in the array that will be affected by the parametric adjustments are those nodes in a chain line from the associated output node to the selected node undergoing adjustment. Hence, adjustments can be quickly recalculated for each of the chain line nodes to determine the effect of the new parametric values upon the error term.

Empirical tests carried out to date with standardized test sets (such as the MNIST database) show significant reductions in training time, often by many multiple orders of magnitude, over existing ANN configurations. Because the system can model a variety of difficult to implement Boolean logic gates (e.g., XOR, NAND, NOR, etc.) based on the parametric values, certain difficult to train functions, such as XOR, can be quickly converged with up to 100% accuracy (0% output error). Integer arguments and values eliminate the need for floating point calculations while maintaining substantially any desired level of precision. The boundaries set up for the novel LLO-AFs further ensure that saturation and vanishing/exploding gradients are substantially avoided.

The IGL nodes are suitable for implementation as or with any number of network configurations including fully connected nodes, multi-layer perceptron (MLP) nodes (but with only one connection per node downstream), convolutional neural networks (CNNs), recursive networks (RNNs) including modified LSTM (long/short term memory) neural networks, etc. Moreover, the IGL-ANN can be appended to or inserted into as a separate operational block within the context of a larger more conventional network to provide localized optimization while still permitting operation of the existing network. Any amount of dimensionality can be processed including 1D, 2D, 3D, 4D, up to n-dimensions.

When implemented in software, the system is embarrassingly parallel and can readily be adapted for parallelization at both the network level and the node level. Other techniques are disclosed herein that further promote efficient training including an enhanced error function, intelligent test data pruning, batch learning scheduling, parallel processing, and a network modeling and visualization software tool.

Because the system uses integer math, further improvements in operational performance can be achieved by pre-calculating all possible output values from each node in one or more look up tables, and using memory cell accesses instead of calculations to evaluate parametric updates. This capability further provides orders of magnitude improvements in the speed at which models can be trained and operated as compared to existing solutions.

The system has demonstrated the ability to achieve error convergence rates that are significantly improved over existing systems that rely upon backpropagation and other gradient descent based approaches. It is contemplated that the system can accommodate any number of total layers, including hundreds or thousands of layers, while providing an effective, non-backpropagation based training methodology.

The system uses significantly less energy, generates less heat, and provides better overall performance than existing solutions. In short, the IGL is a fundamentally new and improved architecture for ANNs that far more closely models biological processing. The system provides both explainable AI and hallucination resolution capabilities. ML designers can watch in real time the internal workings of the network and make surgical manipulations at the individual node level.

In order to describe these and other features and advantages of various embodiments of the present disclosure, it will be helpful to briefly discuss ANNs of the existing art.

Existing Art ANNs

FIG. 1 is a simplified representation of an ANN 100 in accordance with the existing art. As with substantially all ANNs, a series of inputs 102 are supplied, and corresponding outputs 104 are generated in response. To initially configure the system, training data with known outputs are supplied to the ANN during a training (learning) phase, and the system uses backpropagation or similar gradient based techniques to reduce the output error.

The ANN 100 can take any number of suitable forms including as a Multi-Layer Perceptron (MLP) network, a Feedforward Neural Network (FNN), a Convolutional Neural Network (CNN), a Recurrent Neural Network (RNN), a Long Short-Term Memory (LSTM) network, a Radial Basis Function (RBF) network, etc.

Figure 2:
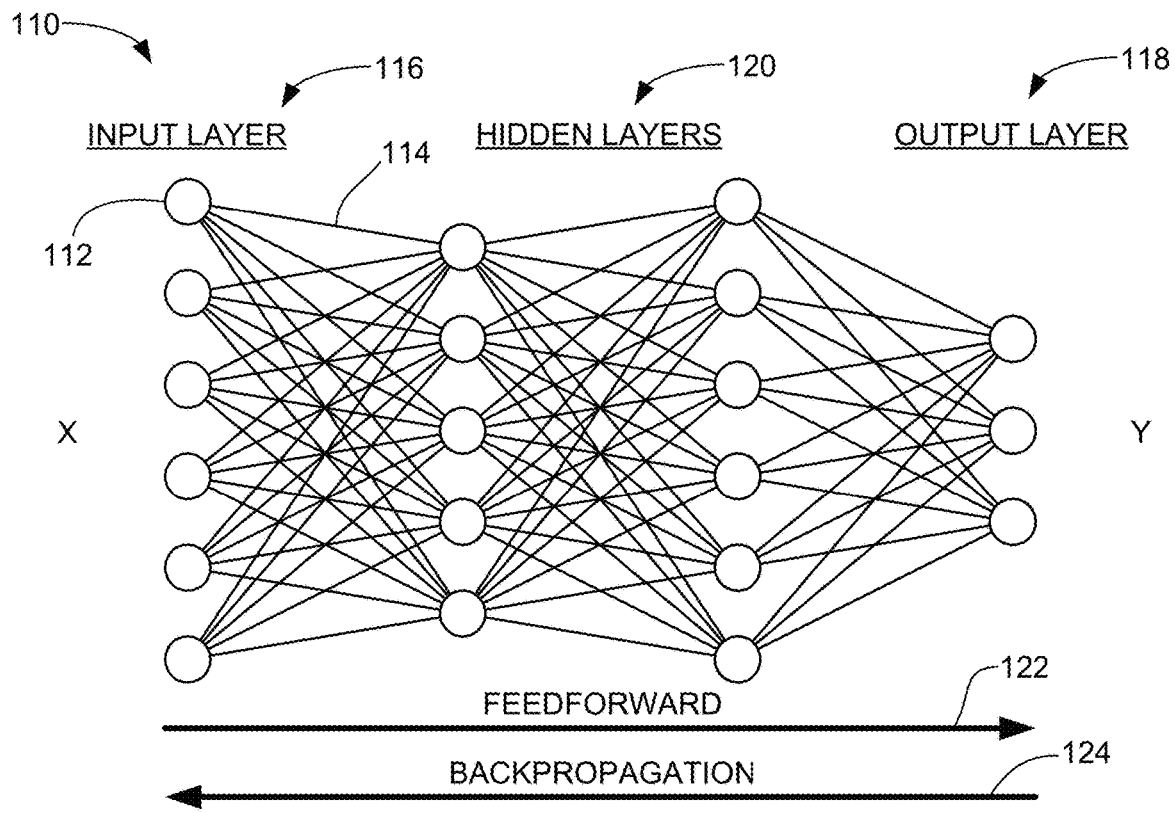
FIG. 2 shows an exemplary interconnection configuration of the ANN of FIG. 1 as a multilayer perceptron (MLP) array in accordance with the existing art.

FIG. 2 shows a representation of an ANN 110 corresponding to the ANN 100 in FIG. 1 with a fully-connected MLP configuration. Other configurations can be used. In FIG. 2, nodes 112 are interconnected via interconnections 114 among a succession of layers. These layers include an input layer 116, an output layer 118 and a number of intermediate (hidden) layers 120 (in this case, two). The respective numbers of layers, and the numbers of nodes in each layer, can vary based on the design constraints, hardware limitations, operational requirements, etc. of the system. As is conventional, the variable X represents the input which is supplied to the various nodes of the input layer 116, and the variable Y represents the output which is supplied to the various nodes of the output layer 118. The number of output nodes will depend on the configuration of the system, and so can be a single node or an array of nodes.

Training ANNs such as the ANN 110 in FIG. 2 usually involves a two step process: first, a feedforward operation takes place, as represented by arrow 122, in which test data (X) are supplied as inputs to the system. Various internal parametric values, such as weights and biases, are initially set to some suitable levels (including random settings) and an initial estimated output value (Y) is generated based on these initial settings.

Second, a backpropagation operation takes place, as represented by arrow 124. The backpropagation operation uses gradient descent to reduce the error by calculating the partial derivatives of each activation function of each node along each path through the network from the output layer 118 to the input layer 116 over a succession of intervals. The weights are adjusted in a direction indicated by the derivatives to minimize the overall error.

As noted above, backpropagation can require significant time and resources, is computationally complex, and has limited effectiveness, particularly for higher level (deep learning) networks. Vanishing gradients, exploding gradients and saturation effects can cause a loss of error reduction effectiveness, further operating as an upper bound on the ability to reduce loss function error.

A particular limitation with backpropagation trained networks is the inability to easily model certain types of input data. For example, the so-called exclusive-OR (XOR) Boolean logic function is known to be particularly difficult to implement in a traditional ANN. As will be recognized, an XOR function operates in accordance with the logic states of Table 1:

TABLE 1

| Input A | Input B | Output |
|---------|---------|--------|
| 0 | 0 | 0 |
| 0 | 1 | 1 |
| 1 | 0 | 1 |
| 1 | 1 | 0 |

In an XOR operation, if either input is high (e.g., logical "1"), then the output is also high. However, if both inputs are high, or low, then the output is low. In a more general sense, XOR provides a "detect if either is present, but not both" operation.

From an ANN standpoint, an XOR function within the network can generally be viewed as attempting to train the network to provide a positive detection if a certain feature is present in the input data stream, unless another feature is also present in the input data stream as well, in which case a negative detection is provided. It is well established in the literature that training a traditional ANN to accurately and reliably implement the equivalent operation of an XOR function is exceedingly difficult. It may be possible in some cases to train a node or a small set of nodes to operate as an XOR, but the global adjustments made during backpropagation make this difficult to establish and maintain in a large network. Other exclusionary Boolean logic functions, such as NAND, NXOR, etc., are difficult to train for similar reasons.

Integer Gate Logic ANNs

Figure 3:
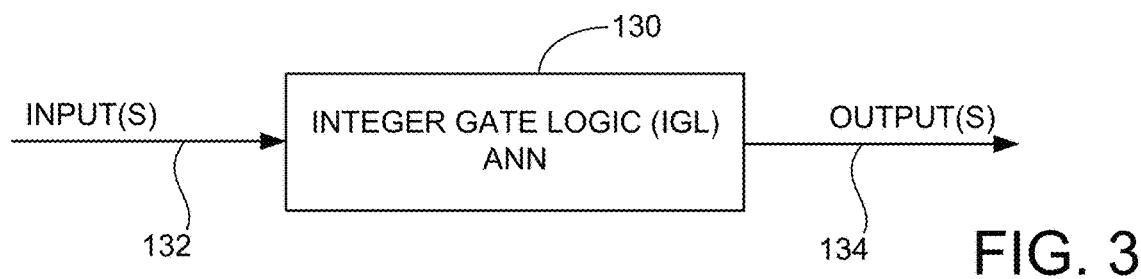
FIG. 3 is a corresponding simplified functional block representation of an Integer Gate Logic (IGL) ANN constructed and operated in accordance with various embodiments of the present disclosure.

FIG. 3 is a functional block representation of a specially configured ANN 130 constructed and operated in accordance with various embodiments of the present disclosure. The ANN 130 is referred to as an Integer Gate Logic ANN, or IGL-ANN, and provides efficient training without the limitations associated with existing backpropagation and other techniques. Indeed, the IGL-ANN eliminates the need for backpropagation entirely in favor of a significantly faster and more robust training approach.

The IGL-ANN 130 otherwise operates in a manner similar to the existing art ANNs 100, 110 described above, and can be configured to carry out substantially any of the above described operations of the conventional ANNs (e.g., classification, pattern detection, content generation, LLM capabilities, etc.). To this end, the IGL-ANN operates to receive input data 132 and generate estimated output data 134 after a suitable non-gradient descent based training operation described below.

Figure 4:
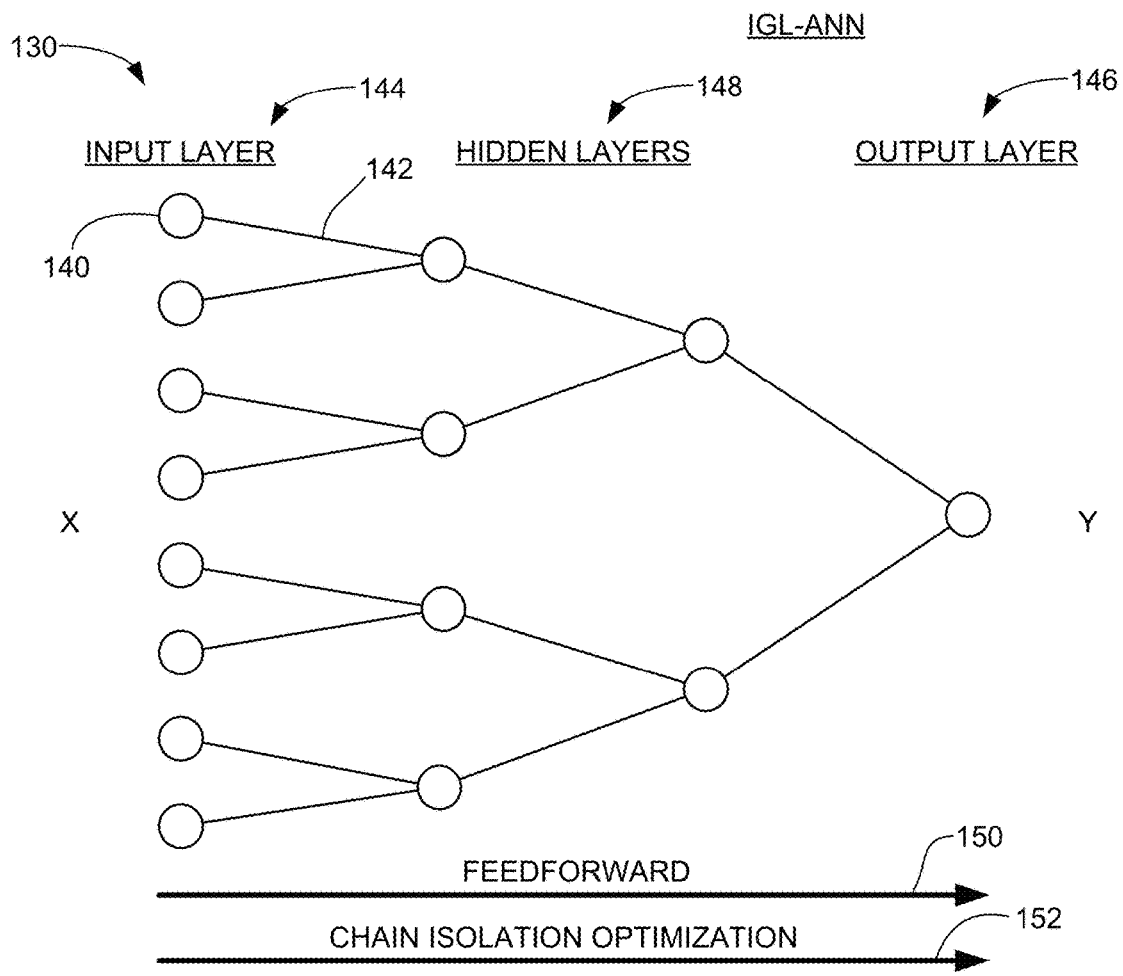
FIG. 4 is an exemplary interconnection configuration of the IGL-ANN of FIG. 3 in accordance with some embodiments.

FIG. 4 is a schematic representation of another IGL-ANN 140 similar to the IGL-ANN 130 of FIG. 3. As with the conventional ANN of FIG. 2, the IGL-ANN 130 is formed as an array of nodes 140 (referred to herein as IGL nodes) with associated interconnections 142. The nodes 140 are arranged into multiple layers, including an input layer 144, an output layer 146 and multiple (in this case, two) hidden layers 148.

Initially, it will be noted that each node 140 is connected to a single downstream node, and each node, apart from the input layer nodes in layer 144, has a total of two inputs. This is a particularly useful configuration, but other arrangements are contemplated as discussed below. While the network converges to a single output node (Y), other output layer configurations can be used so that any number of output nodes can be provided in the output layer. Nevertheless, because each node is shown to be connected to only one downstream node, the network tends to converge rapidly.

Arrow 150 depicts a feedforward operation in which input (X) data are input to the input layer 144, and estimated output (Y) data are generated in the output layer 146 based on various parametric values of the nodes 140. Arrow 152 depicts a follow up chain isolation optimization operation, in which error in the resulting output is minimized. Prior to describing the chain isolation optimization, however, it will be helpful to provide additional details regarding the individual nodes 140.

Figure 5:
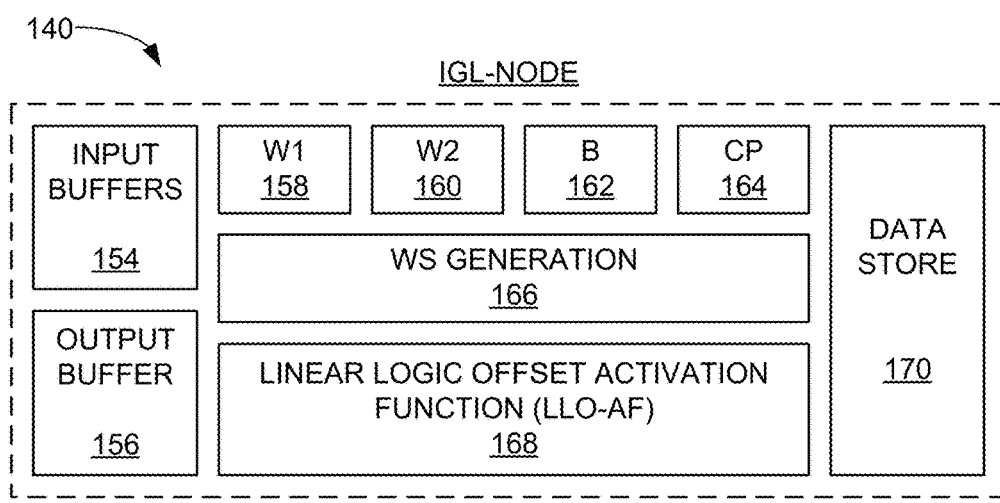
FIG. 5 is a functional block representation of each IGL node in the IGL-ANN of FIGS. 3 and 4 in some embodiments.

To this end, FIG. 5 is a graphical representation of a selected IGL node 140 from FIG. 4 in some embodiments. The node 140 can be realized in hardware (e.g., gate logic and other hardware components), in software, in firmware, or a combination of the same. From an operational standpoint, the exemplary node 140 includes a set of input buffers 154 to receive the input values from the upstream nodes in the array (or, a single value if the node is in the input layer). In this example, the node 140 receives a total of two inputs, referred to herein as X1 and X2, and these values are temporarily stored in the buffer 154.

An output buffer 156 similarly stores the output value, denoted herein as Y1 or simply Y (for selected node N=1), for transmission downstream to the next node in the array.

Various parameters utilized by the node 140 include a first weight (W1) 158, a second weight (W2) 160, a bias (B) 162, and a global precision (granularity) value referred to as CP 164 (constant precision). It is contemplated that the CP value (and its inverse P) are globally set and applied to all nodes in the array equally, as explained more fully below. It will be appreciated that the various values in blocks 158-164 are set as needed based on the configuration of the node (e.g., hardware, software, etc.).

A weighted sum (WS) is generated by block 166 based on the inputs X1, X2 and the parameters W1, W2, B and CP. A linear logic offset activation function (LLO-AF) block 168 provides a non-linear transformation of the WS to generate the output value Y1 as explained below. A data store 170 comprises local or accessible global memory for previous values and other control information used during the operation of the node 140.

Figure 6:
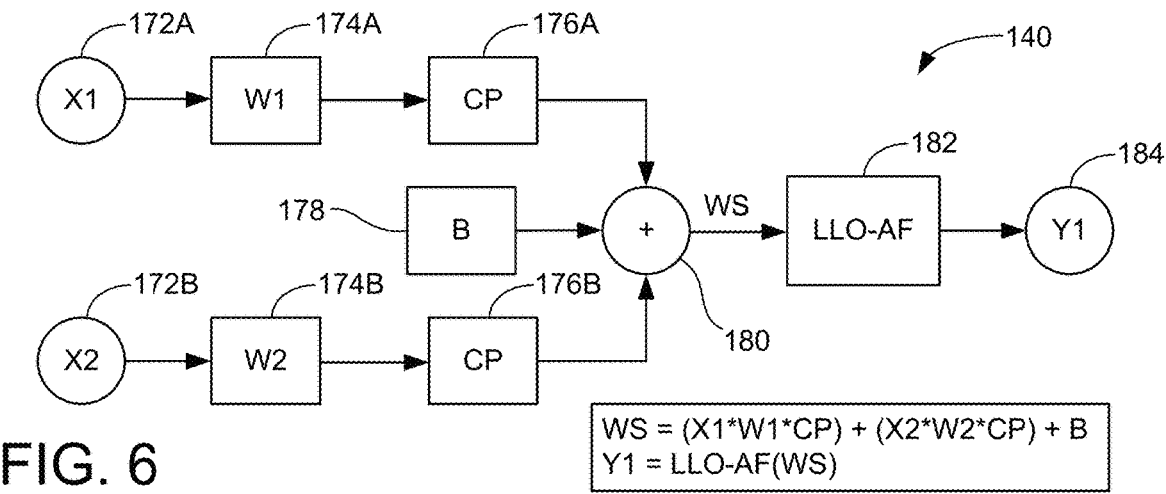
FIG. 6 is a logic diagram representation of the IGL node of FIG. 5 in some embodiments.

FIG. 6 provides a schematic representation of the node 140 from FIG. 5. The weighted sum value WS may be given by:

$$WS=(X1*W1*CP)+(X2*W2*CP)+B \qquad (1)$$

Which is output by summing block 180 based on the operation of register blocks 172A/172B and scalar blocks 174A/174B and 176A/176B. The bias (B) is supplied by scalar block 178; in alternative arrangements, a base input value (such as a normalized logical 1) is multiplied by a biasing weight (BW) to apply the desired bias value B.

The output WS is next applied to the LLO-AF as shown by block 182 to generate the output Y1, as:

$$Y1=LLO-AF(WS) \qquad (2)$$

where Y1 is a function of WS. The function LLO-AF of block 182 is graphically represented by curve 200 in FIG. 7. Other activation function configurations can be used so that the curve 200 is merely exemplary and is not limiting. The curve 200 is formed of discrete segments 200A, 200B, 200C, 200D and 200E which are plotted against a horizontal axis 202 and a vertical axis 204 with normalized values P.

It will be noted that the curve 200 is non-differentiable due to the localized minimum at 2P on the horizontal axis 202 providing a discontinuous gradient effect (e.g., the gradient decreases from 3P to 2P, but increases from 2P to P, etc.). While it is contemplated that a differentiable curve may be alternatively used with a more continuous gradient, such is unnecessary, and in some cases may be detrimental to the efficient convergence of the system.

As noted above, the node 140 performs the various calculations shown in FIG. 6 and equations (1) and (2) using integer based calculations; that is, no floating point decimal calculations are needed or desired in at least most embodiments. Besides simplifying the complexity of the calculations by eliminating the additional overhead and circuit complexity of supporting floating point (decimal) calculations, the use of integer based calculations, as normalized by the use of the value P, also serves to advantageously reduce or eliminate the problems of vanishing gradient and saturation effects. Having said that, the system can be operated efficiently with the use of floating point calculations, and such implementations are contemplated as being within the scope of this disclosure as well.

To accommodate these integer math calculations, the value P represents the precision of the system. The precision P is a selectable value to accommodate the desired granularity in the data while maintaining the use of integer math. The value CP, which was introduced above in FIGS. 5-6, is more particularly a precision multiplier constant, or the inverse of P (e.g., CP=1/P). Stated another way, P can be viewed as representing the total number of incremental values that are available between the rail values of 0 and P, and CP represents the corresponding amount of distance from one increment to the next over this range.

Table 2 shows various example values for P and CP based on orders of 10:

TABLE 2

| Precision (P) | Increment (CP = 1/P) |
| --- | --- |
| 100 | 0.01 |
| 1000 | 0.001 |
| 10,000 | 0.0001 |
| 1,000,000 | 0.000001 |
| 10,000,000 | 0.0000001 |
| ... | ... |

While orders of 10 are shown, other orders of magnitude can be selected as desired. In some cases, using P values that are orders of 2 (e.g., 4096, 32,768, etc.) as the precision levels may be useful in expediting calculations.

Returning to FIG. 7, it can now be seen that for a given P value (for example, P=1,000,000), then there are 1,000,000 points or levels between 0 and P for segments 200A, 200B and 200C in curve 200. The corresponding CP (increment) value is 0.000001 along these segments. Other values of P will provide different resolution levels. Without limitation, in some embodiments 32 bit integer values are used, although other sizes may be appropriate for a given implementation.

Table 3 shows the application of the activation function LLO-AF by block 182 in FIG. 6 to the weighted sum WS values obtained from block 180 in FIG. 6. The function is applied in the form of a series of five (5) conditional statements corresponding to the five segments 200A through 200E:

TABLE 3

| WS Value: | Output Y1 Value: |
| --- | --- |
| (1) If WS < 0 | 0 |
| (2) If WS is between 0 to P | WS |
| (3) If WS is between P and 2 P | P − (WS − P) |
| (4) If WS is between 2 P and 3 P | WS − 2 P |
| (5) If WS > 3 P | P |

The adjoining nature of the various segments 200A through 200E means that the boundary conditions are continuously resolved (e.g., if WS is exactly equal to P, then Y1=WS regardless whether condition (2) or condition (3) is applied). It does not matter what the absolute magnitude of P is selected to be: whether P=100 or P=10,000,000,000, the above logic from Table 3 will provide efficient application of the LLO activation function LLO-AF.

Figure 7:
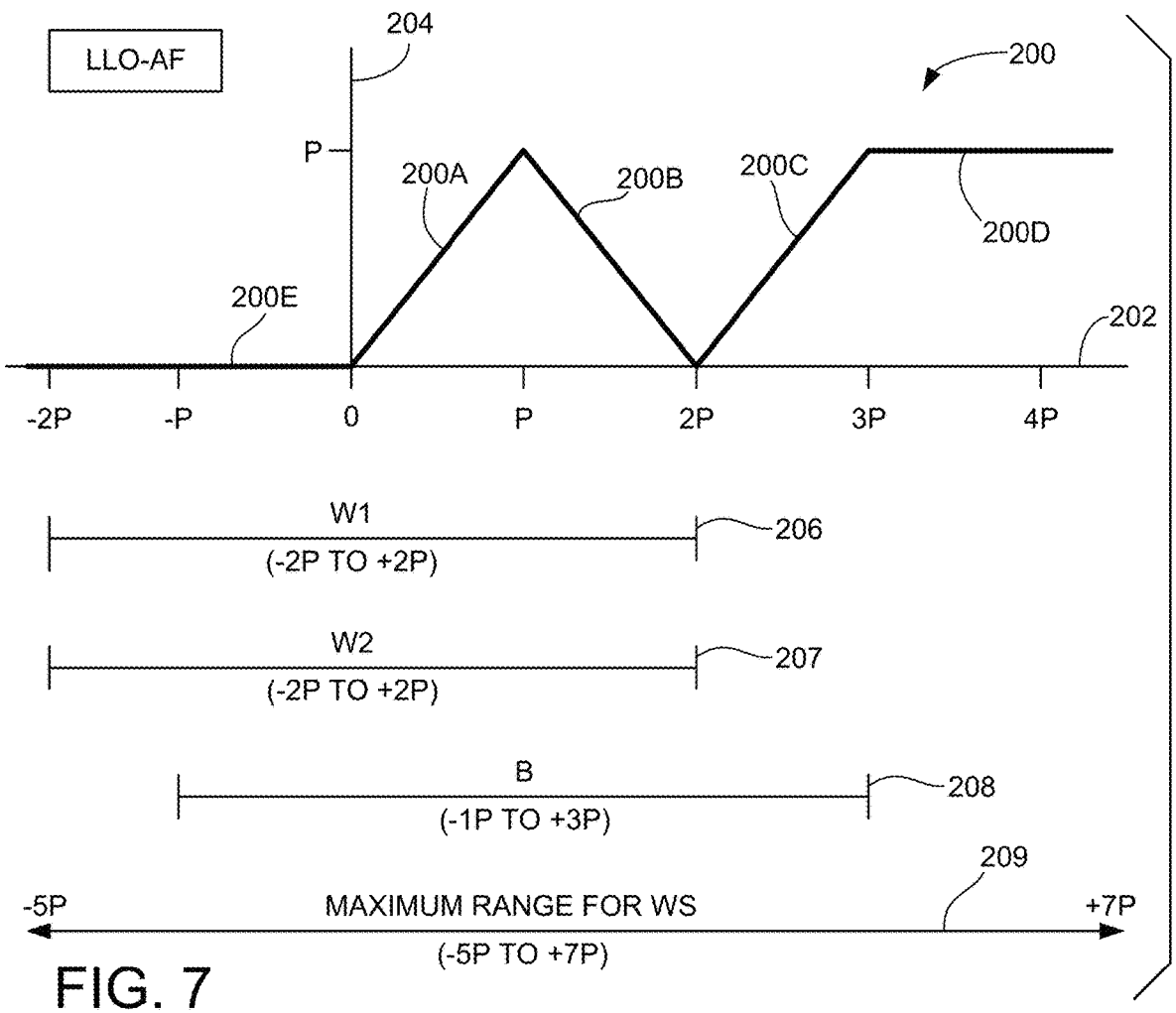
FIG. 7 is a graphical representation of a linear logic output (LLO) activation function of FIG. 6 in some embodiments.

The ranges for the weights W1 and W2, the bias B, and the weighted sum WS are graphically represented in FIG. 7 by ranges 206, 207, 208 and 209 which extend along the horizontal axis 202. The minimum (Min) and maximum (Max) values for W1, W2, B and WS, and the corresponding output value Y1, are also listed in Table 4:

TABLE 4

| Parameter | Minimum Value | Maximum Value |
| --- | --- | --- |
| W1 | −2 P | +2 P |
| W2 | −2 P | +2 P |
| B | −P | +3 P |
| WS | −5 P | +7 P |
| Y1 (Output) | 0 | P |

The magnitude of the output Y1 corresponds to the height of the function along the horizontal axis 204, and hence, will be bounded by 0 to P as dictated by the value of WS. The maximum output of each node will thus be restricted to a positive integer value between 0 and P, inclusive.

The LLO activation function as disclosed herein is a novel application that allows a single node to model all 2-input 1-output digital Boolean logic functions, as well as multitudes (e.g., thousands, millions, more) of interpolated functions, based on the selected precision (P) and selected parameters (B, W1, W2). This functionality includes the ability to model particularly difficult Boolean functions, including but not limited to XOR, NOR, NAND, etc. The parameter settings for (B, W1, W2) to implement 16 standard Boolean functions, as well as NULL and ALL functions, are provided by a gate logic configuration table in FIG. 7A. For simplicity of illustration, the values in the table are normalized; that is, during implementation, each parameter value (B, W1, W2) is multiplied by the precision value P. As can be seen from the respective bias and weight values in the table, the functions labeled as NXA, NXB correspond to Boolean implication functions, and the functions labeled as XA, XB correspond to Boolean inhibition functions.

Figures 7A, 8A:
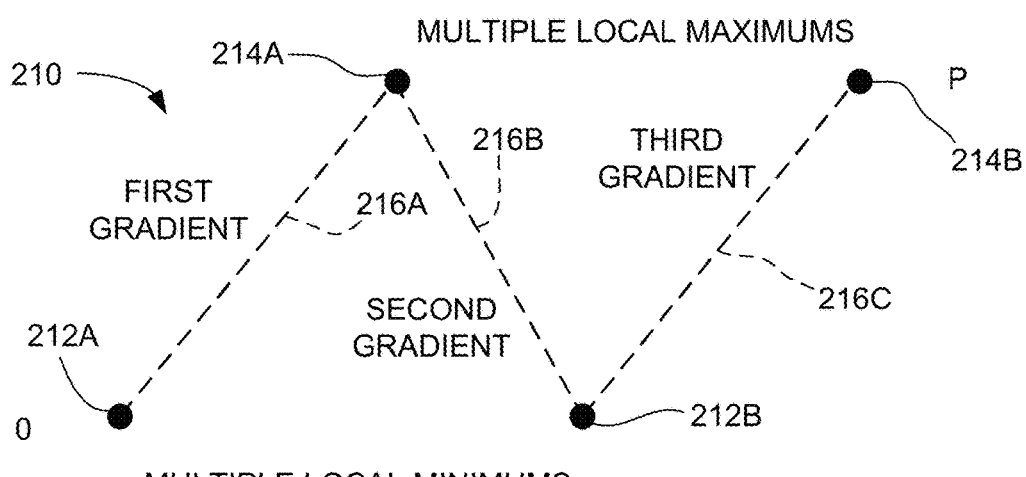
FIG. 7A is a table of normalized gate logic emulation settings that can be implemented by the node of FIG. 5 in some embodiments.
FIGS. 8A, 8B and 8C graphically depict alternative non-differentiable LLO activation functions that can be utilized in accordance with further embodiments.

From the table in FIG. 7A, a particular node may be configured as an XOR functional node using nominal parameter settings of (0, 1P, 1P). If P is set equal to 1,000,000 (1M), then the implemented values are (0, 1M, 1M). A NAND functional node may be set using (3P, −2P, −2P), and so on. As noted above, it has been found exceedingly difficult in many existing ANN configurations that use backpropagation training techniques to be able to accurately implement such functions across the network.

The nodes can further be configured as "near-Boolean" nodes. For example, a particular node may be made a "near-XOR" node with values that are close to (0, 1P, 1P), such as settings of (0.01(P), 0.9946(P), 1.10827(P))=(10,000, 994,600, 1,108,270) where P=1M. A near-XOR node with these settings (or similar settings) would largely operate to provide an XOR response to the input values, but with precisely tuned behavior not present in a straight XOR node configuration with parameters (0, 1M, 1M). As such, the nodes may be viewed as having analog gate logic capabilities, which significantly enhances the training capabilities of the network.

Among the various configurations shown in FIG. 7A, a basic weighted sum mode can be used with settings for (B, W1, W2) of (0, 0.5P, 0.5P). This enables the node to substantially behave like a traditional ANN node in addition to these other logic gate capabilities. Of course, a number of other, non-logic gate configurations are available as well over the full range of the various parameters as shown in FIG. 7 and Table 3, such as (2.5P, 1.7P, −1.4P), etc. Nodes with these and other parametric configurations are sometimes referred to herein as having an unknown function.

The ability to accommodate and model this full range of Boolean functions, as well as near-Boolean functions and unknown functions, is facilitated by the use of a non-differentiable linear logic offset activation function (ND-LLO-AF). As used herein, the term "non-differentiable" is not used in a classic mathematical sense, but rather, in a back propagation sense to mean that the ND-LLO-AF does not provide a single gradient that descends to the origin, as with existing functions (e.g., ReLu, Softmax, etc.). Instead, non-differentiable as used herein refers to the function having more than one localized minimum and/or localized maximum point.

FIG. 8A is a schematic depiction of aspects of a generalized ND-LLO-AF 210 that can be used in conjunction with various embodiments. The function 210 is similar to the function 200 discussed above in FIG. 7, and includes multiple local minimums 212A and 212B, multiple local maximums 214A and 214B, and first, second and third gradient segments 216A, 216B and 216C.

The minimums 212A and 212B can correspond to the junctions between segments 200A/200E and 200C/200D in FIG. 7, or can have other values. It is contemplated albeit not necessarily required that the minimums 212A/212B will have values equal to or close to zero (0). Similarly, the maximums 214A and 214B can correspond to the junctions between segments 200A/200B and 200C/200D in FIG. 7, and will have values equal to or close to P. The various gradients 216A, 216B and 216C can correspond to the segments 200A/200B/200C, although these can take other shapes as well including curvilinearly extending, segmented, etc. While only two minimums and only two maximums are shown, other numbers can be used.

As noted previously with respect to the discussion of FIG. 7, the local minimum 212B is bounded by two local maximums (e.g., 214A/214B) so that the gradient along curve 210 decreases when approaching point 212B and increases when moving away from point 21B in both directions. The same is true for local maximum 214A, where the gradient increases toward this point and decreases when moving away from this point. This provides a localized trough or hill within the overall function profile. As will be appreciated, such features are undesirable or unusable when implementing conventional backpropagation, since movement in a given direction along the horizontal axis provides both increases and decreases in gradient. Using this definition, it will be understood that the LLO-AF 200 in FIG. 7 is also fairly characterized as an ND-LLO-AF.

Figure 8B:
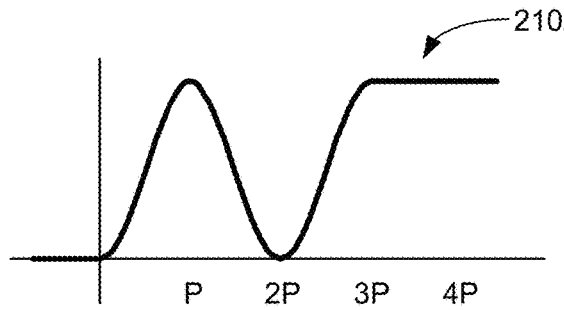
Figure 8C:
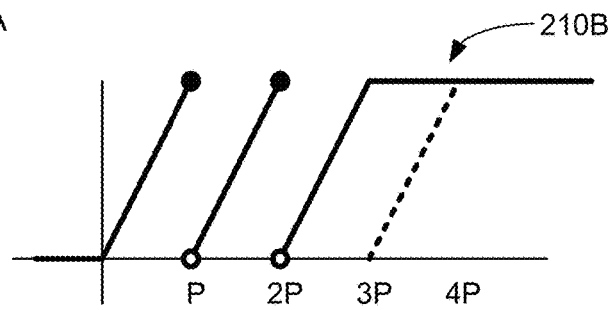

FIG. 8B provides a graphical representation of another ND-LLO-AF activation function 210A with a sinusoidal waveform based on y=sin(x). FIG. 8C shows another LLO activation function 210B with a sawtooth waveform based on parallel discontinuous segments all having the same slope. It will be noted that reversing the order of condition (3) in Table 3 provides the associated sawtooth shape in FIG. 8B.

FIG. 8C further shows that, while some embodiments truncate the LLO activation function at +3P, additional cycles can be provided as desired (e.g., +4P, +5P, etc.). Any number of other LLO activation functions may be used as desired with networks configured as described herein.

Chain Isolation Optimization

As stated previously, backpropagation is unnecessary and can be eliminated during the IGL-ANN training process. This is because, except as noted below, the output of each node in the IGL-ANN passes as a primary input to a single downstream node rather than to multiple downstream nodes in parallel. Stated another way, a single unique path, rather than multiple parallel paths, can be traced through a network section from the output node/layer to each input and/or hidden node within a given network section. This is explained more fully in FIG. 9.

Figure 9:
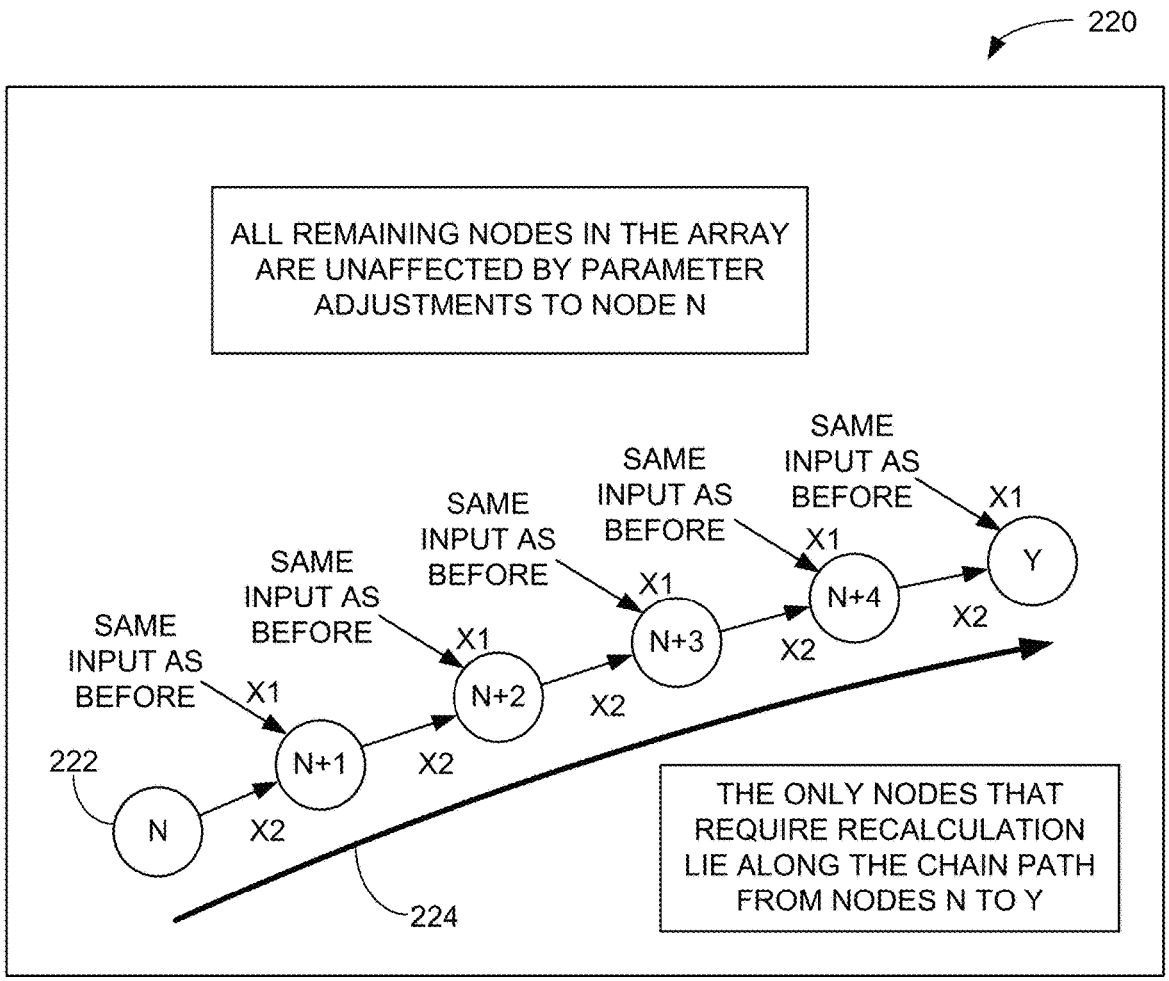
FIG. 9 schematically represents aspects of a chain isolation optimization training operation used to train the IGL-ANN in accordance with some embodiments.

FIG. 9 is a schematic representation of another IGL-ANN 220 having a population of nodes 222 arranged as described above. For a selected node N within the array 220, a single active chain path 224 extends from node N to the output node Y. The active chain path 224 for node N is a pathway along which the output from node N passes successively to, and is acted upon, nodes N+1, N+2, N+3 and N+4 before reaching terminal node Y. This is the only active feedforward path between nodes N and Y. This condition is true for each of the remaining input and hidden nodes in the network section 220.

It will be appreciated that the impact that the output of node N decreases at each successive layer (e.g., the output of node N accounts for 50% of the input at node N+1, 25% at node N+2, 12.5% at node N+3 and so on), but the output of node N nevertheless is actively passed through and influences this chain of nodes, and only this chain of nodes, to the output node Y.

It follows that, if the parametric values for node N (e.g., B, W1, W2) are adjusted for a given input X to the array 220, the only nodes that will be affected are the downstream nodes N+1 through N+4 along path 224 that are connected to receive the output of node N. All remaining nodes in the array will remain (nominally) unaffected by the adjustments to the parameters of node N and will (nominally) output the same values as before for the same input training data.

This is a key point to understanding the chain isolation optimization carried out in accordance with at least some embodiments. Values generated by the various nodes in the array can be stored and reused without the need to recalculate these values.

Instead, all that is needed to test to see if a particular parametric adjustment to node N in FIG. 9 has desirably reduced (or alternatively, undesirably increased) the loss function at output node Y is to make the adjustment to node N, generate a new output value (Y1 for node N), and propagate the updated output from node N forward along chain path 224 to each of the downstream nodes N+1 through N+4 to obtain a new, updated array output value Y.

Figure 10:
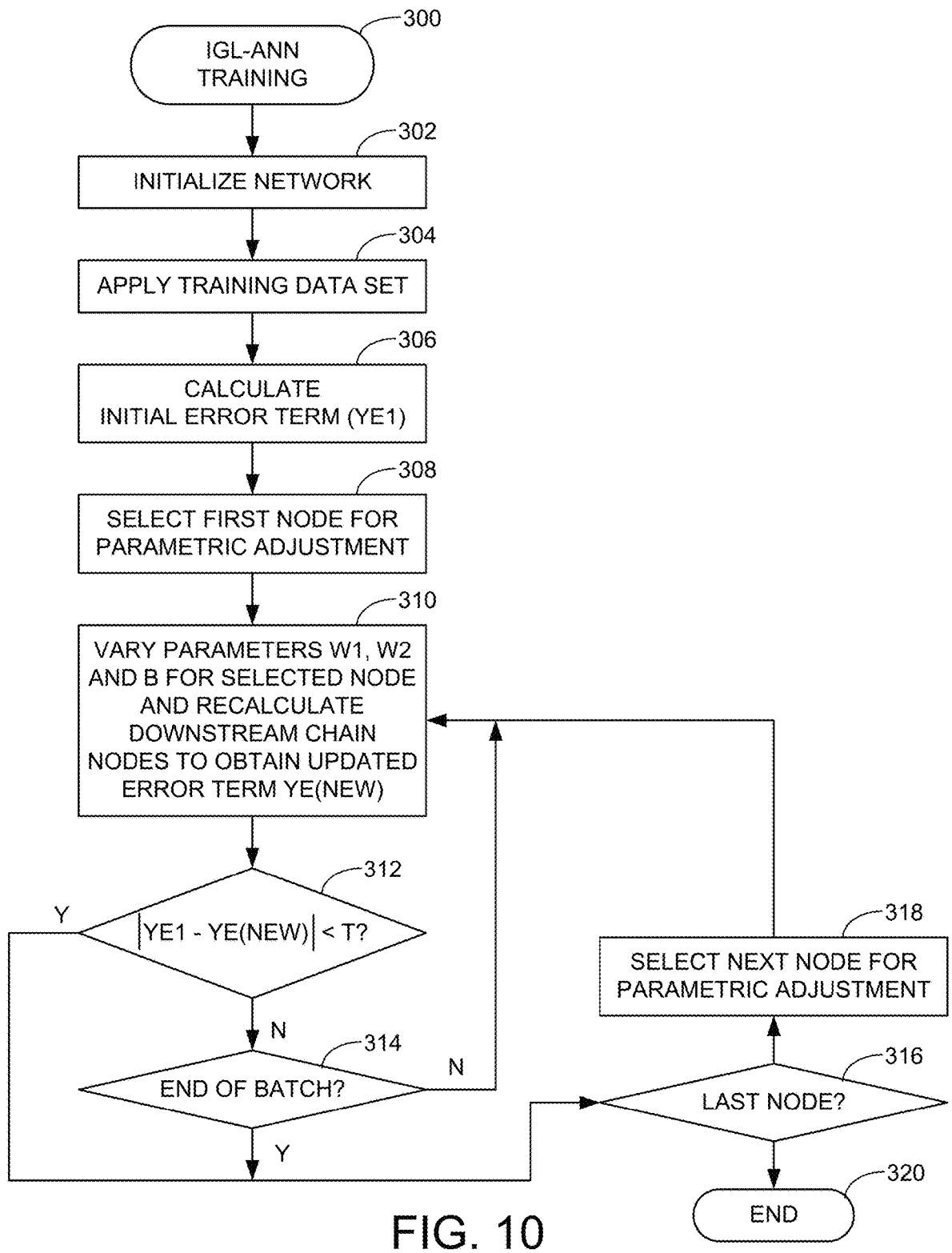
FIG. 10 is a flow chart for an IGL-ANN chain isolation optimization training routine illustrative of steps that may be carried out in accordance with some embodiments.

Accordingly, FIG. 10 provides a flow chart for an IGL-ANN training routine 300 illustrative of steps carried out in accordance with the foregoing discussion. It will be appreciated that the routine 300 is merely exemplary and is not limiting, so that variations are contemplated and can readily be implemented including the omission, addition, modification and resequencing of various steps, etc.

For purposes of the present example it will be contemplated that the following discussion of FIG. 10 will contemplate the training of a selected IGL-ANN such as the exemplary array 130 in FIG. 4 or the exemplary array 220 in FIG. 9. As part of this chain isolation optimization sequence, a succession of training data sets will be presented which include input X data sets along with corresponding correct output Y values. A succession of the training data sets will be used, including in subsequent selected batches as explained below.

The array network is initialized at step 302. This can include a number of operations including selection of the number of nodes and layers in the system, and the setting of various initial values to the data. A desired precision P is also selected at this time appropriate to the resolution of the training data sets and other factors. The parameters may be randomized (e.g., random weights and bias values may be assigned through the network), or predetermined values (e.g., 0.5 for every value, etc.) may be used. Ultimately, it has been found that the rate of convergence will be sufficiently accelerated that while random values tend to work well, any values, including rail values (e.g., weights of −2P, etc.) will also work well as initial values.

A training data set is next applied to the network at step 304. After a statistically sufficient number of runs, an initial error term (loss function) is calculated at step 306. This initial error term, sometimes referred to herein as YE1, is determined in relation to the difference between the expected (desired) output Y and the observed (actual) output Y for each separate batch or combination, in total. As such, the calculation of the initial observed error YE1 can be the same as other loss function calculations on conventional ANNs, or may be a specially configured loss function as described below in a following section. It is contemplated that, however expressed, the YE1 value will usually have a non-zero magnitude; that is, at least some error will exist in the system between the true outputs and the estimated outputs.

At this point, the routine transitions to chain isolation optimization at step 308 by selecting a first node from the network for evaluation and parametric adjustment. In some embodiments, all of the non-input layer nodes in the system are selected in turn for evaluation, so one node may be as good as the next one for this initial selection. A random selection mechanism can be used for these node selections, or a step-wise ordered selection pattern can be used, informed by previous passes through the system. It is contemplated that, in situations where an ultimate threshold level of error is acceptable, nodes will continue to be evaluated and adjusted until this ultimate threshold level is met.

The routine continues at step 310 where the selected node (in this case, node N in FIG. 9), undergoes repetitive variation of the respective parameters W1, W2 and/or B from an initial value to an updated value while presenting a subset of the test data sets to the system.

One way to provide different variations of the parameters is to provide a limited number of combinations of these parametric values, such as 35-40 combinations, against each of a selected number (batch) of randomly selected test data combinations. For example, for a given first test combination (e.g., input X and actual output Y), each of the various logic gate combinations of FIG. 7 can be applied to determine an associated output Y1 value from the node N. Other combinations can include intermediate values (e.g., various other settings for W1, W2 and B such as 0.3, 0.75, −1.4, +1.8, etc.), randomly selected values, and so on.

By repetitively presenting a fixed X input to the system, the values of other nodes can be recorded in memory, so that it is not necessarily required to pass the full data set through the system each time. Rather, with reference again to FIG. 9, each time a new combination of parametric values (B, W1, W2) are updated to node N, each of the X2 inputs along the chain path 224 will need to be updated, but the rest of the array 220 remains unaffected and the XI values remain consistently the same independently of what parametric changes are made to node N.

It follows that a smaller batch of records can be used to cycle through each set of parameters and the error rate can be evaluated quickly to identify first the correct direction, and secondly, the correct magnitudes of the respective parameters that provide reductions in the error. These steps are represented by steps 312, 314, 316 and 318 in FIG. 10. Other processing sequencing can be used.

In one non-limiting example, if 2000 combinations (test points of X, Y) are randomly selected, and 35 different combinations of parameters are selected for testing against these 2000 combinations, then a complete first pass evaluation of the node can take place with roughly 70,000 integer math calculations for node N. If the X1 input values are captured for each combination, then an updated YE (new) value can be calculated quickly by feeding forward the newly generated outputs from node N to the downstream nodes N+1 through Y. As a result, testing and optimization of each selected node may only require a relatively short period of time, such as a matter of seconds or less, with optimized levels retained.

The process thus continues on with the selection of a new node, such as randomly, and the process is repeated. An initial smaller batch of test point combinations, such as 20 out of a larger batch of 2000, can be used to initially test and identify promising combinations, which can then be further confirmed by running the rest of the batch. At such time that the error has been sufficiently reduced, the system can exit the optimization routine as shown at step 320. Additional chain isolation optimization techniques are described in further sections below.

Network Implementation Alternatives

Figure 11:
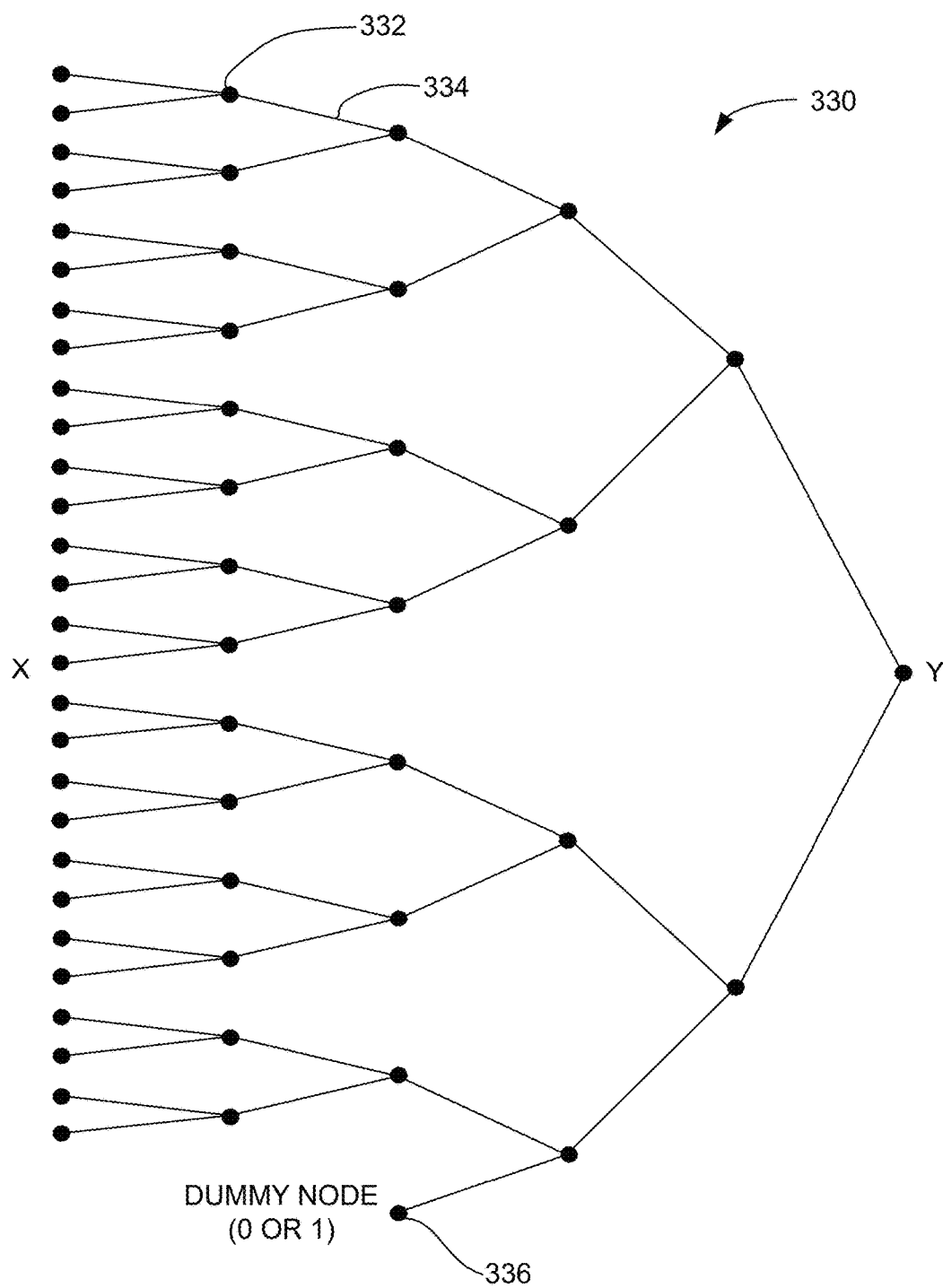
FIG. 11 shows another exemplary IGL-ANN network in accordance with further embodiments.

FIG. 11 shows another simplified IGL-ANN array 330 constructed and operated in accordance with various embodiments. The array 330 is arranged of 2-input 1-output IGL nodes 332 with interconnections 334 as shown. In this simplified example, the network has six (6) layers and a total node count of 57 nodes.

FIG. 11 is useful in that it points out a result of using 2-input, 1-output nodes; the total number of input nodes may or may not be a power of 2. As such, during subsequent combining operations that take place with higher level layers, a layer may reduce to an odd number (such as layer 3 with 7 active nodes). In this case, a dummy node such as 336 can be used to supply the second input, with the dummy node always supplying a constant value such as a (normalized) 0 or 1 level input to the downstream node. Other dummy nodes can be used as required throughout a given ANN.

Figure 12A:
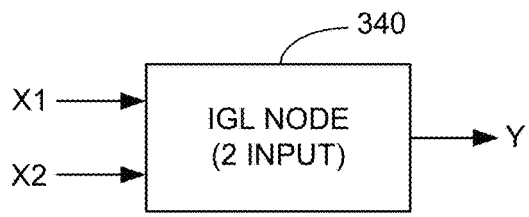
FIGS. 12A and 12B show different configurations for IGL nodes in further embodiments.
Figure 12B:
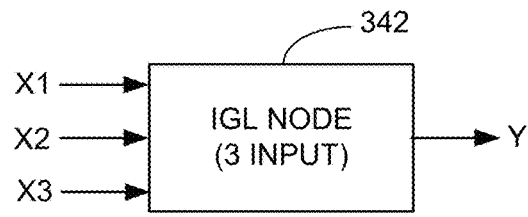

FIGS. 12A and 12B illustrate different node configurations for the IGL nodes in accordance with further embodiments. A node 340 in FIG. 12A has two inputs (X1, X2) and one output (Y1). Node 342 in FIG. 12B has three inputs (X1, X2, X3) and one output (Y2). Since there are numerous logic gate configurations with more than just two inputs, these figures illustrate that any number of inputs can be provided to each node and have the node still operate as a Boolean logic gate with the appropriate parametric values. It is contemplated that the 3-input node 342 would have parameters of (B, W1, W2, W3) with the weights W1-W3 applied to the respective inputs X1-X3 as part of the WS calculation (see FIG. 6).

Figure 13A:
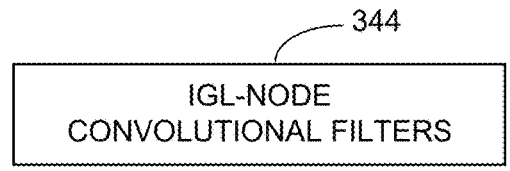
FIGS. 13A and 13B depict convolutional filter sections that can be constructed as a part of an IGL-ANN using the nodes from FIGS. 12A and/or 12B in further embodiments.

The examples described thus far have connected all of the nodes in an upstream layer to the nodes in a downstream layer. This is merely exemplary and not limiting, as other combinations are contemplated including arrangement of the IGL nodes as convolution filters 344, as generally represented in FIG. 13A.

As will be recognized, a convolution filter is a small subset of a larger network that covers or traverses the input data to detect a multi-pixel feature. The filter may be realized as a smaller array of M×N nodes (e.g., 3×3, 10×10, 1×4, etc.) which cooperate as a unit to scan different portions of the larger input data set.

Figure 13B:
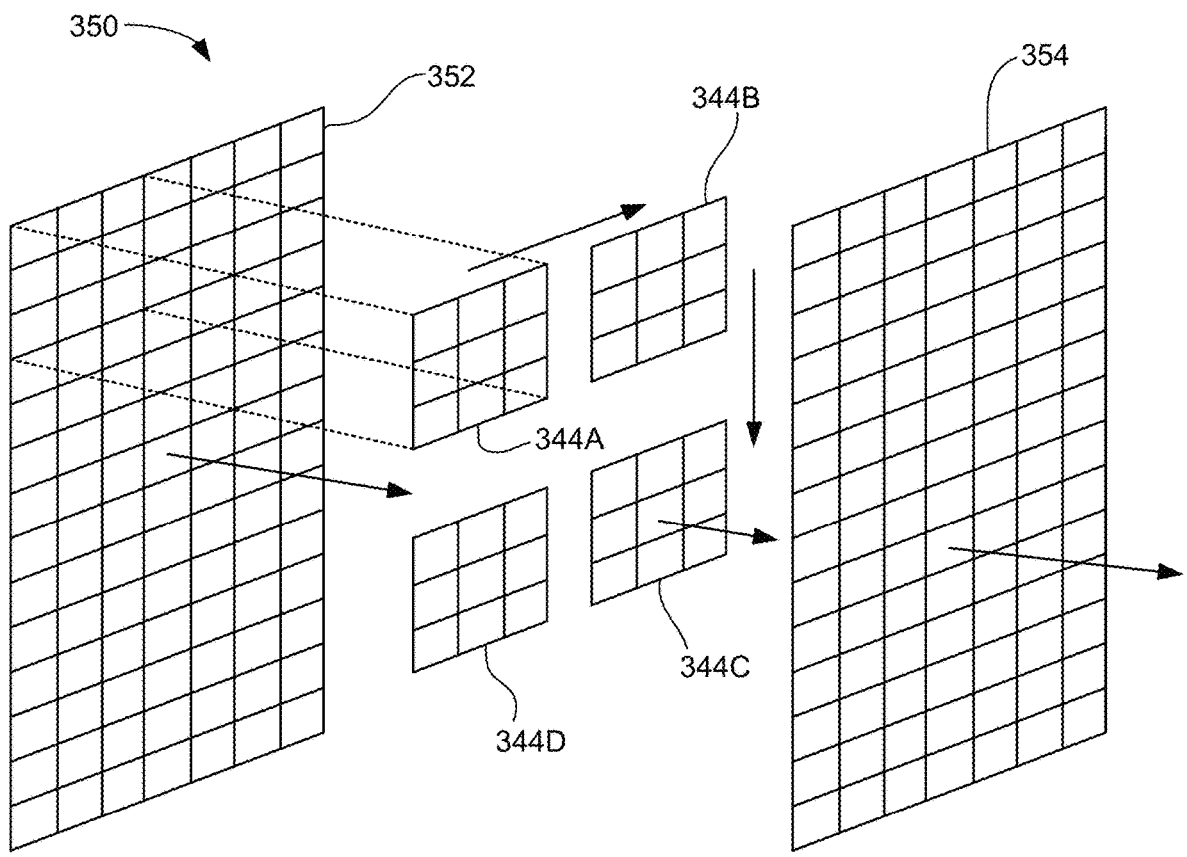

FIG. 13B shows an IGL-ANN network 350 with input data 352 scanned by one or more convolution filters 344A, 344B, 344C, 344D. These filters may represent a single "block" of filter nodes that traverse the input data 352 (such as left to right and up to down), or may be separate filters that examine different zones or portions of the input data in parallel (such as corners, sides, middle, etc.).

The outputs from the filters 344A-344D are provided to a downstream pooling layer 354 which receives various grouped output values from the filters 344A-344D (e.g., Max, Min, Avg., etc.) and provides these to a downstream layer (not shown) for further processing. For example, the maximum (Max) output value from the nodes making up filter 344A may be forwarded from the filter to the next layer. Other metrics can be used such as average, minimum, or specific range data. The IGL nodes disclosed herein are particularly suitable for convolutional applications such as set forth in FIGS. 13A-13B.

The IGL-ANN systems presented herein can further be adapted to process multi-dimensional data. FIGS. 14A-14E show different alternative interconnection configurations that can be utilized for single dimension (1D), 2D, 3D and 4D input data. Other dimensional data, including up to 100D or more, can be similarly processed as required.

Figure 14A:
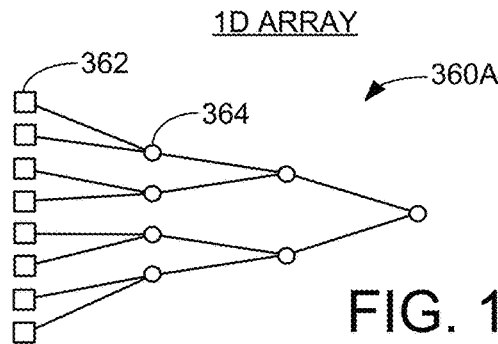
FIGS. 14A through 14E show different array configurations to process multi-dimensional input data in further embodiments.

FIG. 14A shows a 1D array 360A with input nodes 362 and downstream nodes 364. These interconnections are similar to those described above. It will be appreciated that multi-dimensional data can be "flattened" into a single stream of characters and processed by a 1D array (e.g., the 28×28 MNIST data sets can be flattened to a 784×1 array and processed in this fashion).

Figure 14B:
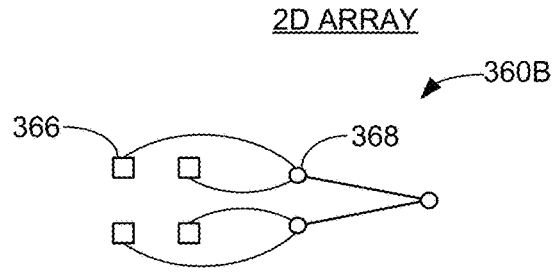

FIG. 14B shows a simple 2D array 360B with a 2×2 array of input nodes 366 and various downstream nodes 368. The top two input nodes are fed to a first downstream node, and the bottom two input nodes are fed to a second downstream node. Other arrangements can be used.

Figure 14C:
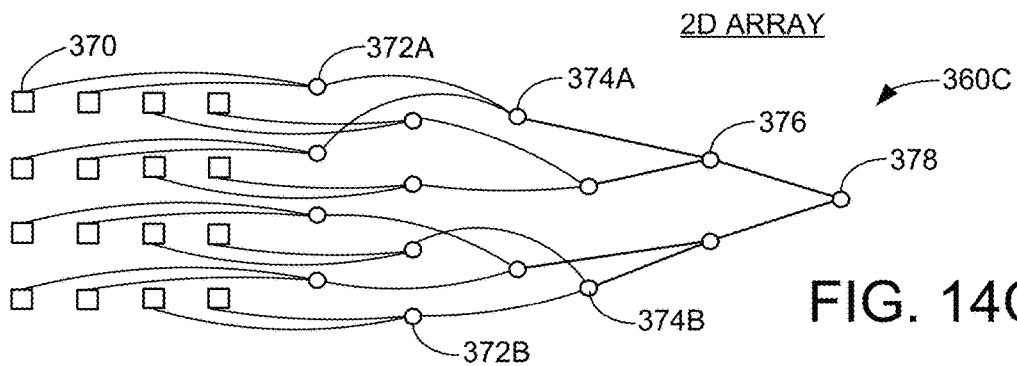

FIG. 14C shows another 2D array 360C with a 4×4 array of input nodes 370. In this case, nodes 372A/372B process respective pairs of the input nodes 370, and so on with nodes 374A/374B, 376 and 378.

Figure 14D:
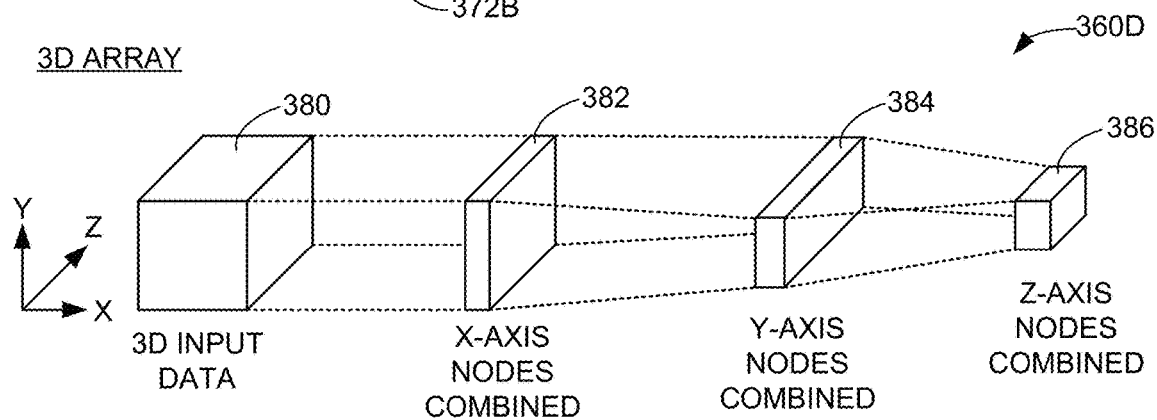

FIG. 14D generally represents a 3D array 360D with 3D input data 380, such as imaging or modeling data, expressed in three dimensions (axes X, Y, Z). In this embodiment, layer 382 processes nodes combined along the X-axis, layer 384 processes nodes combined along the Y-axis, and layer 386 processes nodes combined along the Z-axis 386. Further processing layers (not shown) can combine (flatten) these results as needed.

Figure 14E:
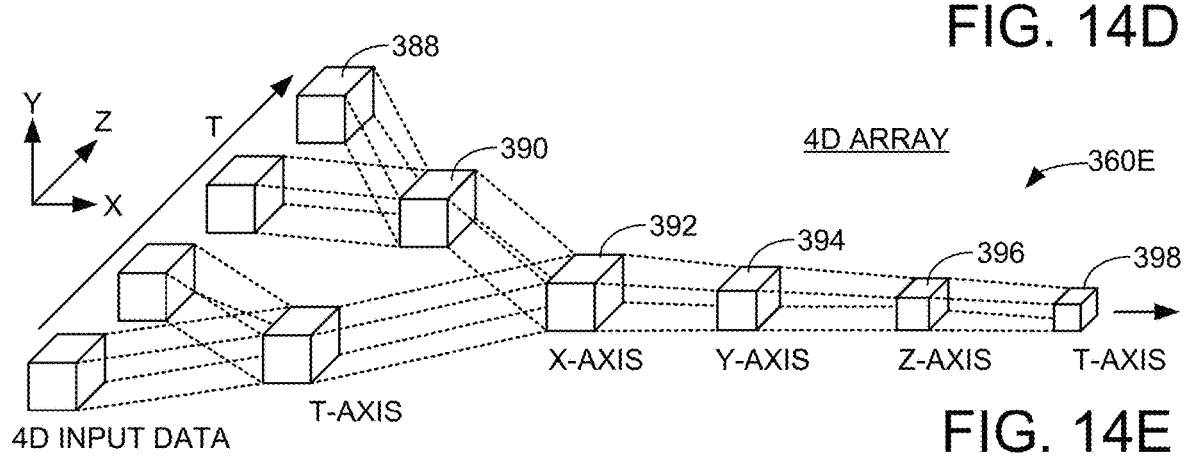

FIG. 14E generally represents a 4D array 360E in which time T is an additional dimension. This can process a variety of data sets including but not limited to moving 3D images (such as a succession of frames, etc.). The input data sets are represented by blocks 388, and these are respectively processed in the T, X, Y and Z axes by successive layers 390, 392, 394 and 396. In some cases, the processing may repeat such as shown by second T-layer 398, or other processing can be supplied.

Accordingly, an IGL-ANN array can be arranged and trained to detect a portion of an input image, with a separate filter configured to evaluate a different area of the image, detect different types of features, etc. Similarly, the nodes can be arranged to process multiple dimensions of data through separate layers or switching sequences.

Figure 15:
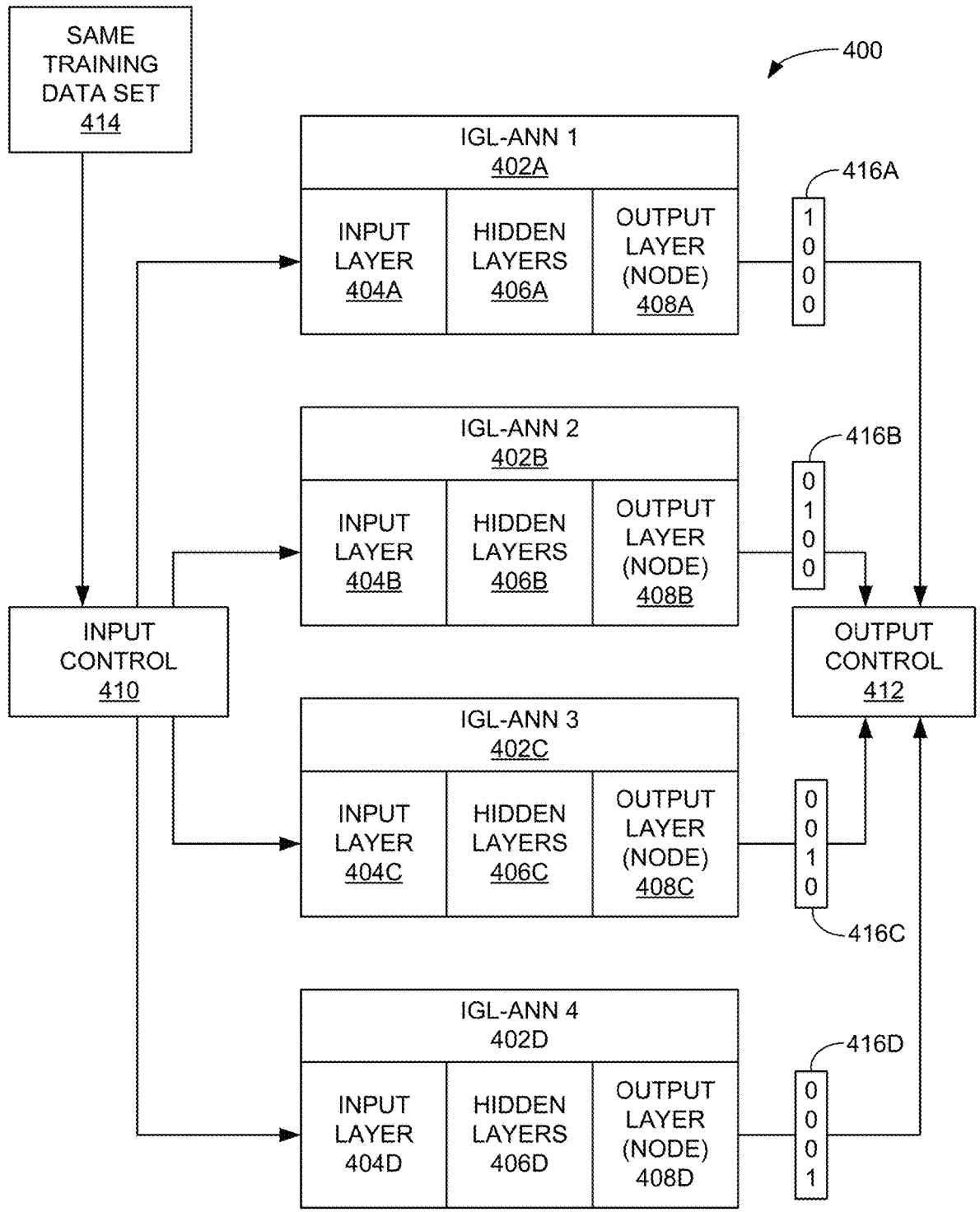
FIG. 15 is a functional block representation of another IGL-ANN system configured to process multi-output data in accordance with further embodiments.

FIG. 15 shows another IGL-ANN system 400 in accordance with further embodiments. The system 400 is configured to process data sets with multiple outputs. In this simplified example, there are a total of four (4) outputs and hence, four stages 402A, 402B, 402C and 402D which operate in parallel. Each stage is nominally identical and constitutes a separate IGL-ANN section that converges to a single node output (in this example). Thus, each stage includes a corresponding input layer 404A, 404B, 404C and 404D, one or more hidden layers 406A, 406B, 406C and 406D, and an output layer (node) 408A, 408B, 408C and 408D.

An input control block is denoted at 410 to process the input data supplied to the system 400, and an output control block is denoted at 412 to process the outputs provided by the respective stages (sections) 402A-402D. The training data are supplied by block 414. The same training data may be supplied to all four stages, with each stage trained to detect a different output. These are denoted by blocks 416A, 416B, 416C and 416D, which provide output sets of (w, x, y, z) so that the first stage is trained to detect the w (first) bit, the second stage 402B is trained to detect the x (second) bit, the third stage 402C is trained to detect the y (third) bit, and the fourth stage 402D is trained to detect the z (fourth) bit.

To give a practical example, assume that the training data of block 414 is the so-called MNIST (Modified National Institute of Standards and Technology) handwriting data set. As will be recognized, the MNIST data set is a database of handwritten digits that is commonly used for training various image processing systems. The MNIST data set comprises approximately 60,000 training data examples and approximately 10,000 testing data samples.

Each sample is a handwritten character from zero (0) to nine (9), and is provided across an array of 28×28 pixels. Each pixel can be assigned a gray-scale value over a selected range; a commonly employed range is 0-255, with 0 representing full black and 255 representing full white.

In this case, the system 400 only has four (4) stages 402A-402D so the system can only detect 4 of the 10 different digits 0-9 in the database (e.g., the stages 402A-402D may be trained to respectively detect the digits 0-3, etc.). Of course, a total of 10 such stages could be utilized to account for all of the digits 0-9.

The system 400 is trained by training each separate stage for each separate possible output. Data are fed into the system by the input control block 410 and chain isolation optimization techniques are applied to reduce loss function error. Thereafter, during normal operation, the predicted output across the networks is the output value (w, x, y, z) with the highest magnitude, as determined by the output control block 412.

Operational Environments

The IGL-ANN systems as variously embodied herein can be implemented a variety of operational environments including in hardware, software, firmware, across distributed networks, specially configured integrated circuits, graphical processing units (GPUs) with multiple processors, etc.

Figure 16:
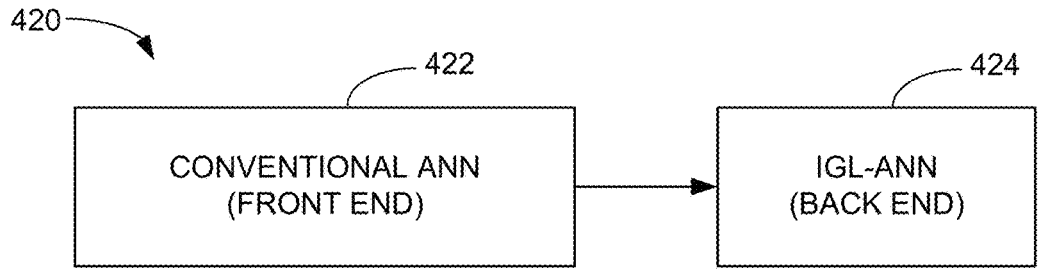
FIG. 16 shows the use of another IGL-ANN as a back end for a conventional ANN in further embodiments.
Figure 17:
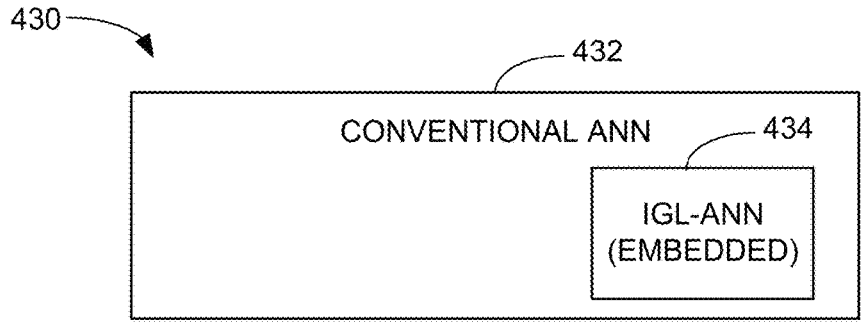
FIG. 17 shows a hybrid ANN system with another IGL-ANN embedded within a conventional ANN in further embodiments.

FIGS. 16 and 17 show operation of the IGL-ANN arrays in combination with existing ANNs. For example, FIG. 16 shows a system 420 where a conventional ANN 422 (such as in FIG. 2) operates as a front end to a processing sequence, and an IGL-ANN 424 is configured as a back end processing section to take the outputs of the front end system 422 and further process to reduce errors. Because of the speed and capabilities of the IGL-ANN processing, the capabilities of the conventional ANN may be enhanced by the addition of the IGL-ANN unit. Other arrangements are contemplated, including using the IGL-ANN as a front end pre-processor for a conventional ANN, etc.

FIG. 17 shows another system 430 where an otherwise conventional ANN 432 has an embedded IGL-ANN section 434 as an integral section of a larger network. It is contemplated that using an IGL-ANN such as 434 as a separate operational module can provide certain advantages to an existing network architecture, including but not limited to operation as a convolutional filter, etc.

Figure 18:
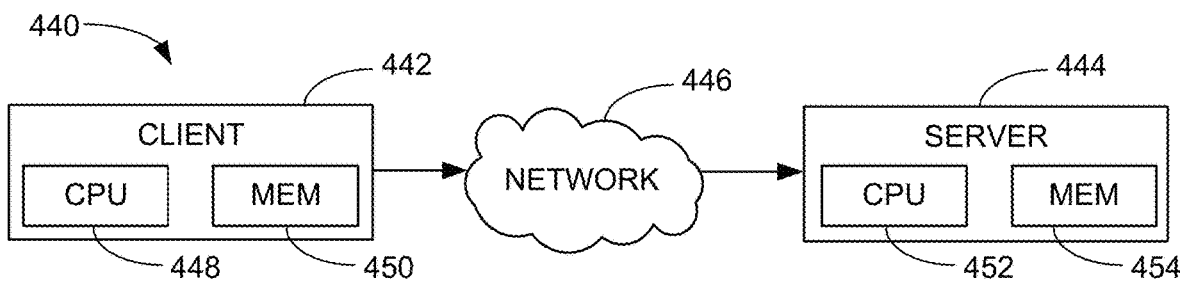
FIG. 18 shows an exemplary networked computer processing environment in which various embodiments of the present disclosure can be advantageously practiced.

FIG. 18 shows a generalized computer processing environment 440 in which various embodiments of the present disclosure can be advantageously practiced. The environment 440 includes a local client device 442 coupled to a remote server 444 via one or more intervening networks 446.

The client device 442 can take any number of suitable forms such as but not limited to a desktop computer, a laptop, a tablet, a smart phone, a work station, a terminal a gaming console, an autonomous vehicle, a UAV, or any other processing device. The client device 442 is shown to include at least one programmable processor (central processing unit, CPU) 448 and local memory 450. In some embodiments, the various embodiments disclosed herein can be modeled and implemented using software/firmware/hardware executable by the client device. A connection to the network 446 can be utilized but is not necessarily required.

The server 444 may be node connected to other devices (not separately shown and may include an edge device, a data processing center, a local network attached storage device, the IPFS (InterPlanetary File System), a local service provider (such as an on-demand cloud computing platform), a software container, or any other form of remote storage and/or processing device communicable to the client device 442 via the network. As such, the various embodiments or portions thereof can be executed at the server level via server CPU 452 and memory 454. The network 446 can be a local area network, wired or wireless network, a private or public cloud computing interconnection, the Internet, etc.

With regard to the operational environment in which the various embodiments can operate, any number of options are available including the following:

Supercomputers: the system can be implemented to run in parallel (many instances of the algorithm running together sharing information) on supercomputers.

GPUs: the system is amenable to being programmed into a GPU. For example, GPUs commercially available from NVIDIA CORPORATION have a proprietary onboard programming language referred to as "CUDA" in which various embodiments can be written in and implemented in a parallel fashion.

Multi-core processors: the system is adapted to be easily executed in a multi-core processor. For example, different cores can be assigned to different stages/sections to operate in parallel.

Dedicated, custom designed hardware IC chips: the system is readily implementable in hardware, and such systems will likely be the fastest, by orders of magnitude over any other alternative. For LLMs with billions of parameters, this implementation will be particularly effective.

Parallelization

Parallelization is a particular feature of the various IGL-ANN systems embodied herein. Parallelization can be understood as computational processes that are run simultaneously on more than one thread/process/processor/CPU/computer on a LAN/computer on the Internet, etc, in solving a single problem simultaneously. Many processes that exist are effective, but cannot be parallelized, or can only be parallelized with much difficulty. Since it is ubiquitous that multi-core processors and GPUs are widely available, the most useful processes in modern environments are sometimes referred to as "embarrassingly parallel."

The term embarrassingly parallel is a term of art which refers to the ability of a computing process to be easily divided into a number of independent parallel tasks, and there is little or no effort required to separate the problem and little or no dependency or communication between the parallel tasks. An embarrassingly parallel process speeds up substantially linearly as the process is executed on multiple processors.

For example, having 10 processes running in parallel will provide a 10× speed up (as opposed to a less desirable value like 2.5× or 4×). GPUs, for example, can have thousands of processor cores. A process that is embarrassingly parallel, or close to embarrassingly parallel, is particularly suitable for execution on a GPU.

The extent to which a process is embarrassingly parallel is generally related to the so-called Amdahl's Law, which generally states that the overall performance improvement gained by optimizing a single part of a system is limited by the fraction of time that the improved part is used. Since the IGL-ANN systems as variously embodied herein tend to have less than 1% of the overall processing that cannot be reduced, this means that over 99% of the IGL processing can be parallelized, either at the process level or at the node level (or both). This results in a highly desirable linear increase in speed when implementing the optimization process using multiple parallel processors.

Figure 19A:
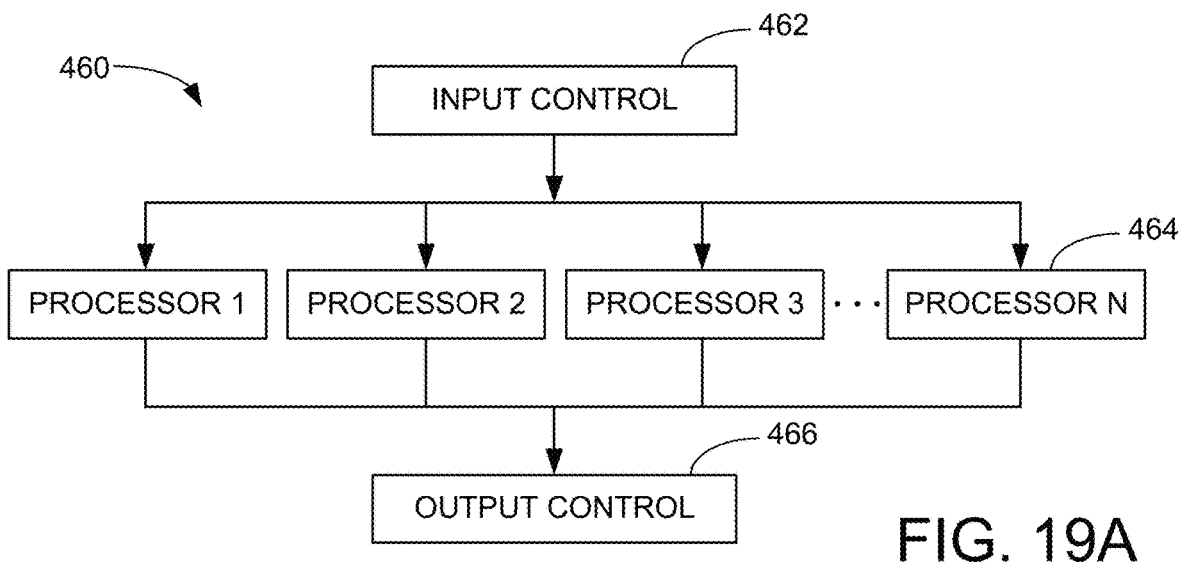
FIG. 19A is a functional representation of a parallel data processing environment for a selected IGL-ANN in accordance with further embodiments.

One parallelization approach is generally represented by system 460 in FIG. 19A, where an input control block 462 is coupled to N parallel processors 464. During the optimization training of a given IGL-ANN, one approach is to apportion different sections of nodes in the array to each of the N processors 464 and have the associated processor optimize those nodes. The best values for the weights and bias values (e.g., W1, W2, B, etc.) can be shared among the processors as such become available. Because the chain isolation optimization processing tends to only affect a single chain of nodes, the existing values can be stored and manipulated in memory, saving the need for multiple recalculations.

Another parallelization approach using the system of FIG. 19A would be to assign a different section (or channel) of an IGL-ANN to each processor 464. For example, referring again to the multi-channel system 400 in FIG. 15, each of the different sections 402A-402D could be assigned for execution by a different processor 464 in FIG. 19A. In one non-limiting example, a 16 core processor could be configured to operate with 10 cores assigned to a different channel for the respective digits 0-9 in an MNIST application, with the remaining cores operating to support the training operation on the respective channels. Other configurations can be used.

The required interprocessor data transfers are largely trivial since relatively small amounts of numerical data are involved, and could take place on each batch update. All of the processes would communicate their final value for error reduction at the end of each batch to an output control block 466, and the process with the best error reduction value would communicate their current values for W1, W2, and B for each node to the other processes, and the next batch processing would commence.

This further demonstrates the advantages of providing the system without the need for backpropagation, since parallelization of backpropagation is difficult to implement. With backpropagation, one would have perhaps exponentially larger data transfers with larger networks, due to the increased number of nodes and connections. Less memory is required for each model, as well as the sum of the memory for all the parallel models running together. Back propagation in parallel is going to require more memory for all the parallel models, and this may become a bottleneck long before processing speed for large models.

Further performance improvements may be available by providing parallelization at a node level. Referring again to the system 460 in FIG. 19A, each of the processors 464 could be assigned a single node in the IGL-ANN to process.

Figure 19B:
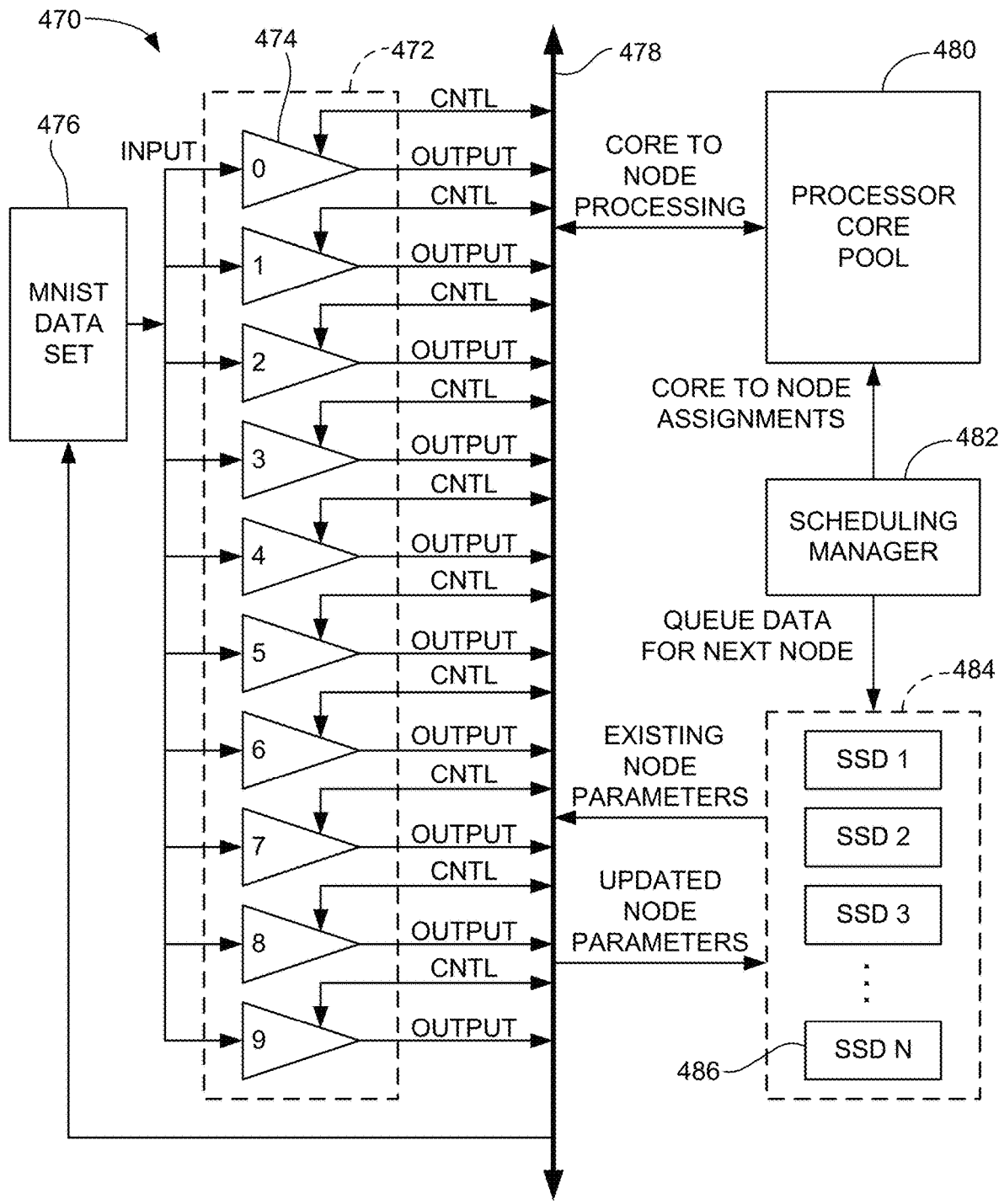
FIG. 19B is a functional representation of another parallel data processing environment used in further embodiments.

This type of parallelization can be understood more clearly with a reference to FIG. 19B.

FIG. 19B shows another parallelization system 470 that can be implemented in a large scale network environment. The system is particularly suitable for exceptionally large models. The exemplary diagram includes a memory space 472 in which multiple network sections 474 are trained to detect different inputs. In this case, a total of 10 sections 474 are provided corresponding to the digits 0-9 from the MNIST database, represented by input block 476. Other configurations of networks can be constructed, however.

For example and not by way of limitation, the so-called German Traffic Sign Recognition Benchmark (GTSRB) is another well-known testing benchmark with approximately 40 different German road signs and approximately 50,000 images. To detect these signs, a total of approximately 40 different channels 474 could be implemented and trained, one for each sign. Other configurations can be used including non-image classification applications.

The sections 474 may be considered notional in that the active portions of these sections may be loaded to and operated in the memory space 472 (e.g., RAM or other memory) as needed. It is not necessarily required that the full node representation of the entirety of each section be maintained in memory, but rather, only those nodes undergoing evaluation and training, as well as the affected downstream nodes (see FIG. 9).

Continuing with a review of FIG. 19B, element 478 represents a bus or central communication path to allow the respective elements to communicate and transfer data. These elements further include a processor core pool 480, which in this case may comprise many thousands of processing cores each available to carry out processing functions on individual nodes. A scheduling manager 482 queues up the next node for processing and assigns a core to the selected node, so that multiple nodes are being evaluated in parallel.

The parameters and data values may be stored in a storage array 484 having N SSDs 486 (and/or other forms of storage and processing capabilities). The use of a storage array 484 allows the implementation of an overall network of substantially any size to be efficiently handled and managed. While a random selection methodology may be carried out to select nodes for training (as explained more fully below), the order is determined by the scheduling manager 482, so that the manager can direct the SSDs 486 to queue up the data for the next node. The SSDs 484 can thus supply the necessary existing node parameters (including history data) and store updated values as the processing cores test and train each of the nodes, without the inherent latency of the SSDs adversely affecting the processing speed of the nodes.

FIGS. 18 and 19A-19B show that systems constructed using the IGL-ANN sections described herein can be scaled to substantially any desired size, including systems that have thousands of layers (or more), millions of nodes (or more) and billions of parameters (or more). Substantially any ANN application, including but not limited to LLMs and generative AI systems, can be efficiently constructed and trained with IGL-ANNs using a fraction of the time and resources required for existing ANN systems.

Enhanced Error Function

The various loss (error) functions described herein including in the chain isolation optimization training are suitable as a standard error model. These can be characterized as generally operating along the following lines to calculate an Error (E) as follows:

$$\text{Error}(E) = \text{Absolute Value}(Y\text{predicted} - Y\text{desired}) \qquad (3)$$

where the Error (E) is the value of the loss function to be minimized, Ypredicted is the output of the ANN, and Ydesired is the target value which forms a portion of the test data set. As will be appreciated, Ydesired will usually tend to be either zero (0) or one (1), at least from a normalized standpoint. More specifically, in view of the IGL-ANN embodiments described herein, Ydesired will tend to either be 0 or P.

An Enhanced Error Function (EEF) is disclosed herein that can provide further improvements in convergence rates. The EEF is configured to heavily penalize incorrectly classified predictions. The model was derived empirically, so the following example is illustrative and not limiting. The EEF can be characterized as operating as follows:

$$\text{If } Y\text{desired}=0 \text{ and } Y\text{predicted is } \geq \text{to } (A)*P, \text{ then} \qquad (4)$$

$$\text{Error}(E) = \text{AbsoluteValue}(Y\text{predicted} - Y\text{desired})\char`\^(B)$$

Else $$\text{Error}(E) = \text{Absolute Value}(Y\text{predicted} - Y\text{desired})*(C)$$

where A, B and C are selected convergence constants used to force convergence of the observed error. In one embodiment, these constants may be set as follows:

$$A = 0.49 \qquad (5)$$

$$B = 1.2$$

$$C = 0.01$$

Other values for the constants A, B, and C can be used. However, in this formulation it can be advantageous that A be close to but less than 0.5, B be greater than 1, and C be relatively small. It will be noted that the EEF significantly penalizes "incorrect" classifications, since the threshold is at 0.5*P, so anything less than 0.5*P will be considered a "0" prediction, and anything greater than 0.5*P output from the network will be considered a "1" prediction during testing.

Note the following if Ydesired=1:

$$\text{If } Y\text{desired}=1 \text{ and } Y\text{predicted is } \leq \text{to } (1-A)*P, \text{ then} \qquad (6)$$

$$\text{Error}(E) = \text{AbsoluteValue}(Y\text{predicted} - Y\text{desired})\char`\^B$$

Else $$\text{Error}(E) = \text{Absolute Value}(Y\text{predicted} - Y\text{desired})*C$$

where (in this case) 1-A=0.51, and B and C are set forth by equation (5) as before. This EEF formulation has been found to work effectively to "slam up" or "slam down" output values to where they need to be to generate correctly classified outputs.

Another EEF can be used to provide further improvements and faster convergence of error during system training. In this related approach, an error forcing function is used to drive oscillating but correctly classified errors towards convergence (low penalty) and to amplify incorrectly classified errors (high penalty).

This alternative EEF sets initial constant values L and M as:

$$L = 0.4*P*0.01 \qquad (7)$$

$$M = 0.05*P*0.1$$

A Raw Error RE is determined as before, such as by:

$$RE = \text{Absolute Value}(Y\text{predicted} - Y\text{desired}) \tag{8}$$

Thereafter, a Computed Error CE may be determined as follows:

If RE is between 0 and $0.4*P$, then (9)

$$CE = RE*0.01$$

If RE is between $0.4*P$ and $0.45*P$, then $$CE = L + ((RE - (0.4*P))(0.1))$$

If RE is greater than $0.45*P$ (up to $P$), then $$CE = (L+M) + ((RE - (0.45*P))(10))^{\wedge}1.2$$

Figure 20:
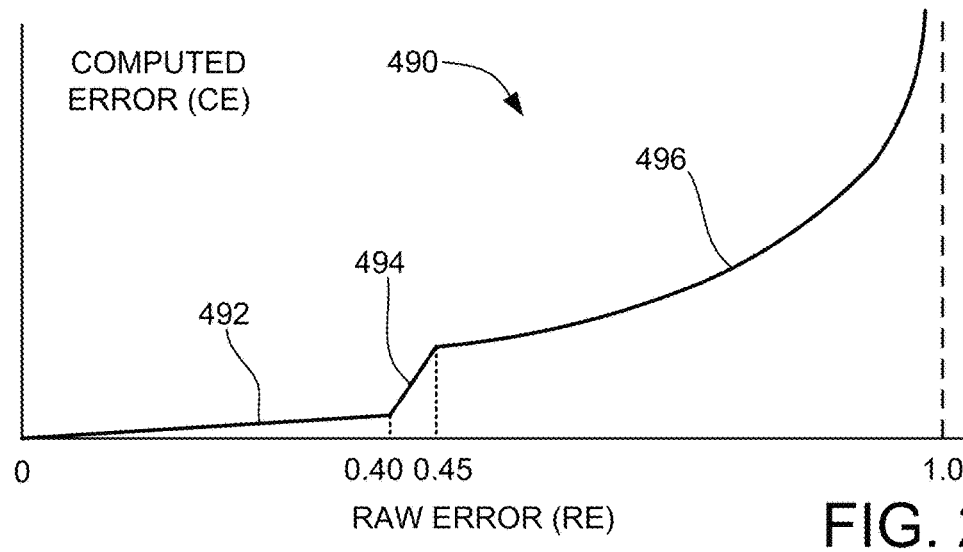
FIG. 20 is a graphical representation of a specially configured error function in some embodiments.

This alternative EEF function is represented by error curve 490 in FIG. 20. The curve 490 is plotted against a Raw Error (RE) x-axis and a Computed Error (CE) y-axis. Segment 492 has a relatively low slope towards 0 and extends for RE values of from 0 to 0.40. Segment 494 is a shelf portion with a steeper slope for RE values between 0.40 and 0.45. Segment 496 is an exponential function for values of RE greater than 0.45.

In this way, correct classifications are rewarded and incorrect classifications are provided with an exponentially greater penalty. The function tends to push oscillating classifications around the midpoint down the shelf 494 and into the convergence zone of segment 492. It has been found experimentally that the error function of curve 490 can significantly correct prediction rates, reduce training times and achieve higher overall success rates (including above 99% to 100%).

In sum, a calculated loss function error can be determined using an EEF with one or more convergence constants to accelerate convergence of the loss function error, such as the constants defined by a first model via equations (4)-(6) or via a second model via equations (7)-(9), as each set of node parameters are adjusted during the chain isolation optimization process.

Intelligent Test Data Pruning (Culling)

In many training data sets, some percentage of all of the input locations are always zero or some other null value. These zero locations can include background areas and not part of the depicted characters in the test data. For example, the MNIST handwriting training data set uses test data arranged in an array of M×N pixels (e.g., 28×28 pixels), and in each case for all of the digits 0-9, about 20% of these pixels are always zero. Usually, the border of 3-6 or more pixels around the edge are zero, and many of the nodes have X1 and X2 inputs from the data that can be identified as always zero before training begins.

These zero inputs provide no useful information and cannot reasonably contribute to effective learning. Hence, further embodiments disclosed herein perform an initial pruning (culling) operation to identify and eliminate those pixels that are always zero. The ability of the IGL-ANN to model logic gates provides a particularly useful capability in performing this pruning operation, although other techniques can be used as well.

In further embodiments, all of the nodes forward in the chains that have all pruned inputs are also pruned out as well and are not further examined or update. For example, reference is made to the ALG-ANN discussed above in FIG. 11; those input nodes corresponding to always zero can be ignored, set to zero, never updated in the evaluation sequence, etc.

Figure 21:
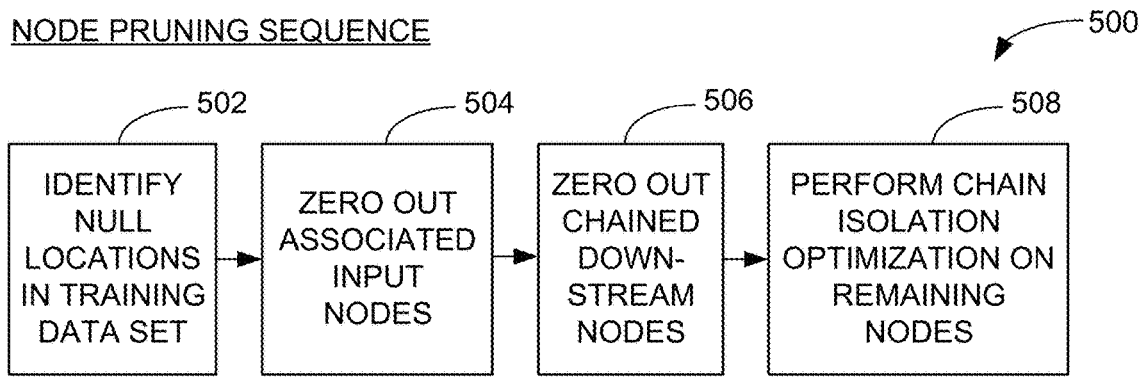
FIG. 21 shows a node pruning sequence that may be carried out in accordance with further embodiments.

FIG. 21 provides a node pruning (culling) sequence 500 to illustrate this process. The flow in FIG. 21 is merely exemplary and can be modified as required.

At block 502, null (e.g., zero) nodes are first identified in the input data. This can include a combinatorial comparison of all of the data sets on a pixel-by-pixel basis to ensure that no useful information is provided in any of these locations. Other techniques, including empirical or heuristic techniques, may be employed.

As noted above, the null locations may tend to mostly appear near the edges of the respective test samples in an image classification system such as a MNIST handwriting example, but other locations and types of data may similarly have null data locations across the data set as well. For example and not by way of limitation, the null locations all have a value of 0 for an MNIST data set when gray-scale intensity values of 0-255 are provided for the respective images across the entirety of the data set.

Once the null locations are identified, the process continues at block 504 where the corresponding input nodes that map to these locations are zeroed out. As noted above, in at least most cases no useful information will be supplied to these nodes, so turning these nodes off reduces the total number of subsequent calculations that will be required during training. The nodes may be pruned by setting the respective parameters of these nodes to all zero. For example, see the NULL entry in FIG. 7A which provides (B, W1, W2) values of (0, 0, 0). Other approaches can be used.

A downstream search is next performed at block 506 to trace each nulled out input node forward through the array along each chain path to determine if any downstream nodes have all inputs that are connected to upstream nulled out nodes. If so, these downstream nodes are also pruned (e.g., set to (0, 0, 0)). Once all affected nodes have been identified and pruned, the chain isolation optimization is applied to the remaining nodes at block 508.

Significantly, a pruning operation such as set forth by FIG. 21 is not typically available for, or easily implemented by, systems that use conventional backpropagation techniques. This is because, in a backpropagated MLP ANN, substantially all the nodes in the forward direction are connected to every node in the forward direction. Pruning out a few input nodes will not make much difference, because all of the forward nodes are still connected to valid data in the previous layers one way or another and still need to be examined.

By contrast, in an IGL-ANN, entire chains of nodes with zero values can be pruned out. Some ML data sets have been found to have upwards of 30%, 40% or even 50% (or more) empty or zero nodes, so this optimization has shown to account for further enhancements in the processing speed of an IGL-ANN as compared to a conventional ANN.

In one example, empirical testing showed pruning rates of around 18-20% for IGL-ANN networks configured for MNIST processing are common. It is estimated based on observed data that this type of pruning optimization technique may result in at least 10%, and upwards of around 50%, speed improvements for real-world data.

Batch Learning Scheduling

Another area that can provide enhanced chain isolation optimization operation is referred to herein as a "Batch Learning Scheduling" (BLS) mechanism. It is contemplated that this technique will result in further speed error reductions and enable achievements of close to 100% accuracy in training efforts.

At present, training examples in the ML environment are often presented to the network undergoing training in a randomized fashion. Empirical observation has suggested that about 90% of the training examples are fairly easy for the network to learn, about 8% require more intense training but are achievable, and the remaining about 2% require upwards of 10× to 100× (or more) the time and effort that was required for all of the prior 98%. One illustrative example in the MNIST data set for these problematic 2% is a handwriting test sample where the numeral "1" is written as a diagonally extending line rather than a vertically extending line.

The proposed BLS technique accounts for training examples that are identified as "difficult to learn" by a combination of approaches. In one approach, a first pass at training is carried out to identify difficult to learn examples. These difficult examples can be identified as those that are still incorrectly classified even after training, do not show rapid convergence of loss function rate, or other observed behavior of the system during evaluation.

A flag value can be attached to these difficult test samples, and training can commence again (either continuing from the present state or resetting the system). During this second pass, the training is carried out as before, except that the flagged examples are assigned priority and are presented early and more often until they are correctly classified.

In a related approach, an overall training data set (such as 50,000 items or examples) is selected. For each of a number of successive batches, a subset is randomly selected (such as 10,000 examples) and optimized. At the end of the batch, those examples that continue to be mischaracterized are inserted into the next randomly selected batch. This way, the problem items are selected early and often, allowing the training scheme to continue to process the difficult items until the system correctly classifies them (if possible). Other techniques can be used as well to intelligently select the order and frequency of the presented training set.

Figure 22:
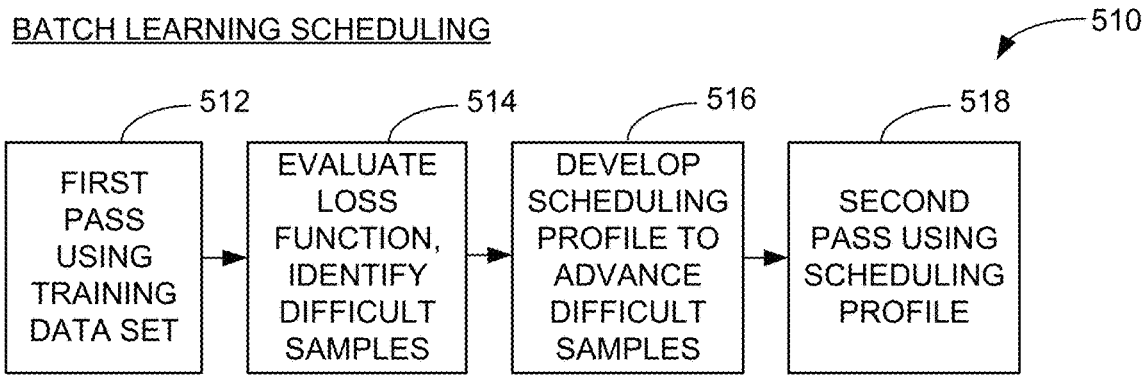
FIG. 22 shows a batch learning scheduling sequence that may be carried out in accordance with further embodiments.

FIG. 22 provides a batch learning scheduling sequence 510 to illustrate these processing operations in accordance with some embodiments. As before, other approaches can be used.

At block 512, a first pass of training is carried out across an entirety of an input training set (such as the MNIST data set described previously, although any training set can be used). At block 514, a full or partial convergence is carried out upon the loss function observed from this first pass at block 512. A loosened error tolerance (e.g., 96% instead of 99%, etc.) can be used as desired.

The goal is to identify those samples from among the test data that are presenting the most difficulty, from a relative standpoint, in loss function convergence. In some cases, the difficult samples can be selected using a priori techniques; for example, it can be reasonably expected that "sloppy" handwriting examples, such as malformed characters (e.g., diagonal "1s" etc.) may be identified immediately without the need to obtain an output from the system.

A scheduling profile is next developed at block 516 that advances the flagged samples, either or both in frequency and in time, within the sequence. It is contemplated that presenting the flagged samples some multiple times more frequently within the test data set, such as 3X, 5X, 10X etc., can be particularly useful. These can be managed by physically duplicating the difficult samples so that more copies are present in the test data, or by periodically inserting the difficult samples more frequently than the other samples.

Similarly, advancing the samples so that the flagged examples are presented earlier in the training process can beneficially train the system early where large changes are still being made to the various parameters. Any number of mechanisms can be used to develop and implement the scheduling profile, including the use of random number generators (RNGs), tables, etc. Once the scheduling profile is developed, the sequence continues at block 518 where a second pass through the optimization routine is carried out using the developed scheduling profile from block 516.

Empirical testing has demonstrated that batch learning scheduling on the MNIST data set as represented by FIG. 22 provides significant reductions in training time and enhanced classification success rates for all characters. As noted above, purposefully adding incorrectly classified characters during a given training batch to the next batch ensures more frequent emphasis upon the difficult to classify examples. BLS has benefit by itself or in combination with the other optimization techniques disclosed herein.

Data Scaling

As will be recognized by those having skill in the art, a metric sometimes referred to as "Big O Notation" describes a metric for how mathematicians, computer scientists and other related technologists compare algorithms in terms of how much additional effort is required for larger problem sizes (such as more data). Ideally, attempts are made to find algorithms that scale linearly, or less than linearly, with additional data. For example, for a slower algorithm it may take 4× the processing time/power for a 2× increase in data size, 16× for 4× the data, etc.

Some other algorithms require "factorial" scaling, where n is the number of examples and the scale rate may be at n! in terms of additional processing power/time required. A more ideal algorithm would be one that scales at a lower rate such as 2n, 1.5n or even n.

It follows that the various embodiments of IGL-ANNs presented herein scale far more favorably in terms of Big O Notation as compared to networks that utilize backpropagation. This is because the number of required nodes/connections increases significantly with increased data inputs in a conventional system, whereas the IGL-ANNs discussed herein provide a lower scaling rate such as 2n due to the 2 input/1 output node model. As a result, the IGL-ANN should be scalable for extremely large data sets with significant improvements in test time/resources. In terms of algorithmic performance, this may be a performance enhancement improvement of the type that is rarely seen.

Fully Interconnected Layers

The 2-input 1-output architecture discussed so far, where each layer combines two nodes from the previous layer in a regularized row and column reduction methodology, is highly desirable, especially for image recognition. This is because in images, the neighboring pixel values are usually related to each other, since the adjacent pixels represent part of an associated object within the image.

Some input data may have neighboring values unrelated to each other, such as classification data for medical patients for a particular illness or condition. In these and other types of data sets, every data set item may be related (or not) to every other item in the data set.

To explore the relationships between non-adjacent pixels in an input data set, further embodiments of IGL-ANN sections can be implemented to include so-called fully interconnected layers. Unlike the normally connected IGL-ANN layers discussed above, a fully interconnected layer has a node to accommodate every possible combination of nodes in the previous layer (or at least a significant portion of such combinations).

It will be appreciated that a fully interconnected layer will result in an explosion in the number of respective connections within the IGL-ANN. Nonetheless, such interconnections may be useful for certain types of data and problems of a certain complexity. This also shows the flexibility of the IGL-ANN design since different architectures can be chosen in addition to the highly performance oriented 2-to-1 layer to layer node connection protocol.

Figure 23A:
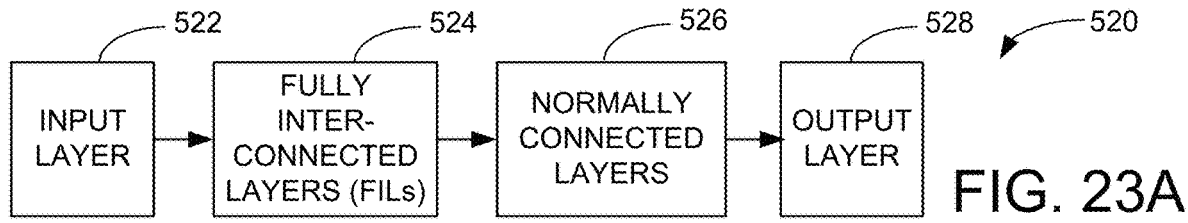
FIG. 23A is a functional block diagram of a hybrid IGL-ANN section with one or more fully interconnected layers (FILs) in further embodiments.

FIG. 23A shows an example IGL-ANN 520 with input layer 522, one or more fully interconnected layers (FILs) 524, one or more normally connected layers 526, and an output layer 528. The FILs 524 can be placed substantially anywhere within the hybrid IGL-ANN 520, including immediately adjacent the input or closer to the output.

It is contemplated that, in many cases, it may be advantageous to place the FIL nearer to the input data, but for performance reasons it may be advisable to move the FIL farther up the architecture (e.g., Layer 4-5, etc.). Multiple FILs can also be used, each having one or more normally connected layers in between to reduce the impact (node explosion) from multiple successive fully interconnected layers. This flexibility will allow the system designer flexibility in solving specific problems.

Figure 23B:
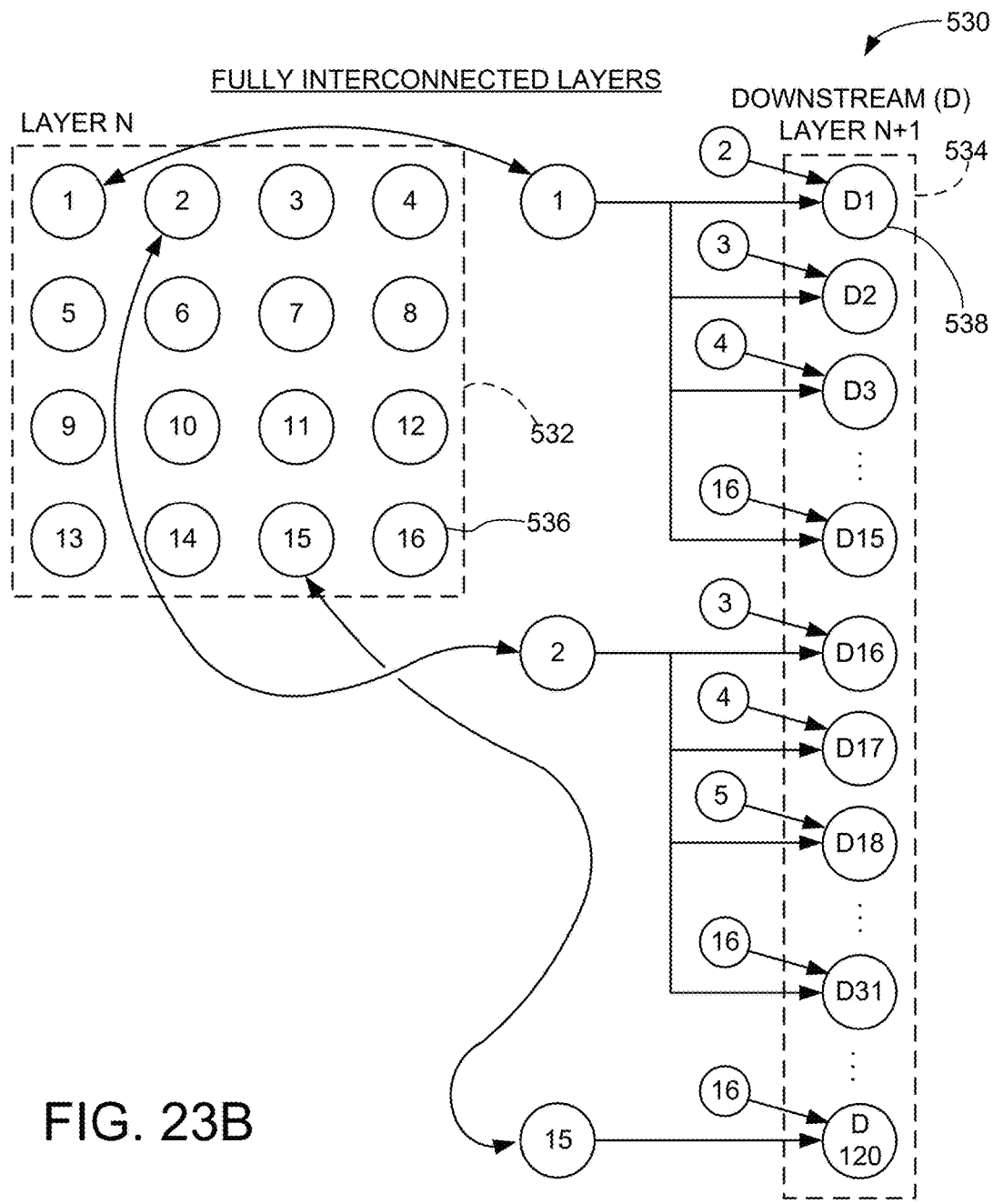
FIG. 23B is a schematic depiction of an FIL arrangement from FIG. 23A in some embodiments.

FIG. 23B shows a similar system 530 with FILs including an upstream Layer N 532 and a downstream (D) Layer N+1 534. In this simplified example, upstream Layer N has a total of 16 nodes 536 identified as Nodes 1-16. Downstream Layer N+1 534 has a total of 120 nodes 538 identified as Nodes D1-D120.

The formula for determining the total number of nodes DN in a downstream layer for an upstream layer with N nodes can be stated as $$DN=(N)(N-1)/2 \quad (10)$$

In this case, N=16 so DN=120. It can be seen that, in order to accommodate every combination of the 16 nodes 536 in Layer N, Node 1 is connected to each of the remaining Nodes 2-16; Node 2 is connected to each of the remaining Nodes 3-16; and so on down to Node 15, which is connected to Node 16 (for a total of 120 combinations/nodes).

Chain isolation optimization techniques as described herein can still be used, with the caveat that optimizing the parameters (B, W1, W2) for the interconnected nodes necessarily requires a larger subset of nodes that will need to be recalculated as well. For example, to assess a parametric change to Node 1 in Layer N, the impacts upon each of the DN nodes D1-15 in Layer N+1, as well as the chains of these nodes to the output layer, will need to be calculated.

Nonetheless, a single chain path still extends from Node 1 in Layer N to the final output layer Y, it is just that there are multiple subpaths along the single chain path through the downstream Layer N+1 which will subsequently converge. Otherwise, the same chain isolation optimization techniques can still be carried out as before, and will be significantly faster than existing gradient descent based backpropagation.

Software Modeling and Visualization Tool

It will be appreciated based on the discussion thus far that significant caching of values can take place during the temporary adjustment of nodes in the various chains. In some embodiments, each node in a given IGL-ANN section has a data structure maintained in memory that includes (among others) the following variables:

W1←permanent value
W2←permanent value
Bias←permanent value
tW1←temporary value for the node under investigation
tW2←temporary value for the node under investigation
tBias←temporary value for the node under investigation
y(1 to batch count)←temporary y values for the nodes in the "chain"
c_Y(1 to batch count)←cached values to be restored if necessary
Ytest←test output value Other values may be stored for each node as well, and multiple values for each of the above variables may be accumulated. To provide a simplified example, a given training data set may have 1000 examples. A batch size is configured as a subset of the training data set (but the batch size may be the same size as the training data set size). Learning takes place on a batch basis as discussed above.

After a particular batch is completed, a new batch is selected and more learning takes place. While a single pass is carried out on each batch, in alternative embodiments, multiple passes can be carried out on each batch. For example, a batch of 100 training items (examples) might be selected at random from the data set of 1000. Some dataset items can appear twice, or more, or not at all.

Assuming a batch size of 100, training starts by calculating all the 100 y(1 to batch count) values (on each node) based on feed forward through permanent W1, W2, and Bias values, with the training data inputs for each respective batch example (1 to 100). Each node has its own values for y(1 to batch count), but the most important ones are the values at the last node in the network, since those are the overall predictions for each of the training items.

Once all the y(i) values (i here is "index" into the batch set—1 to 100) are calculated for each node, then the chaining can begin. A node is selected at random in the network for evaluation. All of the nodes can be selected in turn, but it has been determined that selecting only a small percentage, such as 2%-5%, is sufficient. This is discussed more fully below.

Each node has stored in memory its respective y(i) values for each batch training example. For the random node that is selected, the first step is to "cache" all of the y(i) output values for itself and all the other nodes all the way up the chain until the output node. That is what the c_Y(i) array values allow. The "c" here stands for "cache". In the software module discussed below, a "copy memory" function which is extremely fast.

All of the existing values in y(i) for each node are instantly copied to the c_Y(i) values. Then for the node under investigation, the parameter values use temporary values tW1, tW2, tBias which are adjusted in a set number of attempts up to a maximum value. However, if a sufficiently great enough error reduction is found, those values are retained and the node processing exits. This could be experienced during the first try, the last try, or at any point in between. As noted above, some examples provide 35 different combinations of parameter values (e.g., all of the various combinations in the table of FIG. 7A plus other various combinations). It will be noted that the foregoing (up to) 35 combinations are tried for each item in the batch.

If the node evaluation completes all of the passes without error improvement, the cached values c_Y(i) are restored to the Y(i) values along the chain. Assuming values for tW1, tW2, and tBias were found that reduce the error, at that point tW1, tW2, and tBias would be copied to W1, W2, and Bias, respectively, and these would become the updated permanent values. At this point another node would be chosen for the chaining optimization techniques and the preceding steps repeated for the new node.

In further embodiments, one method used to check for error reductions is to pass up on the node under investigation, using tW1, tW2, and tBias. Note that only the node under investigation uses the "t" values for tW1, tW2, tBias; all the other nodes in the chain use the permanent W1, W2, and Bias values. The values for y(i) can be passed up for each node in the chain, for training example in the batch (i=1 to batch count), and the error is calculated for that respective example at the output node.

The sum of all of the errors across the batch is the error that is compared to the best previous error (from the prior node). An attractive performance gain here is that if an error reduction is found, the current values for y(i) simply stay in place. If not, the cached values are a "memcopy" away on each node to be restored along the chain all the way up to the output node.

With regard to the random selection of nodes, since the quantity of nodes varies tremendously by layer (for example, Layer 1 may have 10,000 nodes, whereas Layer 21 may only have 16 nodes, etc.), a random selection function can be used that weights the selection of nodes in relation to the number of nodes in each layer. This can be accomplished by calculating the cumulative percentages of each successive layer up to a maximum value of 1. If a random 0 to 1 selection is less than the threshold of the next layer up, that layer is chosen. The respective node row and column can just be randomly chosen from their maximum value multiplied by a random number 0 to 1. Other techniques can be alternatively used. Regardless, the random selection of nodes for evaluation will help ensure the node adjustments tend to be spread out evenly across all of the nodes.

In another randomization approach, a list can be maintained of selected nodes such that previously selected nodes are not selected again until all (or some selected percentage) of other nodes in a given layer have been selected. Another approach can be to flag a selected node that has been adjusted, and to not make further adjustments to that node after a certain total number of adjustments have been made (including a single adjustment). Other mechanisms can be used to ensure a full distribution of node evaluations take place.

These and other aspects of the chain isolation optimization training can be carried out using a software modeling and visualization tool 540 constructed and operated in accordance with some embodiments. The tool 540 represents software program instructions stored in a memory and used to generate and train an IGL-ANN. Other mechanisms can be used so the tool is merely exemplary and is not limiting.

The tool 540 includes three main operational modules: a modeling module 542, a controller module 544 and a viewer module 546. The modeling module 542 generally operates as a user interface and front end processor to set up a network for training. To this end, the module 542 can include a user interface I/F block 548, a parameter selection and configuration (params) block 550, and a model generator 552.

While not limiting, in some embodiments a particular IGL-ANN will be generated responsive to an analysis of the input data set. To this end, external data, also stored in a computer memory, can include an IGL-ANN node data set 554, a training data set 556 and a test data set 558. The block 554 represents the IGL-ANN itself (in software form) along with the various temporary and other cached values described above.

The training data set 556 can take any number of forms (including but not limited to the aforementioned MNIST or GTSRB data sets). The test data set 558 may also be related to the training data, but represents pristine data that the system has not yet seen. In other words, in some testing schemes it is common to train a particular ANN using training data, and then once training has been optimized, present data that the system has never seen before to see how the system performs.

Significantly, IGL-ANN sections configured and trained as disclosed herein have tended to provide output test data success rates that are higher than the final training data success rates. That is, once a final error value has been determined on the training data, the final error value for the subsequently applied test data is better, not worse.

The controller 544 provides overall control of the system during modeling, training and subsequent operation. To this end, the controller 544 includes an analysis engine 560, a scheduler 562 and a batch manager 564. The viewer module 546 reports the progress and results of the operation of the IGL-ANN, including various optional graphical and heat map based displays as well as more traditional reporting functions. To this end, the viewer provides back end processing capabilities including an operating system (OS) API block 566 to call functionality supplied by a host OS as required, a color manager 568 to assign and track various color assignments as discussed below, and a display 570 to provide output in a visible or other suitable form (e.g., database, etc.).

Figure 24:
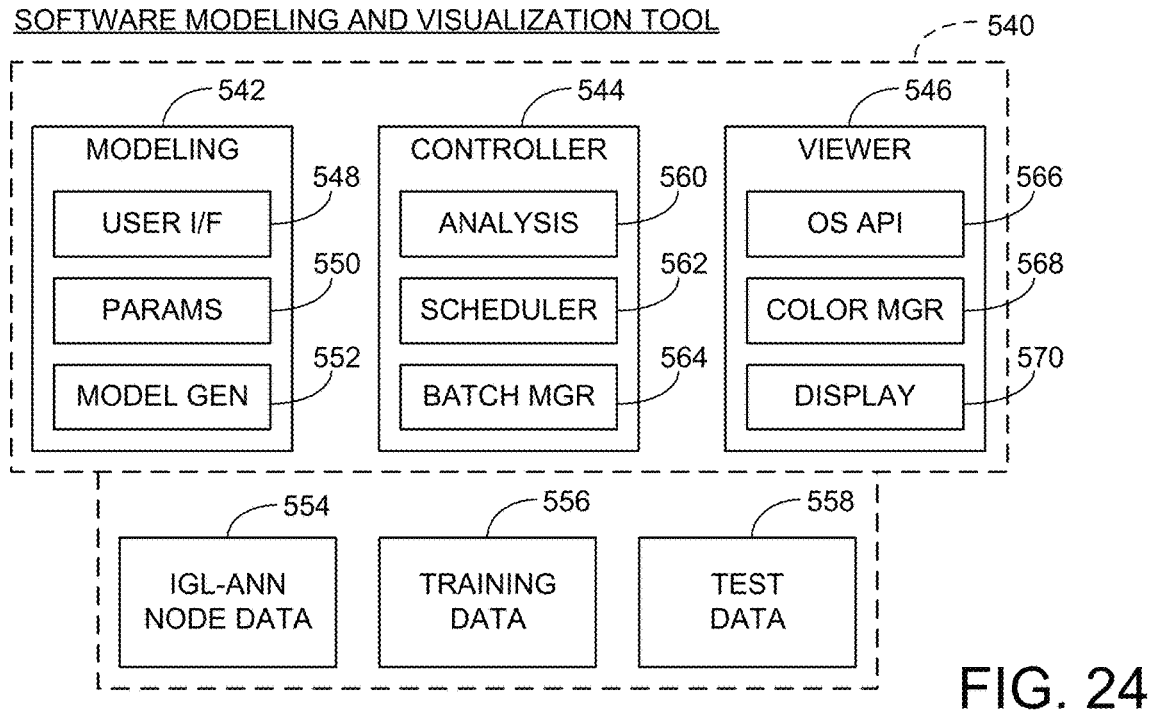
FIG. 24 is a functional block representation of a software modeling and visualization tool in some embodiments.
Figure 25:
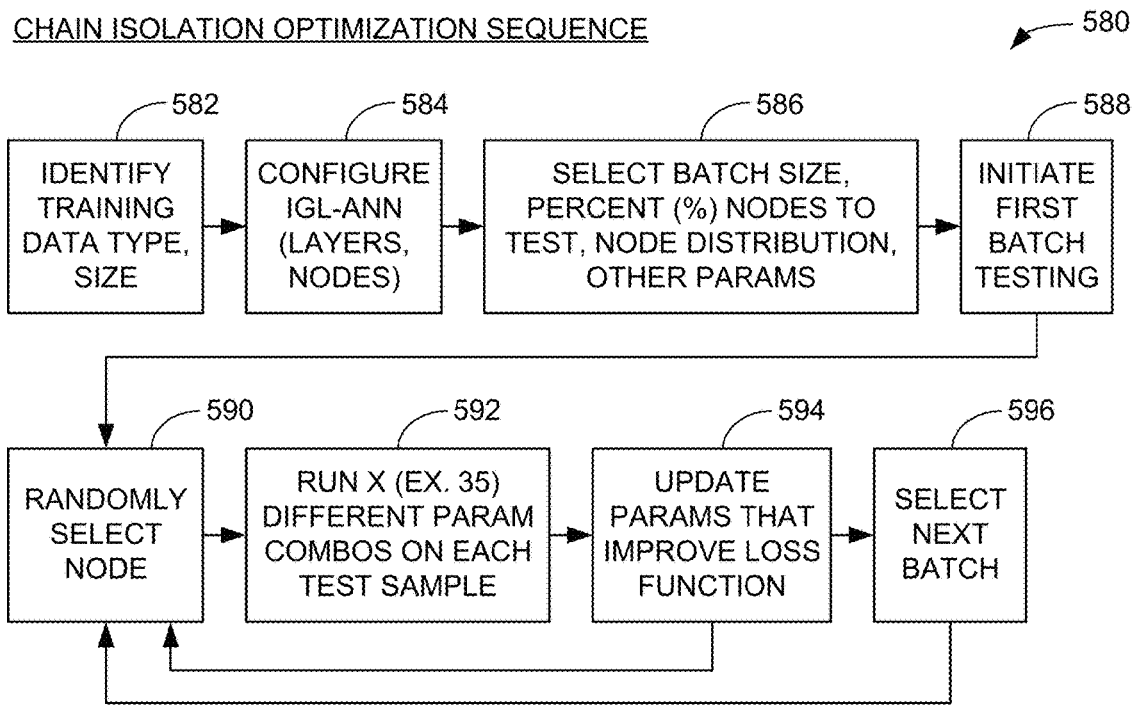
FIG. 25 shows a sequence diagram for a chain isolation optimization process carried out by the tool of FIG. 24 in some embodiments.

FIG. 25 is a revisited chain isolation optimization sequence 580 to expand upon the prior discussion of chain isolation optimization above, including that provided with reference to FIGS. 9-10. The sequence 580 is contemplated as being carried out using the tool 540 from FIG. 24, but such is not necessarily required. For brevity, previously discussed aspects will not be described again in detail.

It is contemplated albeit not necessarily required that the routine operates to build, train and prepare for subsequent use an IGL-ANN. To this end, block 582 commences by identifying various requirements of the system, including the nature, type and extent of the training data set (e.g., 566, FIG. 24). Based on these and other parameters, an IGL-ANN is initially constructed (in this case, in software). This will include the number and sizes of the respective layers, the interconnection strategy, the total number of nodes, whether convolutional filters, fully interconnected node layers, dummy nodes, etc. will be required, and so on. In some cases, selection alternatives may be presented to the user via the interface block 548 (FIG. 24) to make particular selections and adjustments to the model.

Using the MNIST data set as an example, it will be recalled that the data set provides images for 10 different characters in an 28×28 array of pixels for each character. These factors may result in a 10 stage configuration to separately detect each possible output (0-9), and some number of input values in the first layer to select how the scanning may take place (e.g., vertically, horizontally, etc.). In some cases, the first layer may be selected to have multiple sets of nodes that map the same input data (such as a 4-quadrant arrangement) to further emphasize parallel processing through the network.

As noted above, substantially any numbers of layers and nodes per layer can be selected. By way of illustration, commonly deployed models for the MNIST data set have typically had from 10-14 layers in each section. The tool 540 can be configured in some embodiments to allow the designer to specifically set the total number and set of layers, or the system can do so automatically. Other arrangements are suitable and can be used.

Further selections are made at block 586, including batch size, percent (%) nodes to test during each batch, node selection and distribution strategies, initial values for the various nodes, as well as other parameters as required. As noted above, one particularly useful approach is to take the entirety of the MNIST data set (60,000 training images and 10,000 test images) and divide these so that 50,000 images from the training data are used for batch runs and the remaining 10,000 images are used as an intermediary test at the end of every 10th batch (or some other value). The 10,000 test images are held in reserve and only used at the end.

In this approach, a batch size of 10,000 randomly selected images from the pool of 50,000 may be selected for each batch, with flagged images (incorrectly characterized) during a given batch fed forward and included in the next batch. With regard to initialization, random parameters (B, W1, B2) work well, but it has been found useful to instead set all of the nodes with initial parameters corresponding to the weighted sum setting (e.g., (1, 0.5, 0.5)).

As noted above, the total number of nodes to be tested during each batch is selected. While all of the nodes can be selected and evaluated in turn, it has been found that as few as 2% of the nodes can provide rapid convergence in error rate, with 4% being another particularly useful value in some cases. It will be appreciated that evaluating and testing only a relatively small subset of the overall node count greatly accelerates the process.

Other parameters can include various error thresholds, the type of error forced function processing desired (such as EEF described above), the total number of batches to run, etc. If parallel processing is applied, further assignments can be made such as assigning each stage (character) to a different processor core, etc. All of these and other system configurations may be carried out via the user interface or via other means.

At block 588, the first batch is selected and processed. During such processing, for each of the 10,000 images selected for that batch, a node is randomly selected at 590, and a total of X various combinations (such as 35 combinations) are applied to the selected node at block 592. Values are updated for the nodes along the associated chain (see e.g., FIG. 9) and if an improved set of parameters is located, these are implemented (block 594). This processing is carried out for the selected node for all of the images in the batch, after which a new node is selected, the foregoing processing is repeated, and this continues until the total number of nodes (e.g., 4%, etc.) have been adjusted. At this point, the 10,000 reserved training set images can be applied to determine an updated Yout error value, and the next batch is selected at block 596.

Figures 26A, 26B:
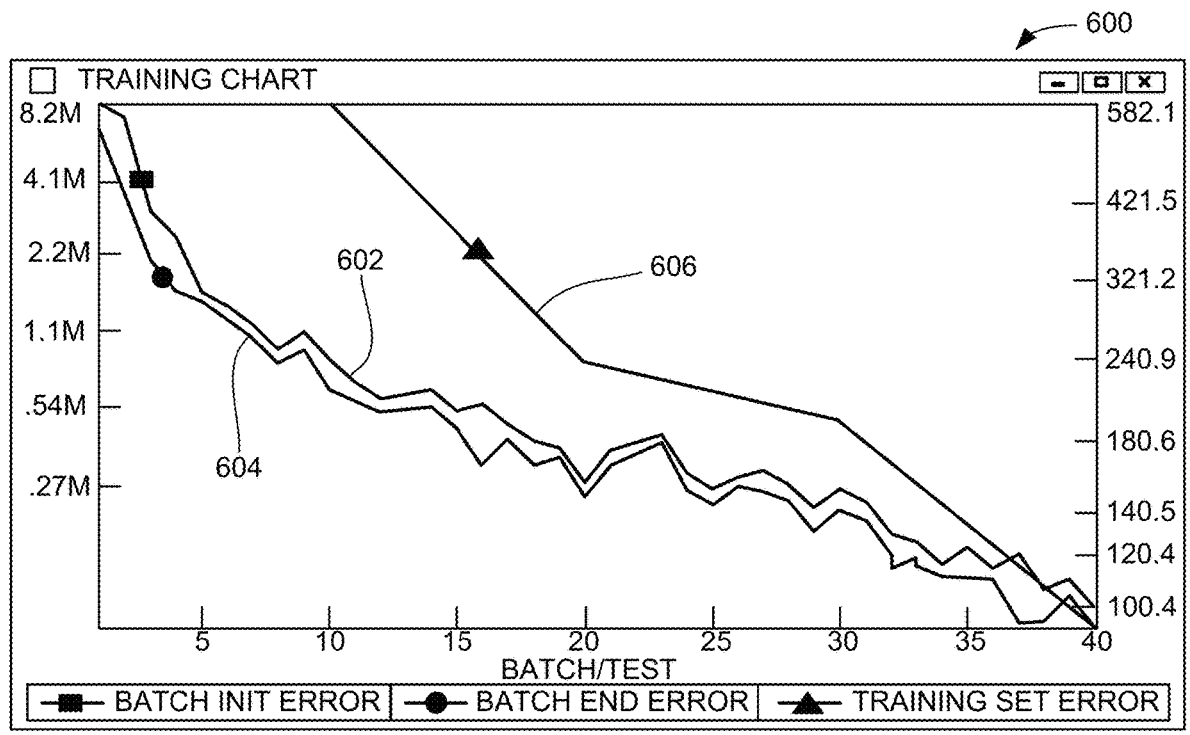
FIG. 26A is a table showing a configuration for an example IGL-ANN configured and trained using the processing sequence of FIG. 25.
FIG. 26B is a graphical representation of error rate data obtained from the processing sequence of FIG. 25 in some embodiments.

FIG. 26A shows a table for an exemplary IGL-ANN configured using the tool 540 of FIG. 24 and the sequence 580 in FIG. 25 in some embodiments for the MNIST data set. In this example, a 14-layer configuration was selected with 12,587 nodes arranged as shown.

FIG. 26B is a graphical depiction 600 of ongoing improvements in error rates during testing. These are updated and available in real time during the training process via the viewer module 546 in FIG. 24. Batch numbers are represented along the horizontal axis (a total of 40 batches have been processed at this point), and error rates are shown along logarithmic bounding vertical axes (expressed in raw numbers, not percentages).

Curve 602 represents the beginning error rate at the start of each batch, and curve 604 represents the ending error rate. The vertical distance between curves 602, 604 shows the improvement during that particular batch processing. Curve 606 shows overall improvement at the end of every 10 batches. The system has demonstrated convergence to very low error rates (98-99%) over a short interval (from a matter of minutes to a couple of hours).

Figure 26C:
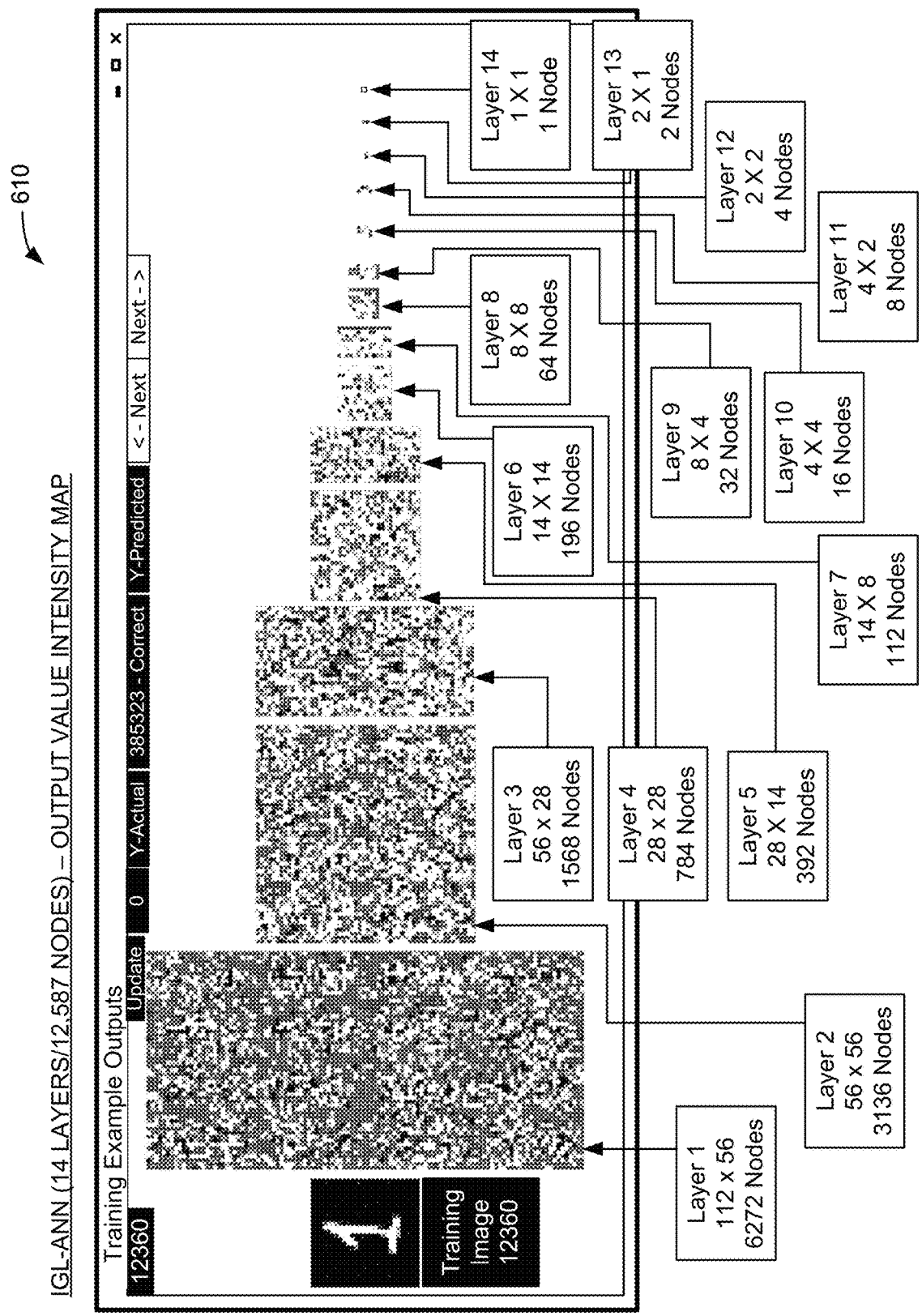
FIG. 26C shows a graphical depiction of the example IGL-ANN from FIG. 26A during a training operation.

FIG. 26C is a graphical depiction 610 of the network from FIG. 26A during operation. In this case, a (gray-scale) heat map type display is shown for each of the 14 layers arrayed from an input (evaluating an image of a "1"). The intensity of the output is normally represented in color in relation to the magnitude of the respective output values (Y1) from the associated nodes in each layer. The largely uniform density of colors indicates the spread processing nature of the evaluation. An advantage of the IGL-ANN sections as described herein is that the internal states and operations of the nodes can be displayed and monitored in real time (or near-real time).

Figure 27A:
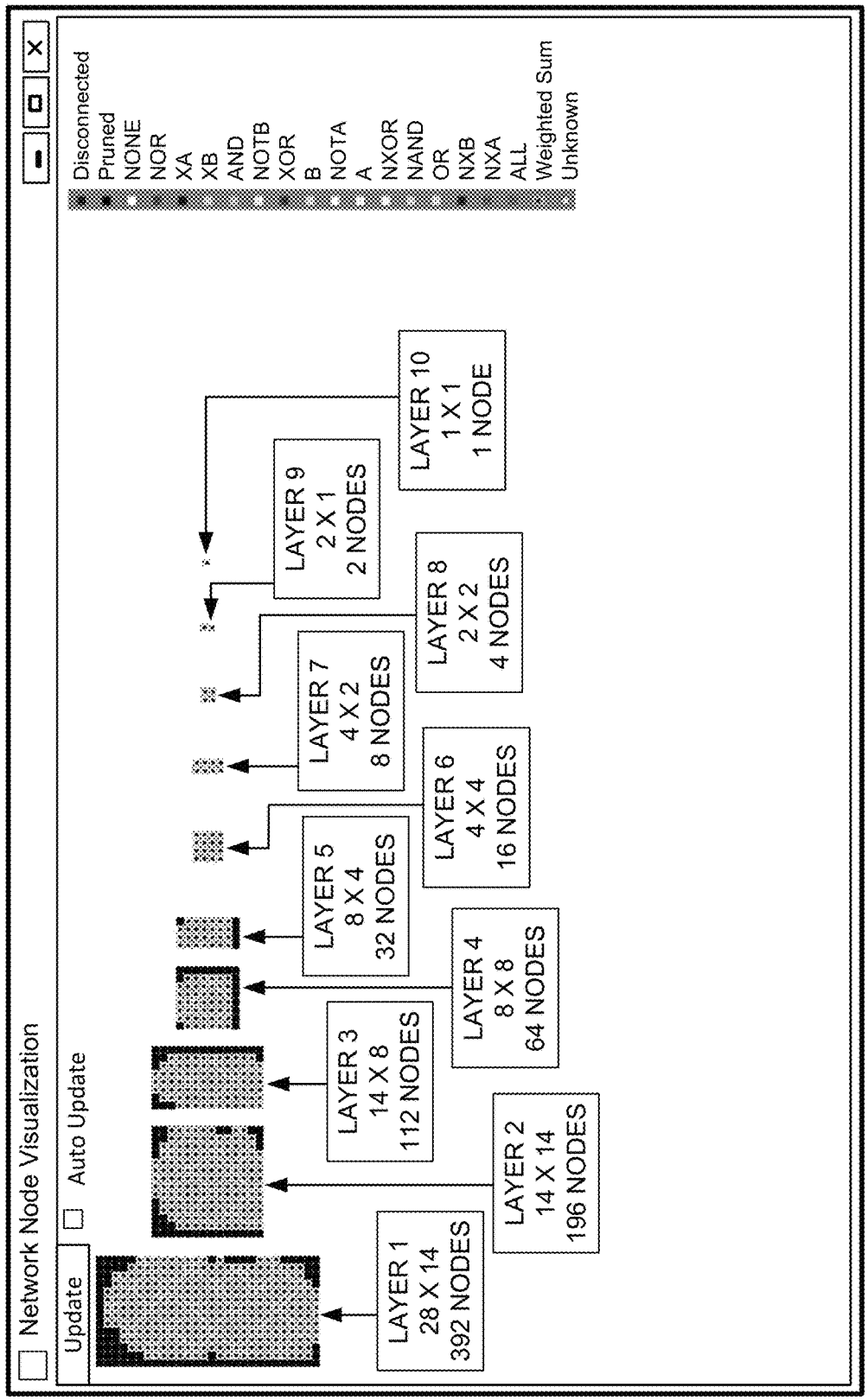
FIG. 27A is a graphical depiction of another example IGL-ANN configured using the sequence of FIG. 25 in an initialized state.

FIG. 27A is another graphical depiction 620 of another AGL-ANN section configured using the tool 540 and sequence 580 discussed above. As before, the network is configured to process the MNIST data set. However, in this case, only 10 layers and 819 nodes are used. While this network is significantly smaller than the network discussed in FIGS. 26A-26C, extremely fast conversion rates were nonetheless observed.

Of particular interest is the fact that the representation 620 in FIG. 27A is the initialized network prior to training. The darker pixels in the first five layers (Layers 1-5) represent pruned nodes. This analysis may be initially carried out by the tool 540 by analyzing the entire training set in relation to the configured network and automatically pruning the unnecessary nodes.

Figure 27B:
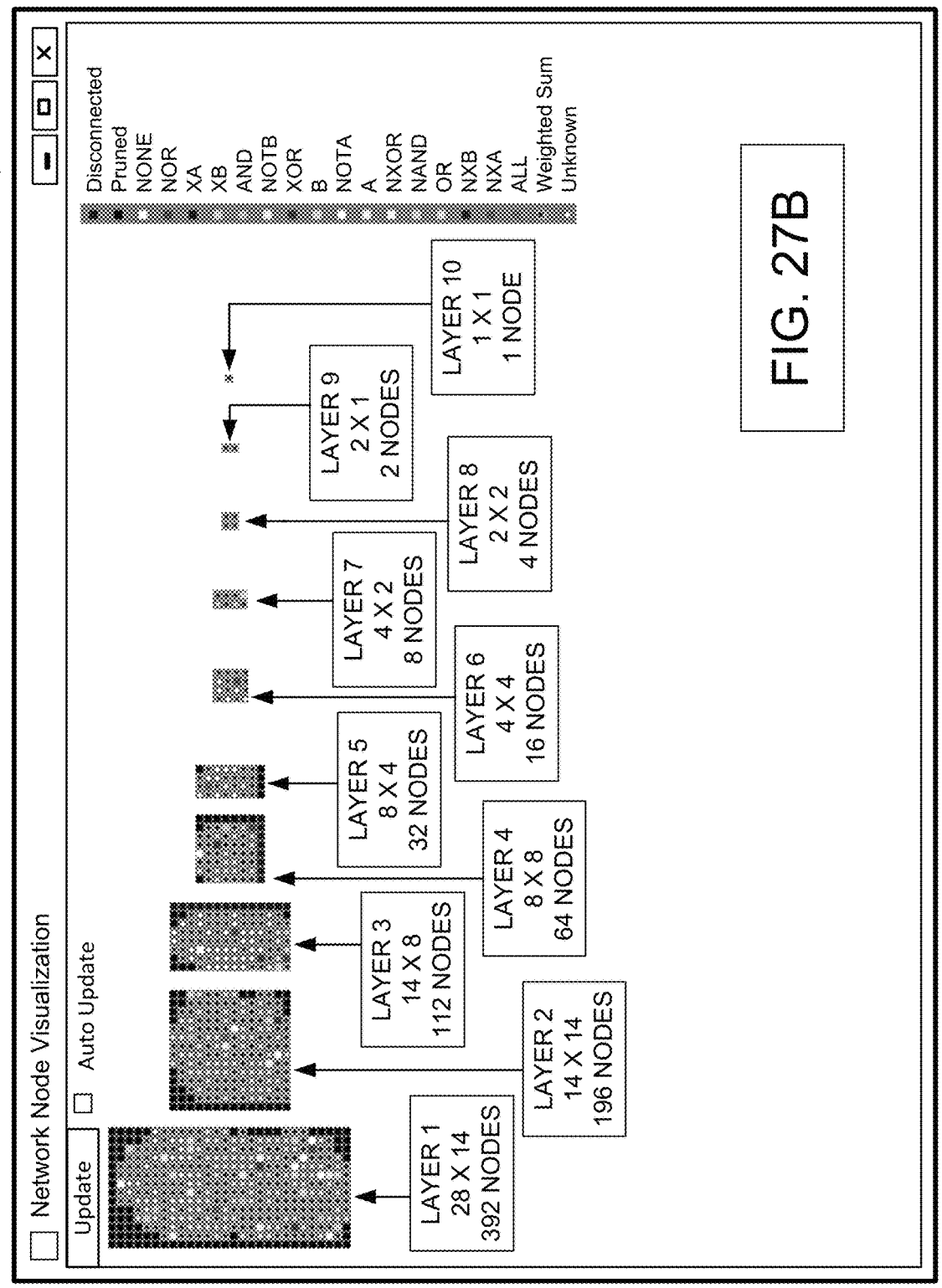
FIG. 27B shows the IGL-ANN from FIG. 27A during ongoing training.

FIG. 27B is a corresponding graphical depiction 630 of the same network from FIG. 27A at an intermediate stage of the training process. This provides a heat map type display with the respective nodes categorized by gate logic type. That is, based on color intensity the various Boolean logic functions of Table 7A are identified (as well as near-Boolean nodes). A large percentage are unknown, meaning that the respective parameters (B, W1, W2) do not easily map to any of the parametric combinations in FIG. 7A.

This graphically enables the designer to monitor the progress of the training process and determine the distribution and flow of the data through the layers. A grouping or concentration of activity can provide useful insights into subsequent designs with adjustments to address problem areas.

Figure 28A:
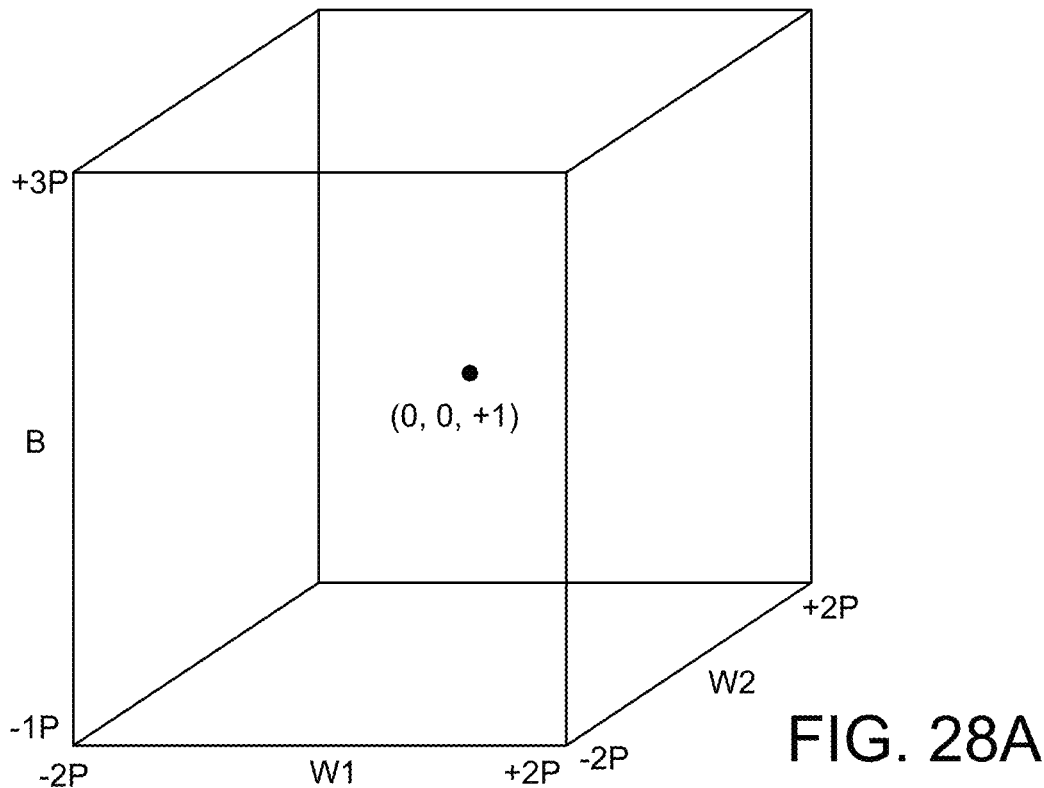
FIGS. 28A and 28B show respective representations of another example IGL-ANN during initialization and during ongoing training in further embodiments.
Figure 28B:
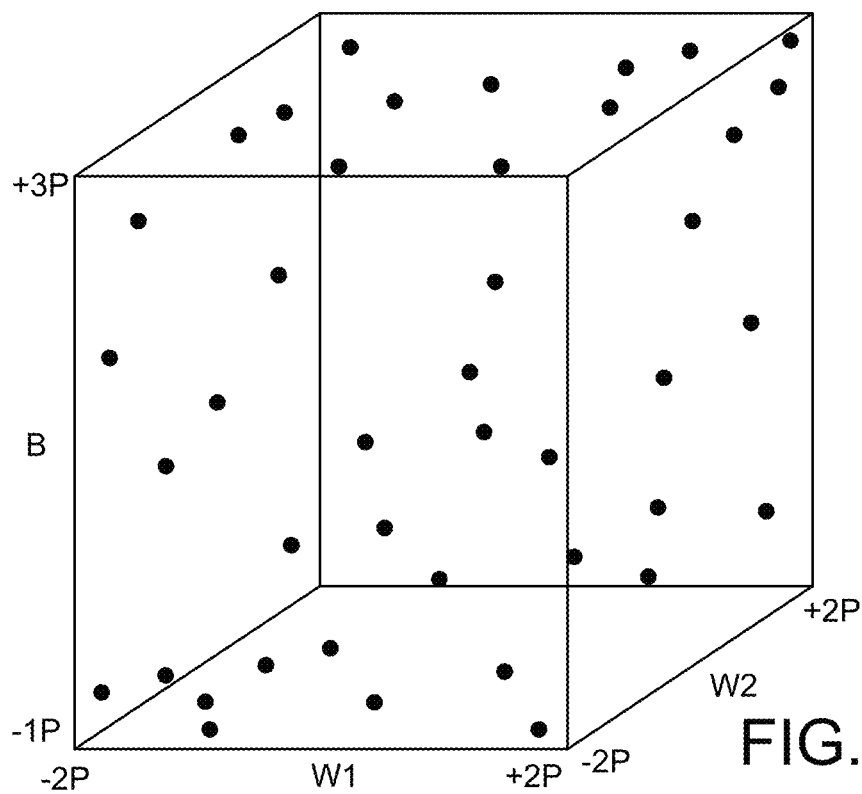

FIGS. 28A and 28B show another graphical representation that can be made of the data from a selected IGL-ANN during training and subsequent operation. FIG. 28A shows a 3D map of the parameter values (B, W1, W2) with the initial settings prior to training, and FIG. 28B shows a corresponding map of these values during training. The ranges for the parameters are discussed above in FIG. 7 and associated table. As noted previously, all of the nodes in the network are set to initial values of W1=0, W2=0 and B=1 (NULL) in this example (see FIG. 28). Other initialization states can be used, including randomly assigned values.

System Integration

Figure 29:
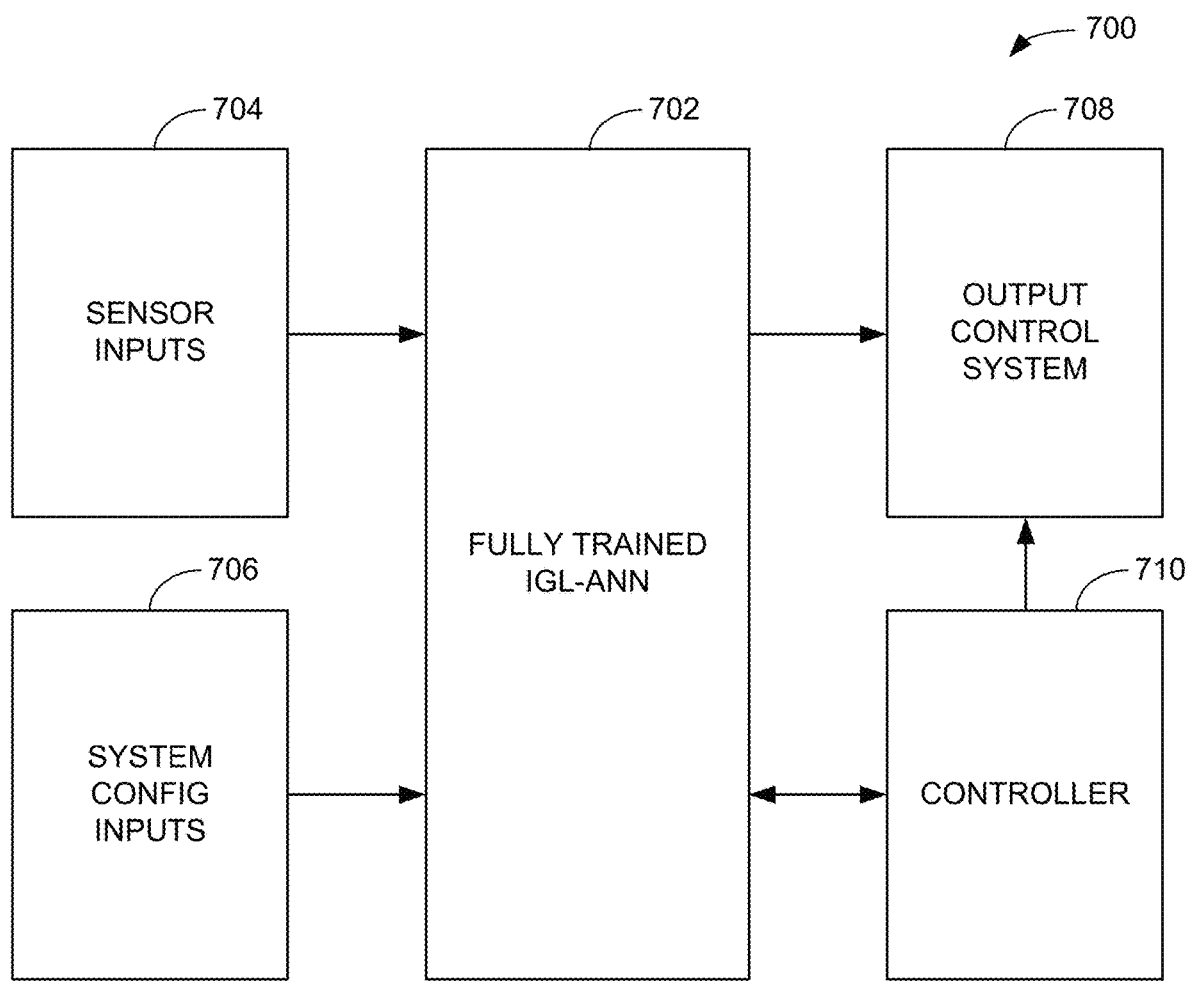
FIG. 29 shows a functional block diagram of a system that incorporates a fully trained IGL-ANN in accordance with further embodiments.

FIG. 29 is a functional block representation of a system 700 that can incorporate a fully trained IGL-ANN as described above. The system 700 can take substantially any desired form of ML based application including but not limited to an autonomous vehicle (e.g., self-driving car, autonomous UAV, robot, etc.), a transformer model or other element of a large language model (LLM) system, a text-to-speech (TTS) or speech-to-text (STT) system, a generative AI system (text, audio, visual or other outputs), a guidance system, a target identification and tracking system, a monitoring and control system, a forecasting model, a personal assistant type application, a consumer product, a computer OS or application (app), and so on.

The system 700 includes a fully trained IGL-ANN 702 that may be realized in hardware, software, firmware or a combination thereof and trained including as described above. The IGL-ANN 702 can be configured to operate responsive to inputs supplied from various sensors 704 as well as other system configuration inputs 706. An output control system 708 may use the outputs of the IGL-ANN 702 to provide various actions as required. A controller 710 provides top level control.

The IGL-ANN can be trained "in-place" (e.g., as part of the overall system 700 using suitable training data) or "pre-trained" and installed in production units. Continuous or subsequent training modes can be enacted, as can periodic updates of parameters in an efficient and effective manner.

Checkpoint Training Through Ratcheting Thresholds

Further embodiments of the present disclosure provide a checkpoint training routine that utilizes ratcheting thresholds to reduce loss function error. This mechanism further assists in driving the finally trained model to a final target error level (e.g., 99% or greater, etc.) by reducing the tendency of the converging model to oscillate about certain setpoints during the training process.

Figure 30A:
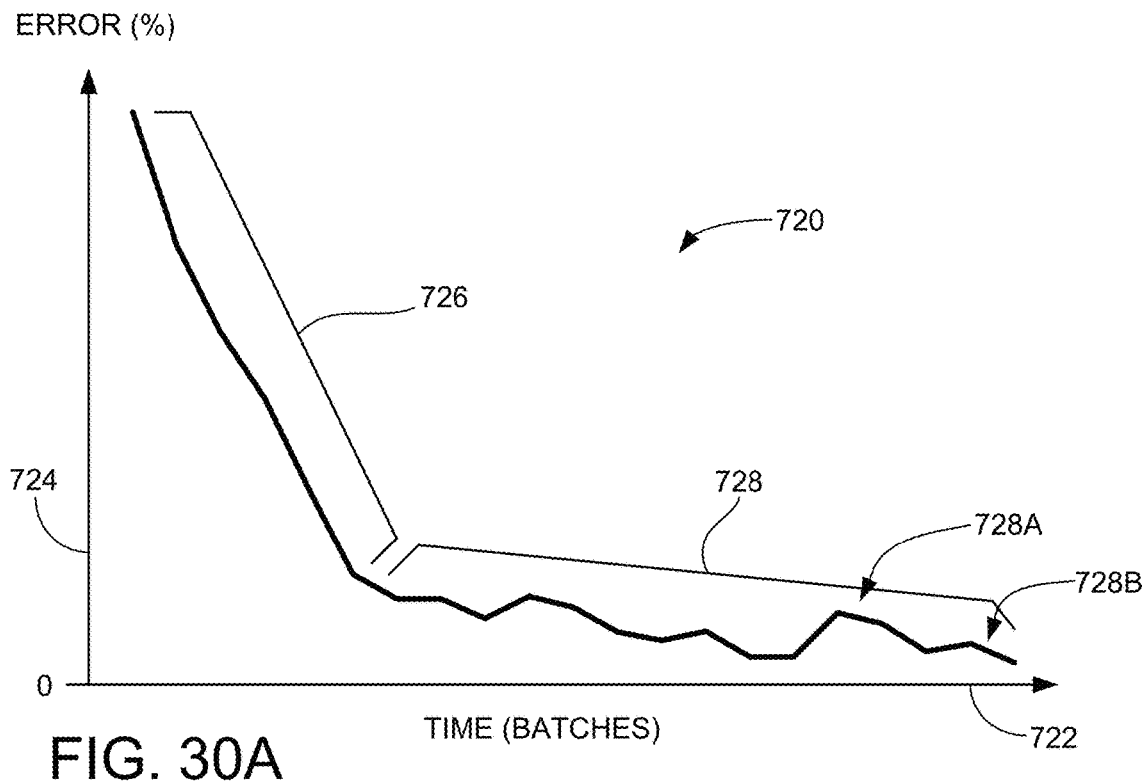
FIGS. 30A and 30B provide graphical representations of loss function (error) convergence curves in accordance with further embodiments of the present disclosure.

FIG. 30A is a graphical representation of an example training set error convergence curve 720. The curve 720 generally represents the reduction in error of a given IGL-ANN section such as those discussed above. The curve 720 is plotted against a horizontal x-axis 722 showing elapsed time in terms of processing batches of training data, and a vertical y-axis 724 showing error in terms of percentage. For this simplified example, the curve has been normalized to drive toward a very small error amount, such as equal to or close to 0% (e.g., approaching 100% accuracy).

The calculation of the curve 720 can be carried out in a variety of ways, so that no one particular approach is required. In some cases, the curve 720 can be updated based on the final observed error rate at the end of every X batches, such as described above in FIG. 26B. The curve 720 can additionally or alternatively be updated based on a test data set run on separate data held aside for this purpose at the end of every X batches. Regardless of how the curve is determined, it will reflect an accurate indication of the current training and performance state of the model.

As is typical with convergence curves generated by the various embodiments disclosed herein, the curve 720 tends to have an initial portion (section 726) in which the error drops rapidly, followed by a subsequent portion (section 728) where additional, extended effort may be required to drive the error to the final level. As noted above, the IGL-ANN models often exhibit rapid convergence to a first level (e.g., 97-98% corresponding to about 2-3% error), after which further gains are achieved at a lower rate. During this lower level processing, the overall error rate can temporarily increase at times, such as generally illustrated by subsection 728A in FIG. 30A, before continuing to improve, as generally illustrated by subsection 728B.

Figure 30B:
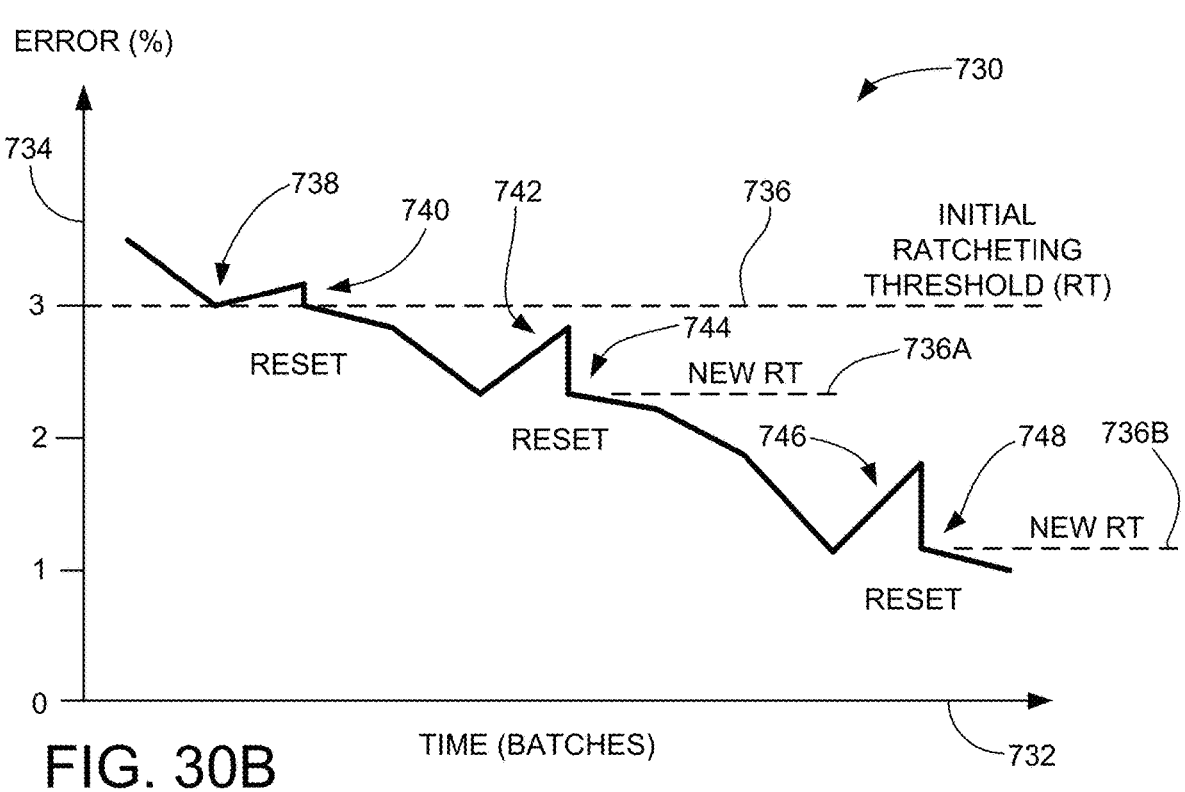

Accordingly, FIG. 30B shows another training set error convergence curve 730 similar to the convergence curve 720 in FIG. 30A. The curve 730 is also plotted against a horizontal x-axis 732 corresponding to elapsed time/batches and a vertical y-axis 734 corresponding to error percentage.

An initial ratcheting threshold (RT) is denoted by broken line 736 in FIG. 30B. This RT line can be any suitable value near this break point in convergence, and may be heuristically or empirically determined. In the example of FIG. 30B, the RT line 736 is nominally set equal to an accuracy of 97% (e.g., error rate of nominally 3%). Other values can be used so this is merely exemplary and is not limiting.

A checkpoint ratcheting process is initiated once the curve reaches the RT line. A snapshot of all of the node parameter values (e.g, B, W1, W2) is collected and stored in memory to provide a checkpoint, or reset, at which the system can be subsequently restored as needed.

After a suitable number of iterations (such as X=10 batches), the system evaluates the training set error. If the error has increased above the RT line 736, the previous training is jettisoned and the previous snapshot of (the then-best existing) parameters are reloaded and used. As new gains are obtained, a new RT line (e.g., 736A, 736B) is used and a new snapshot of improved parameters are stored and used. In this way, the system "ratchets down" and keeps the previous gains while eliminating the commonly observed meandering about some intermediate level of accuracy. This technique has been found to power through these oscillatory sections in the training response and quickly achieve levels above 99%.

Returning to FIG. 30B, the curve 730 reaches the RT line 736 at point 738. From this point forward, a slight increase in error rate is observed, leading to a reset of the node parameter values at transition 740. If a first subset of nodes were selected during this training interval, the adjustments provided to this first subset of nodes are immediately erased, the old values are restored, and the system continues with a new, second subset of nodes that are selected for the next training interval. It is noted that each batch run may use a different set of training examples and a new combination of nodes, so it is to be expected that increases in error rate may occur from time to time.

Continuing with a review of FIG. 30B, the system continues to improve until portion 742 is encountered which provides a new section of the curve 730 with an increased error rate. As before, the settings made during this interval are jettisoned. However, because a new improved threshold was achieved at the beginning of section 742, the parameters at this point (the best yet) are captured in an updated snapshot 744, and a new corresponding RT line 736A is established.

A second ratcheting occurs at portion 746. A second checkpoint is established using a new snapshot and RT line 736B. The error curve is reset to this level at 748, and the system continues. While not shown in FIG. 30B, further gains are accumulated as needed to continue to drive the final error to the target level (or total number of batches run).

Figure 31:
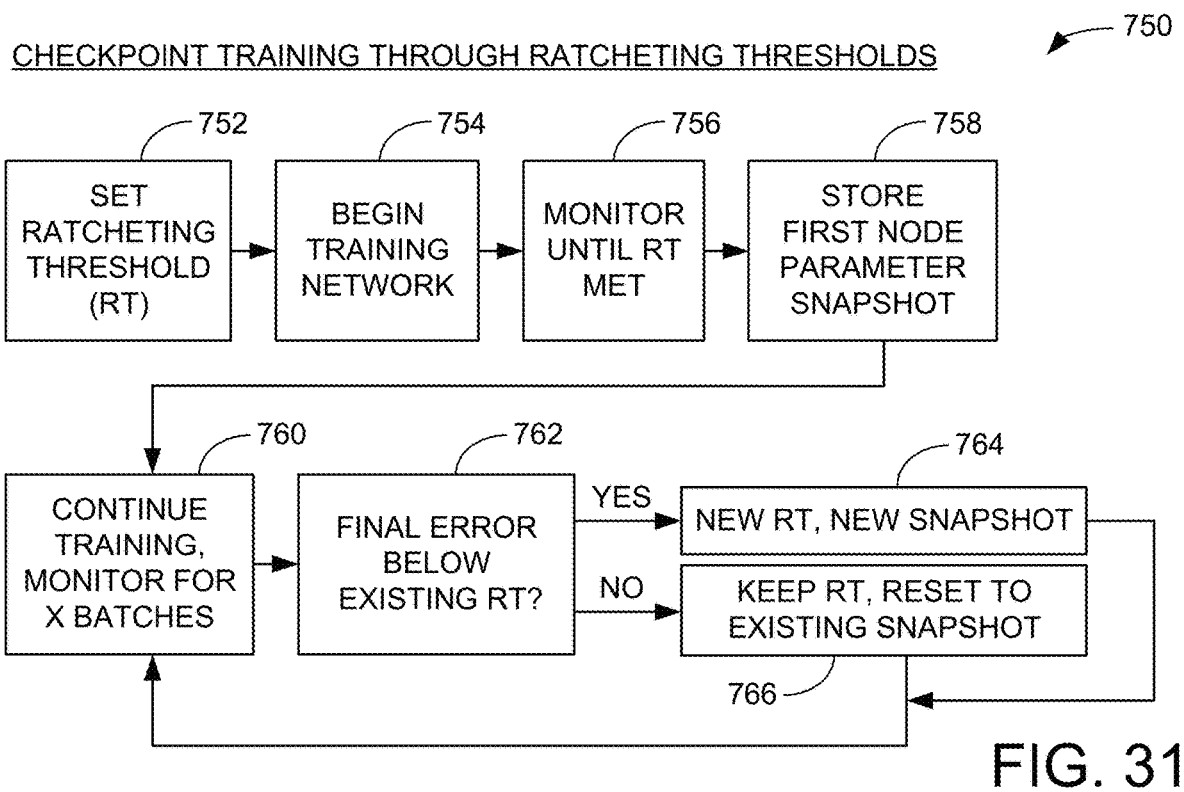
FIG. 31 is a sequence diagram for a ratcheting threshold training process carried out in accordance with further embodiments.

FIG. 31 provides a schematic diagram for a checkpoint training process 750 to summarize the foregoing discussion. The process 750 is merely exemplary and is not limiting, so alternative configurations are contemplated.

As shown by FIG. 31, an initial ratcheting threshold (RT) level is selected at block 752. This was set at 97% accuracy (3% error) in FIG. 30B. The network commences with training at block 754. This may involve the chain isolation processing described above as well such as node pruning, batch learning scheduling, random node sampling, enhanced error function processing, etc.

A suitable metric for the error rate convergence is selected and monitored during the network training, block 756. At such time that the selected RT value is reached, a first node parameter snapshot is identified and temporarily stored to memory at block 758.

The training of the network continues at block 760. At suitable intervals, such as every X batches, a determination is made at block 762 to evaluate whether the final error is below the existing RT value. To eliminate oscillations or other undesired system response, the rate at which such measurements are made can vary. In some cases, smoothing windows, averages or other values can be utilized to make the necessary determination. In still further cases, gains are required to be above a certain improvement interval before setting a new checkpoint.

If the system has exhibited improved performance to a sufficient degree, the flow passes from block 762 to block 764 where a new checkpoint is established through the setting of a new threshold RT value and the accumulation and storage of a new parameter set snapshot. On the other hand, if worse performance, or at least insufficiently improved performance is observed, the flow passes from block 762 to block 766 where the same RT value is retained and the parameter values in the existing snapshot are reloaded. The system then returns for further processing until the final desired training level is achieved.

In further embodiments, the resets can be scheduled at a selected rate, so that some selected first percentage of the time (X %) the system is incrementally adjusted, and the remaining second percentage of the time ((100-X %) the system is reset. In further embodiments, the choice of adjustment or initialization can be set to be completely random (e.g., 50-50%) when a given node is selected for learning. This approach has been found to be extremely suitable for fast convergence performance.

Figure 32:
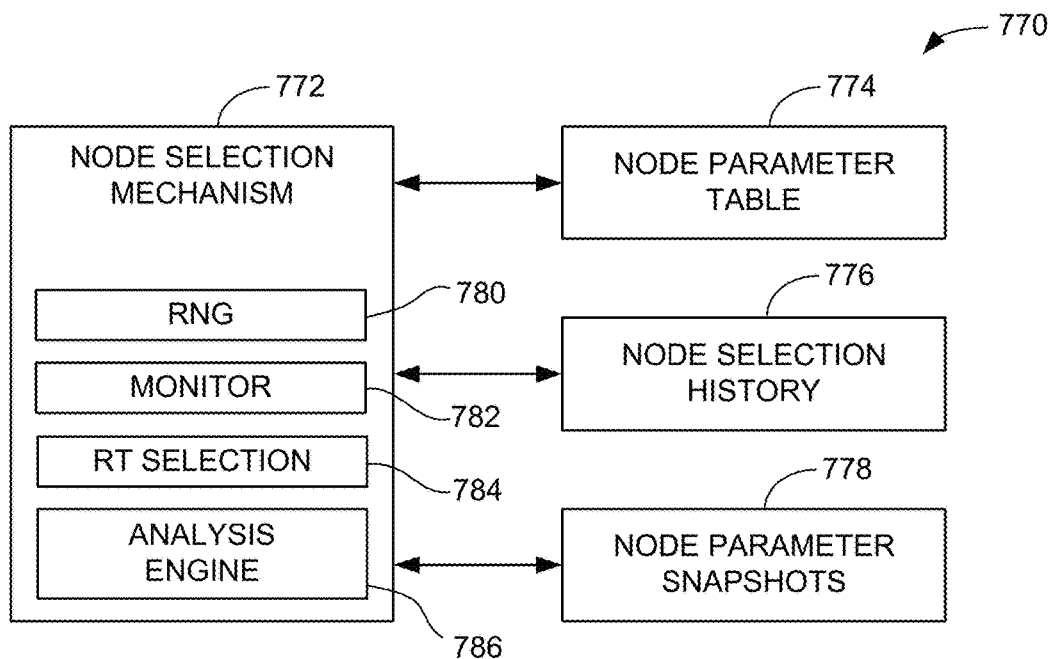
FIG. 32 shows a data processing system configured to carry out the process of FIG. 31 in accordance with further embodiments.

FIG. 32 provides a functional block representation of a processing system 770 in accordance with further embodiments to implement the processing of FIG. 31. As before, the system 770 can be incorporated into the controller aspects of a given IGL-ANN and can be realized in hardware, software, firmware, etc. The system 770 includes a node selection mechanism 772 that interacts with various data structures stored in memory including a node parameter table 774, a node selection history list 776 and various node parameter snapshots 778.

The node parameter table 784 represents the IGL-ANN parameter settings for the various nodes, and may be arranged as described above. The selection history tracks which nodes have been selected for training, which nodes have been trained (and if necessary, how many times), which nodes are still pending selection, and so on. If and when resets take place, this history can be accumulated as well. The node parameter snapshots 778 comprise a sequence of the various parameter settings (e.g., snapshots of the node parameter table 774 at appropriate times). Multiple snapshots at different checkpoints can be maintained. These values can further be used during subsequent analysis for improved future training sessions.

The node selection mechanism 772 performs the overall processing to select the nodes for training. While not necessarily required, as noted above a statistical sampling of the nodes can be selected each time so that less than all of the nodes are trained during a batch or run of batches. The percentage of nodes may be 5% or less in at least some cases. Random selections can be performed using an RNG (random number generator) source 780. A monitor circuit 782 provides top level monitoring, including implementation of the various checkpoints. An RT selection circuit 784 implements each new level of thresholding as required. An analysis engine 786 performs data analyses and implements/updates the various data structures 774, 776 and 778.

In some embodiments, a script of 50 different parameter settings (e.g., different combinations of the B, W1 and W2 parameters) is generated and used during each training pass for each node. These can include the various mode settings in the table of FIG. 7A, as well as various incremental values. In some cases, the adjustments are relative, such as increasing or decreasing a given parameter value by a selected interval (e.g., +/-10%, etc.) to allow fast convergence of the settings for the particular node under test.

Other numbers of parameter combinations can be applied such as 20, 60, 100, or some other suitable number. If a sufficiently acceptable improvement in the output error is observed for a given set of parameters, those parameter values are saved for future use, further adjustments to that node are aborted, and the system moves on to the next node for evaluation and adjustment. If at the end of the testing of a given node none of the adjustments provided improved error performance, the previously used set of parameter values are reloaded for continued use by that node. It may be common to have nodes that are evaluated and no parameter adjustments are made for those nodes during a particular batch run.

In further embodiments, random parameter settings may be applied. The system can maintain random number tables with both constant probability (e.g., white noise) distributions and gaussian (or other function) distributions of the random numbers. These tables can be consulted to select adjustment increments that can be applied to the parameter values. Both localized (small hill descent) and global (large hill jump) intervals can be tried for different parameter settings. In this way, a node does not get trapped in a local minima, as is often the case with existing systems.

Curve Point (CVPT) Processing

Figure 33:
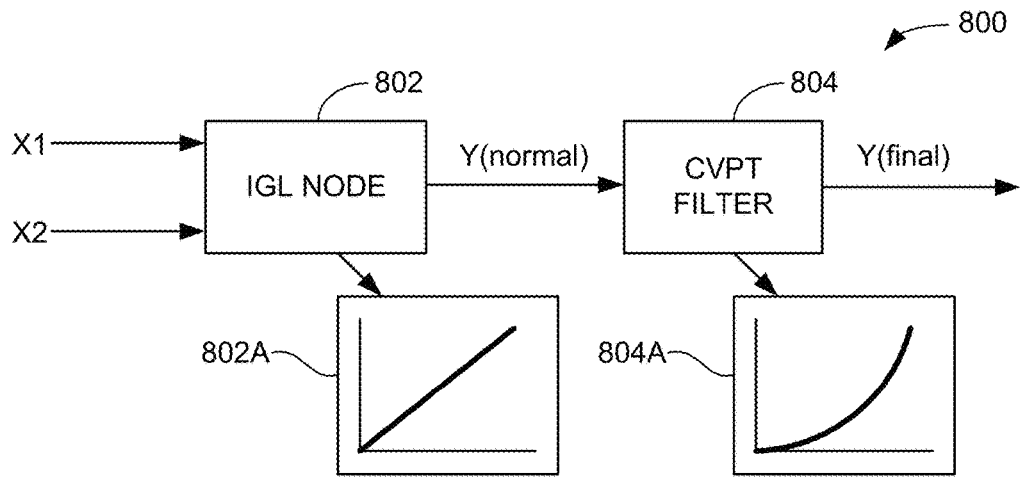
FIG. 33 shows application of curve point (CVPT) processing in accordance with further embodiments.

FIG. 33 shows a functional block representation of another node configuration 800 that can be used in accordance with further embodiments. The node configuration 800 enables the application of so-called "curve point" or "CVPT" processing during a training sequence. Generally, CVPT processing takes place near the end of a model training session when incremental adjustments in the final state of the model are made to provide final tweaks to the model. This technique can be used in addition to or in lieu of the checkpoint processing discussed above.

As shown in FIG. 33, an IGL node 802 has a form similar to that shown in FIG. 5 and processes two inputs X1, X2 to generate a normal output Y (normal). An output CVPT filter 804 is added to the output of the node to provide a final, modified output Y (final). The normal output Y (normal) will have a generally linear output as represented by response block 802A. The final output Y (final) applied by the CVPT filter 804 will have a tailored, non-linear output as generally represented by response block 804A.

The actual response characteristics of the output filter 804 will vary. Every node 802 in a given ANN can be supplied with a CVPT filter 804, or only selected nodes may receive such filtering.

Figures 34A, 34B:
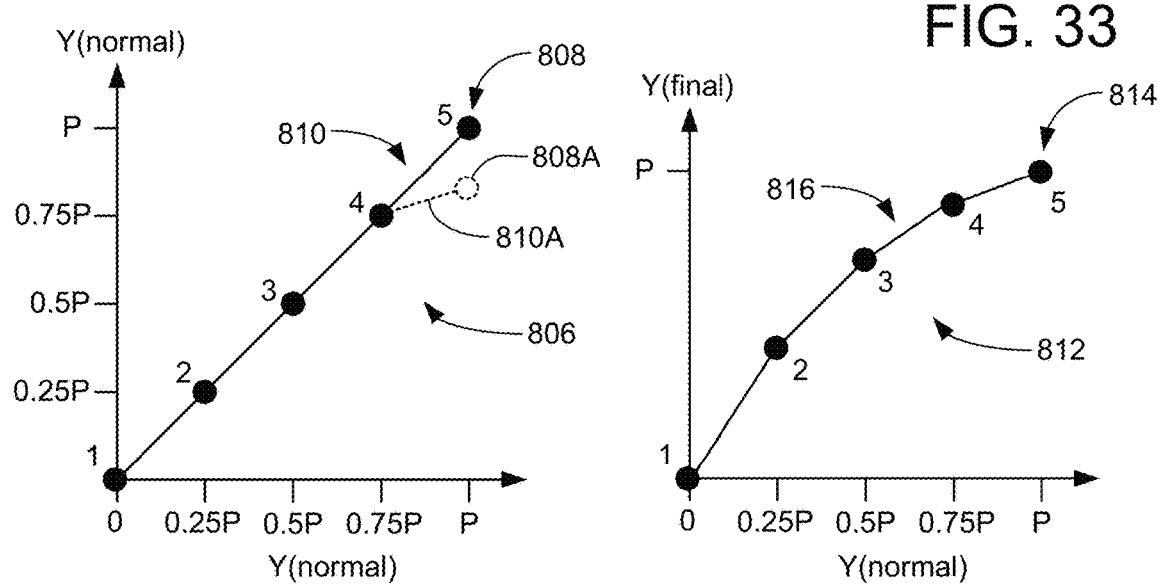
FIGS. 34A and 34B show normal and adjusted CVPT filter responses in some embodiments.

FIG. 34A provides a linear response curve 806 for the Y (normal) output of the standard node 802 in FIG. 33. The curve 806 has five (5) curve points 808 numbered 1 to 5. The curve points 808 define four (4) intervening curve segments 810. In this case, the points are equally spaced and each segment covers 25% of the overall range of outputs by the node.

FIG. 34B shows an adjusted response curve 812 resulting from empirical adjustment to the placement of curve points 814 and segments 816. In this case, both scaling and curvilinear adjustments have been made with respect to the original linear response curve 806 in FIG. 34A. Using an example precision of P=1000, it can be seen that for a Y (normal) value of 1000, the Y (final) value is reduced to some lower value such as around 880. Similar adjustments are shown for other values of Y (normal). Linear interpolation techniques can be used to locate the values along the segments 816 between the adjusted curve points 814, rounding to the next available integer between 0 and 1000 (or other value of P in use).

Figure 35:
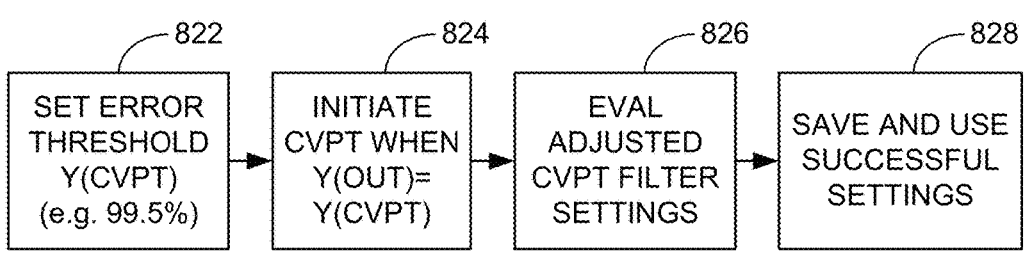
FIG. 35 is a curve point (CVPT) processing sequence carried out in some embodiments.

FIG. 35 shows a CVPT processing sequence 820 representative of steps carried out during a training session to implement the CVPT filtering of FIGS. 33 and 34B. At block 822, an initial error threshold for the entire network is set to a selected value Y (CVPT). Various values can be used, such as 99.5% as shown in FIG. 35. Other values can be used. The CVPT processing is initiated towards the end of the training session once the Y (CVPT) value is reached, block 824.

During CVPT processing (block 826), additional processing is applied to each evaluated node to determine whether adjustments to the output response of the node provide meaningful improvements in the overall error rate performance of the network. Various combinations can be used including scaling (e.g., derating the curve 806 to a maximum value such as 0.9P) and applying a curvilinear adjustment (either convex as in FIG. 34B or concave as in FIG. 33). Localized adjustments to an existing response can be made as well, including segmented adjustments (e.g., adjusted curve point 808A and broken line segment 810A in FIG. 34A).

It has been found that, in many cases, CVPT filtering may have little or no appreciable effect upon the output error. Nevertheless, some nodes may exhibit significantly improved response through the application of CVPT filtering, particularly in high noise environments. As such, CVPT filters such as 804 are implemented for those nodes and thereafter used, as shown by block 828.

Look Up (LU) Tables

The integer math functionality of various embodiments disclosed herein provides further advantages with regard to processing efficiency, namely, the ability to utilize look up (LU) tables in lieu of performing calculations at each node. As will be recognized by those skilled in the art, it can be significantly faster to perform a memory access operation and retrieve a precalculated value from a local memory cell accessible by a processor as compared to utilizing an arithmetic logic unit (ALU) or other circuitry of the processor to cycle through a sequential mathematical operation (e.g., addition, multiplication, etc.).

Figure 36:
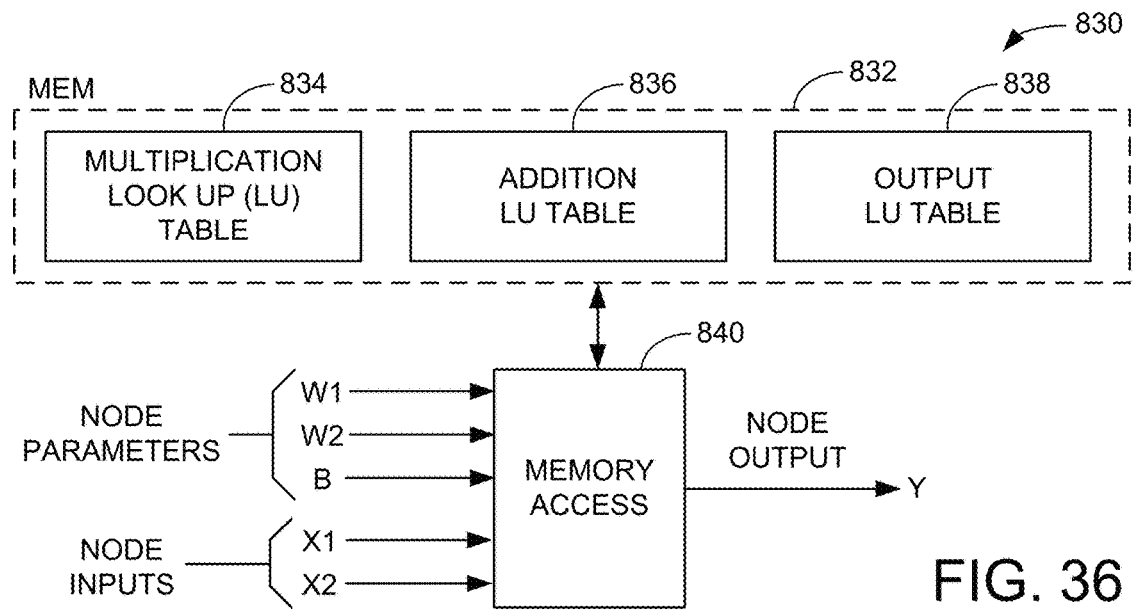
FIG. 36 shows processing circuitry that uses look up tables to generate parametric updates in accordance with further embodiments.

To this end, FIG. 36 shows a table-based computation system 830 that can be utilized in accordance with various embodiments. The system 830 includes local memory 832 with a multiplication LU table 834, an addition LU table 836 and an output LU table 838. These tables, in combination, store every possible calculated value that may be needed by each node in the associated IGL-ANN.

A memory access unit 840, which may be a memory manager or other control circuit of a processor, receives various node parameters (W1, W2, B) and node inputs (X1, X2) for a given node. The memory access unit 840 accesses the respective tables 834, 836 and 838 to output the precalculated Y value for that combination of internal parameters and external inputs.

Referring again to the embodiments of FIGS. 6-7 and equations (1)-(2) above, it will be recalled that the weighted sum WS for a given node may be calculated as the algebraic combination WS=PR1+PR2+B with a first product PR1=X1*W1, a second product PR2=X2*W2, and the bias value B. The calculated weighted sum WS is thereafter applied to the LLO-AF activation function to derive the final output Y such as set forth by Table 3. Each of these various operations can be efficiently pre-calculated and stored for every possible combination of X1, W1, X2, W2, and B.

It will be appreciated that the number of entries for each table will depend upon the precision factor P. Surprisingly, it has been found that, in many cases, a lower value of P (such as P=1000) can provide more than enough resolution to achieve highly accurate modeling. A relatively smaller P value provides improved performance in some cases, since the system does not waste time making small and incremental adjustments that do not provide significant improvements in the overall tuning of the system. Stated another way, it has been found that using a smaller precision value such as P=1000 can result in improved model performance over a larger precision value such as P=1M.

It is theorized that there will likely be an optimum range of precision levels for each model. The various embodiments disclosed herein allow ML designers to select and evaluate different precision levels for a given network to empirically determine a suitable precision level. Indeed, an existing trained network can be subjected to changes in precision level with little or no loss of previously acquired trained knowledge since the existing parameters are scaled, but not lost, if P is adjusted up or down.

Accordingly, the following example will discuss the implementation of the tables 834, 836, 838 in FIG. 36 using a precision level of P=1000. The same techniques can be generally used for any desired value of P.

From FIG. 7, it will be recalled that the maximum range for each of the weight values W1 and W2 is from −2P to +2P. Setting P=1000, each weight value can range from −2000 to +2000, for a total of 4001 different values. The bias value B can range from −1P to +3P, or from −1000 to +3000 for a total of 4001 different values. The weighted sum WS can range from −5P to +7P, or from −5000 to +7,000 for a total of 12,001 different values.

The multiplication LU table 834 in FIG. 36 can be characterized as a node multiply (NM) table that handles both the PR1 (X1*W1) and PR2 (X2*W2) products in turn. Since there are a total of (approximately) 4000 different weight values and (approximately) 1000 different input values, the NM table will have approximately 4M different entries. Using generic table input values of A and B, the table can be addressed as:

$$NM(A,B)=NM(X,W)=NM \text{ (0 to 1000, }-2000 \text{ to } +2000) \quad (11)$$

where the respective X and W inputs serve as indexes into the NM table, and the output is a product value (PR1 or PR2) that is the result of the multiplication of the two input values. The same NM table can be accessed twice in succession to output the respective pre-calculated PR1 (X1*W1) and PR2 (X2*W2) values for a given node.

The addition LU table 836 can be used to store the additive results of two input values generally described as C and D. The two C and D values can be PR1 and PR2, or the sum S=PR1+PR2 and the bias value B. The table 836 can thus be characterized as a node addition (NA) table with the following indexing:

$$NA(C,D)=NA \, (-4000 \text{ to } +4000, -2000 \text{ to } +3000) \quad (12)$$

As before, the respective inputs serve as indexes into the NA table. The NA table can be accessed a first time using C=PR1 and D=PR2 to find the sum value S, and then a second time using C=S and D=B to find the total WS value. Based on the respective possible ranges of values, C can be indexed from −4000 to +4000 (e.g., 8000 total) and D can be indexed from −2000 to +3000 (e.g., 5000 total). This provides a total size for the NA table of 40M entries. Other arrangements can be used.

The weighted sum value WS can thereafter be generated by indexing the following structure in software code:

$$WS=(NA(NA(NM(X1,W1)),NM(X2,W2)),B)) \quad (13)$$

Using the above nested memory access sequence, the memory access unit 840 sequentially accesses the NM table 834 to retrieve the first product PR1 for X1*W1 and the second product PR2 for X2*W2, accesses the NA table 836 to retrieve the sum S of PR1+PR2, and then accesses the NA table 836 again to retrieve the weighted sum WS based on S and the bias value B.

The output table 838 handles the conversion of the calculated weighted sum WS value to the final output Y value for the node. As noted previously in FIG. 7, the output range for WS will be −5000 to +7000 and the output range for the Y value will be from 0 to 1000 (P=1000). The node output (NO) table will thus have 12K (12,000) entries to cover every value of WS, and can be indexed using an input E as:

$$NO(E)=NO(WS)=NO(-5000 \text{ to } +7000) \quad (14)$$

The calculation of Y based on WS is relatively trivial (see Table 3 above), but it still may be operationally faster to configure the NO table to look up the values rather than calculate the values on the fly. Thus, five successive table accesses from local fast memory is all that is required to calculate a new output value Y for a given set of node parameters (W1, W2, B) and node inputs (X1, X2). It is contemplated that this may be orders of magnitude faster than performing the arithmetic calculations using a processor ALU.

Memory requirements are surprisingly modest. Using a precision value of P=1000 allows 12-bit numbers to be used in the first table and 14-bit numbers in the second and third tables, further reducing space requirements. The total memory space can be measured in a few dozen megabytes, MB (such as about 80 MB, etc. although other values can be used based on configuration).

Because every node operates the same way, one set of the tables 834, 836 and 838 can service every single node in an IGL-ANN network irrespective of how many nodes are present in the network, or where the node is located within the network. Thus, some embodiments contemplate the use of a single set of tables that are accessed for every node calculation. Other embodiments supply each processor or group of processors with its own set of tables for use during training and subsequent deployment of the trained model.

Figure 37:
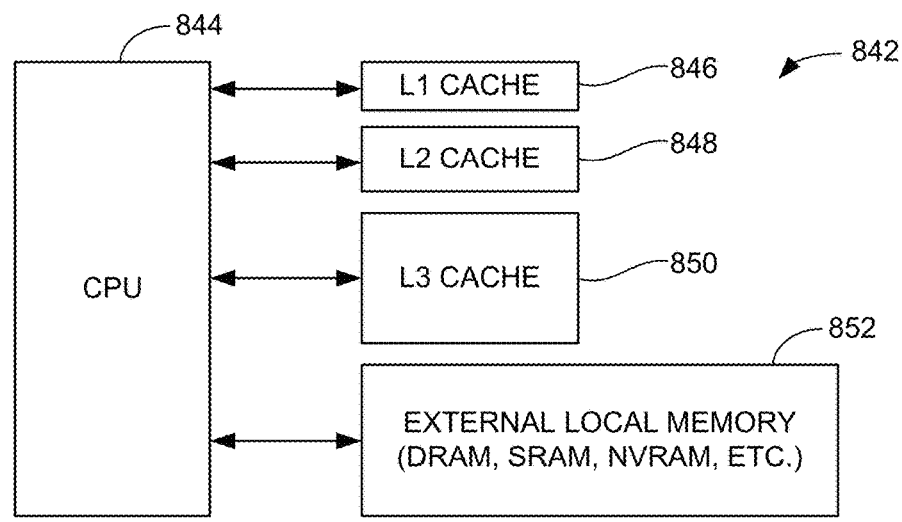
FIG. 37 illustrates a local processor environment that stores and uses the look up tables from FIG. 36 in some embodiments.

FIG. 37 shows a functional block representation of relevant aspects of a processor circuit 842 with a central processing unit (CPU) 844. Various local memory locations include an L1 cache 846, an L2 cache 848, an L3 cache 850, and an external local memory 852. As will be appreciated, the L1, L2 and L3 cache memory may be integrated with the CPU core within the same integrated circuit package, whereas the external memory may be a separate memory device accessible by the CPU 844.

The external memory 852 can take a variety of forms including but not limited to dynamic random access memory (DRAM), static random access memory (SRAM), non-volatile random access memory (NVRAM), or some other form of fast volatile or non-volatile memory. The tables 834, 836 and 838 can be loaded to any of these or other local memories for fast access by the CPU 844. In further embodiments, a specially configured SOC design can provide the necessary on-board memory to accommodate storage of the tables for fast table access.

Figure 38:
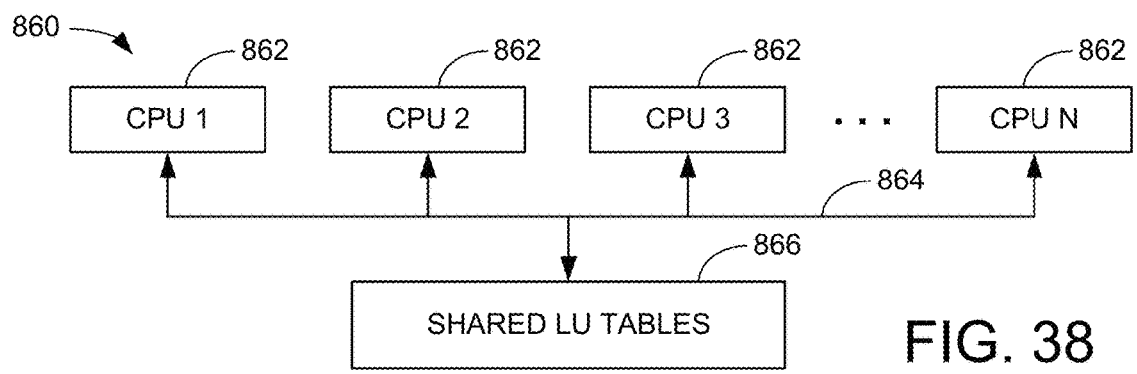
FIG. 38 illustrates a distributed processor environment that stores and uses the look up tables from FIG. 36 in other embodiments.

FIG. 38 shows an alternative configuration for a multi-processor environment 860 with multiple CPUs 862 which are numerically identified as CPU 1 to CPU N. The CPUs access, via a fast internal bus 864, one or more sets of shared LU tables 866. In both the dedicated table embodiment of FIG. 37 and the shared table embodiment of FIG. 38, the determination of a new updated output Y value for a given node will generally take, at most, a relatively small number of processor clock cycles.

It will be noted that the tables 834, 836 and 838 are training tables used during the training of a given network. Once the network is trained, the tables can continue to be used during normal deployed operation by providing another parameter LU table that stores the final parameter values (e.g., W1, W2, B) for each node, and accessing these to calculate the Y output value for each node.

However, in a deployed state the memory requirements for LU table operation can further be reduced since there is no longer a requirement for entries for non-used parameter value combinations. Hence, a smaller set of operational LU tables can be generated based on the actually utilized W1, W2 and B parameter values by the respective nodes in the network. As before, the operational LU tables can be deployed to substantially eliminate mathematical operations during use of the network as well.

It will be appreciated that some mathematical calculations may still be required during training and/or operational deployment of a given network, such as at the output layer level, etc., but such will be significantly minor to the point of being negligible in comparison to the number of operations saved by the use of the LU tables. As such, at least some embodiments presented herein provide an artificial neural network that requires essentially no mathematical calculations to both train and operate the network. This of course would be impractical, if not impossible, for networks of the existing art, particularly those that rely upon backprop calculations during training.

Parallel Processing

Parallelization capabilities of the IGL-ANN have been discussed above. This section will provide additional features that can be utilized to carry out parallel processing in accordance with further embodiments, including but not limited to embodiments that use table-based determinations of updated node values as set forth in FIGS. 36-38.

Figure 39:
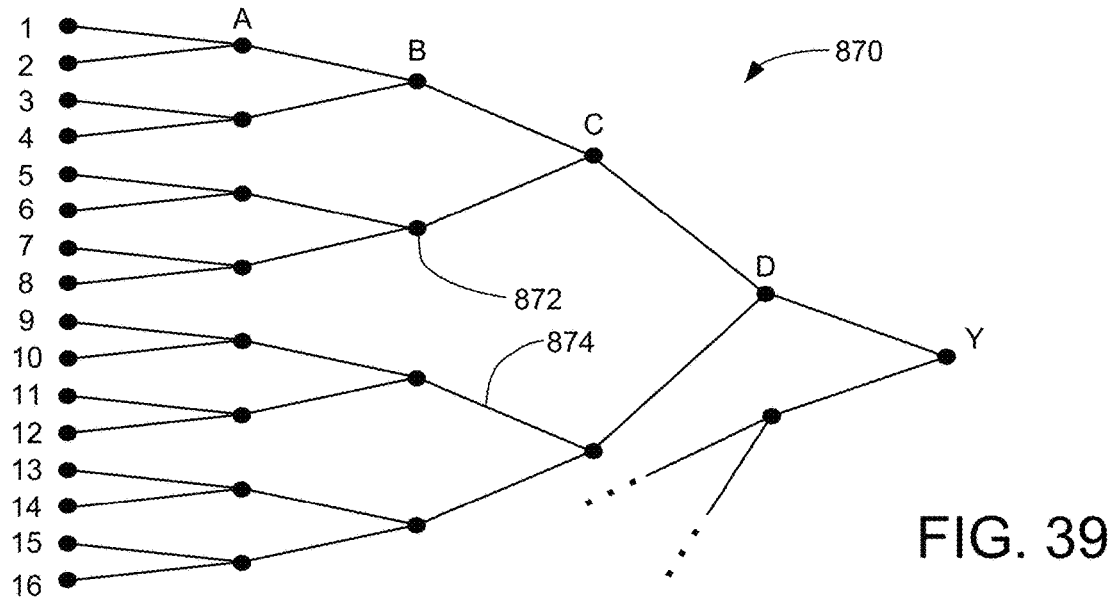
FIG. 39 depicts another IGL-ANN in accordance with further embodiments.

FIG. 39 is a simplified representation of another IGL-ANN (network) 870 formed of IGL nodes 872 and interconnections 874. An upstream input layer is shown to have 16 input nodes numbered 1-16. Additional input nodes are included but omitted from the drawing for clarity. A particular node chain has nodes A, B, C, and D (and output node Y).

It will be appreciated that any number of nodes from any node chain in the network 870 can be processed simultaneously and in parallel by assigning a different node to each processor in a multi-processor GPU or other device (see e.g., FIGS. 19A, 38). Updated sets of parameters can be communicated across the network from one processor to the next as the system converges to a final solution for the network.

Figure 40:
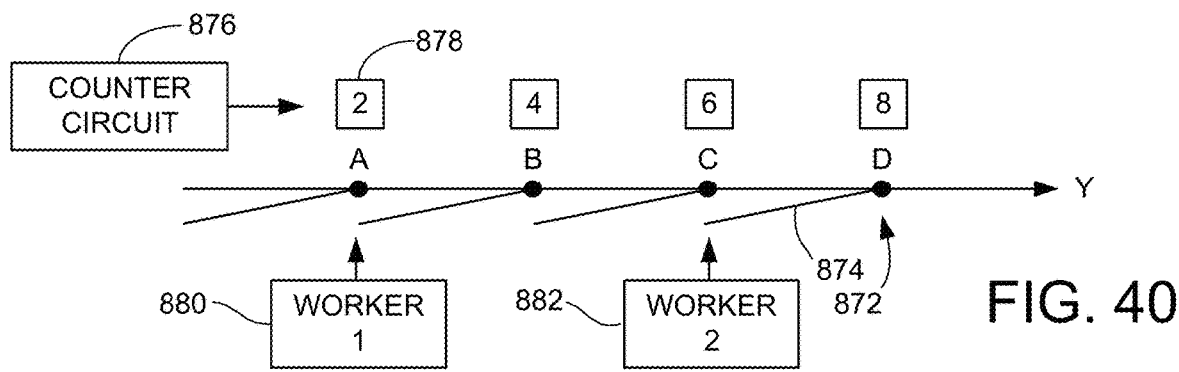
FIG. 40 shows chain isolation optimization using multiple processes along a selected chain path from FIG. 39 in some embodiments.

FIG. 40 provides additional details to handle collision situations where multiple processors are simultaneously evaluating nodes that extend along the same chain. As shown in FIG. 40, a counter circuit 876 maintains a separate update counter 878 for each node in the network 870. The update counters 878 each provide a corresponding updated count value that is selectively incremented each time the associated node has undergone an update in its parameter values and other data (e.g., stored input and output values, etc.).

For the exemplary chain with nodes (A, B, C, D), FIG. 40 shows node A with a counter value of 2, node B has a value of 4, node C has a value of 6 and D has a value of 8. It will be appreciated that these are arbitrary, example values. It is further contemplated that a first processor 880 (referred to as Worker 1) is currently evaluating upstream node A, and a second processor 882 (referred to as Worker 2) is simultaneously evaluating downstream node C.

Worker 1 and Worker 2 are parallel processes attempting to train the node model by updating W1, W2 and B to new values that reduce the error at output Y. When a given Worker begins the evaluation of a selected node, the process makes a temporary copy of the existing node parameters from the selected node forward to the network output, including each forward node's counter value. For example, Worker 1 will store these data for each of nodes A through Y, and Worker 2 will store these data for each of nodes C through Y.

During training, the Worker will update its internal temporary parameter values as it locates improved values. Once a final set of updated parameters is identified and implemented for a selected node, the Worker increments all node counters for the selected node as well as for all downstream nodes along the chain. These actions are taken by both Worker 1 and Worker 2 as updated parameters are implemented.

Figures 41A, 41B:
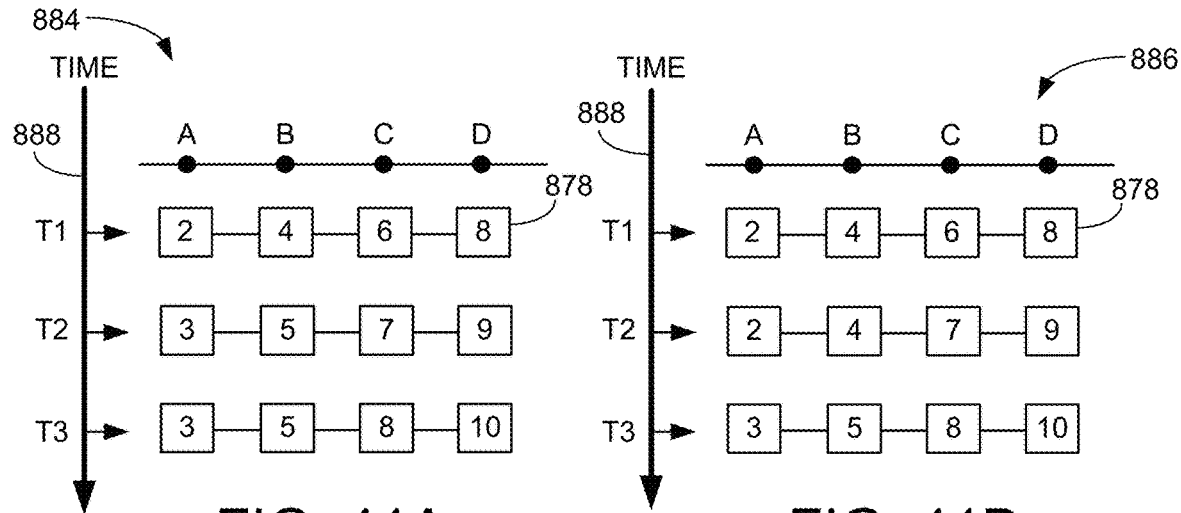
FIGS. 41A and 41B illustrate different sequencing alternatives during the processing of FIG. 40.

Different update sequencing can be required depending on which Worker along a given node chain is the first to locate updated parameters. FIG. 41A shows a first sequence 884 carried out when Worker 1 completes a successful parametric update before Worker 2. FIG. 41B handles a second sequence 886 where Worker 2 completes a successful parametric update before Worker 1. Elapsed time in both cases is represented by vertically extending arrowed line 888.

Starting with FIG. 41A, the initial counter values (2, 4, 6, 8) from FIG. 40 are reflected at elapsed time T1. At time T2, a successful update is located and implemented by Worker 1. Worker 1 updates every counter value so that the counters are now set at (3, 5, 7, 9). Worker 1 also forwards updated Y output values to each of the downstream nodes which are calculated based on the Y output value achieved at node A by the new parameter values. At this point Worker 1 moves on to the next assigned node in the network to evaluate.

At time T3, Worker 2 subsequently discovers and implements a new set of updated parameter values for node C. Worker 2 has been making evaluations based on the previous Y values and other stored values prior to the updates achieved by Worker 1. This is not a problem, however; since Worker 2 is evaluating whether the values are making relative improvements in the calculated output at node Y, the updated values that Worker 2 arrives at will result in even better performance.

As such, Worker 2 determines that its own counter value has been updated by an upstream process because the counter value for node C is higher than before. Based on this knowledge, Worker 2 uses the transferred Y output values rather than the previously stored Y output values and proceeds to forward new Y update values and incremented counter values to all downstream nodes C, D and Y in the chain. At the end of the processing at time T3, the counters are correctly updated to reflect values of (3, 5, 8, 10), and Worker 2 switches to a new node in the network for evaluation.

FIG. 41B operates in a similar manner. As before, the existing counter values (2, 4, 6, 8) are reflected at time T1. At time T2, Worker 2 arrives at updated parameters which are implemented for node C. New Y output values are forwarded and updated counter values are established for nodes C, D and Y. With these updates, the counter values are (2, 4, 7, 9). At time T3, Worker 1 arrives at an updated set of parameters for node A. Worker 1 implements the new parameters, calculates new Y output values, and increments all new counter values for nodes A through Y. This provides the same final counter values at time T3 of (3, 5, 8, 10) as in FIG. 41A.

This technique essentially assures that no collisions or other sequencing events will interrupt or otherwise limit the ability of the system to carry out true parallel processing of the various nodes. Depending on the size of the network, every node in the network (or a subset thereof such as 5% of all the nodes) can be simultaneously evaluated and updated by a different processor at the same time. Updates to nodes along the same node chain can be processed using the foregoing bookkeeping techniques.

It has been reported that current generation ANNs often struggle to achieve consistent GPU processor utilization rates of above around 40% or so. This is because otherwise available processors are idle waiting for upstream processes to complete before the next task can be undertaken. Wait times can include waiting for upstream calculations to be completed, and waiting for all of the nodes in a given layer to be processed before moving on to the processing of the nodes in the next layer in the network.

These and other types of processing delays are particularly prevalent during backpropagation which often requires the offloading of significant amounts of serially performed, matrix based calculations. By contrast, the IGL-ANNs variously embodied herein can consistently achieve processor utilization rates at significantly higher rates (e.g., 80% processor utilization or more), particularly if table-based determinations are made.

Adaptive Threshold Prediction (ATP)

Figure 42:
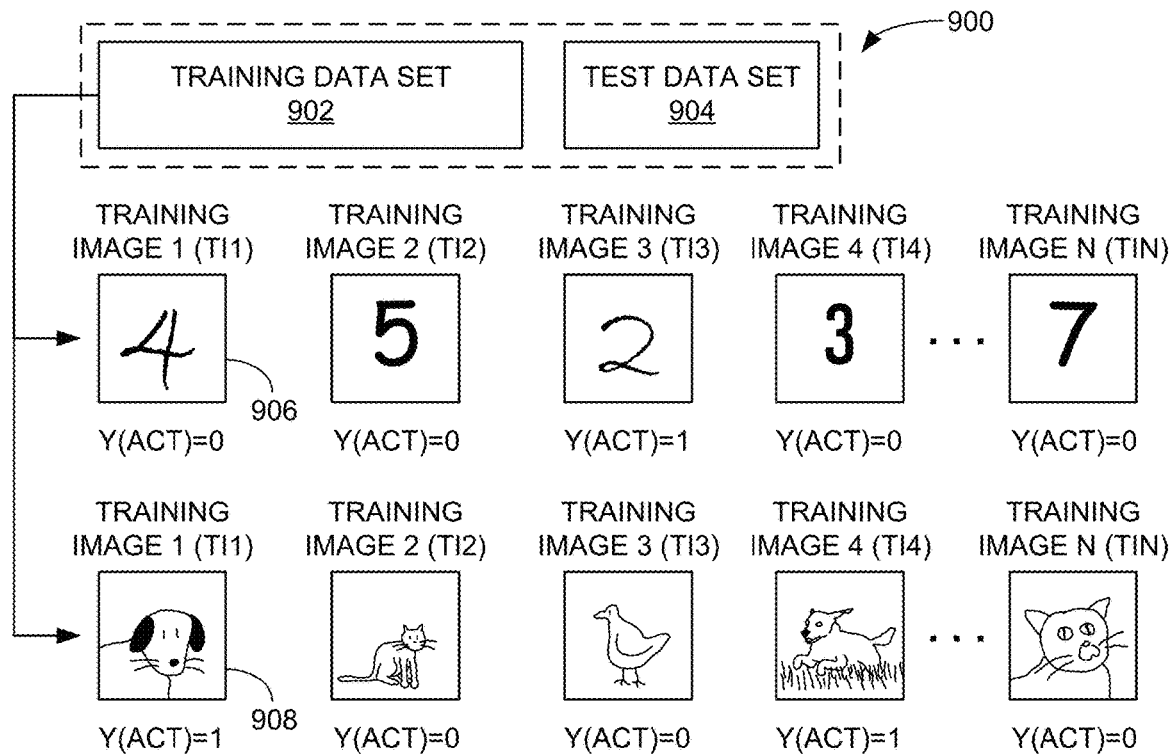
FIG. 42 depicts an adaptive threshold prediction (ATP) data set constructed and used in accordance with further embodiments.

FIG. 42 shows another training data system 900 that can be used for implementation of another Enhanced Error Function (EFF) in accordance with various embodiments. This EEF uses a technique referred to herein as adaptive threshold prediction (ATP), in which a prediction threshold is selected adaptively during training based on the characteristics and response of the data set. A forcing function is used to migrate the respective outputs of the system, by training image, across the prediction threshold. An advantage of the ATP processing is the visualization capabilities of the system. It will be appreciated that the various aspects of the ATP processing can be incorporated into the visualization tool described above.

The training data system 900 includes a training data set 902 and a test data set 904. In this case, the IGL-ANN model (not separately shown) under consideration is being trained as a classifier. It will be appreciated that modifications can be made to the following discussion to accommodate other network operational configurations.

As mentioned previously, the training data set 902 includes some number X of training images, along with an indication as to the actual output Y(ACT) that is associated with that image. The test data set 904 is a separate set of some number Y of test images of the same type and character as the training data set. Training is carried out in a batch format using the training data set 902, and intermittent, as well as final testing, is carried out using the test data set 904. In some cases, the trained network never sees the final test data set 904 until the very end in order to provide a final error value for the trained data set.

Continuing with FIG. 42, the training data set 902 can include any number of different types of test images. Numeric images are represented at 906, which can correspond to the MNIST benchmark data set described previously, as well as other forms of handwriting data sets including the so-called enhanced MNIST, or EMNIST data set. The test images 906 are numeric characters from 0-9.

In this case, the network is being trained to detect the numeral "2". As such, the Y(ACT) values for every "2" image is set to 1, and the Y(ACT) values for every non-2 image is set to 0. In this example, there are a total of N training images 906, and N will be arbitrarily set to 2000 (e.g., the network is going to be trained on 2000 test images). The ratio of "correct" images (e.g., those with a Y(ACT) value of 1) as compared to "incorrect" images (e.g., those with Y(ACT)=0 will be approximately 1:10 or 10% of the entire set; that is, there are approximately 200 correct training images with the numeral "2" and the remaining approximately 1800 incorrect training images are the other digits 0-1 and 3-9. This ratio of correct to incorrect images will be important, as the prediction threshold is based on this ratio, among other factors.

FIG. 42 also has an alternative set of training images 908. In this second example, the training images 908 are images of various animals, and the network is alternatively being trained to detect images of dogs. Hence, the correct images are those such as training images 1 and 4, which illustrate dogs, and the remaining images shown in FIG. 42 are non-dogs, such as cats and birds. In this case, the ratio of correct to incorrect may be closer to 50% (e.g., about half the images are dogs and the remainder are not dogs). A different threshold will be selected for this data set, as will be addressed below.

Returning to the first set of training images 906 for the training data set 902, the training scheme is set up by initializing the network for batches of 2000 (e.g., all of the training images 906 will be examined during each batch run). As discussed previously herein, a smaller sample could be randomly selected each time, so this is merely illustrative and not limiting. At the end of each 10× batches, the test data set will be used to confirm the progress of the training effort. As before, other schemes can be used.

The ATP processing begins by designing the network to an appropriate size. This will depend on a number of factors, including the number of pixels in each training image, the number of duplications (mirroring) of the images and so on, as described before. To provide a concrete example, the network configuration from the table in FIG. 26A will be selected, with a total of 12,587 nodes distributed across 14 layers. Other configurations can be used.

Next, the parameters (W1, W2, B) are initially selected for each node. While a variety of different initialization schemes have been presented herein, the ATP processing uses a modified weighted sum approach in some embodiments. As such each node is initialized with settings for the weights of 0.55+/−V, where V represents some small amount of variation about the median value of 0.55. Without limitation, this variation can be, for example, in the range of from 0.0 to 0.03, so that the respective weights W1, W2 are clustered in the range of from 0.52 to 0.58. Gaussian white noise can be used so that more of the values still cluster around the median point of 0.55. The bias value B is similarly set to nominally 0+/−W, where W also represents some small amount of variation. The same variation of 0 to 0.03 can be used so that the B values for the nodes extend from −0.3 to +0.3. Other values can be used.

This spreading of the initialization values is helpful but is not required. All of the nodes could be given the same weighting (e.g., values such as 0.55, 0.55 and 0, etc.). Moreover, other initial values could be applied from the table of Boolean values set forth in FIG. 7. Nonetheless, a modified weighted sum approach has been found to be particularly suitable.

Once the nodes have been initialized, each of the training images TI1 through TI2000 are passed through the network and the output Y value, represented as Y(Predicted), is determined for each training image. This is graphically represented in FIG. 43A, which shows a scatter plot 910 of resulting Y(Predicted) output values (dots) 912. The x-axis shows the overall range for the Y(Predicted) output values from 0 to P (with P=1000 in this example), and the y-axis lists each of the training images.

Figure 43A:
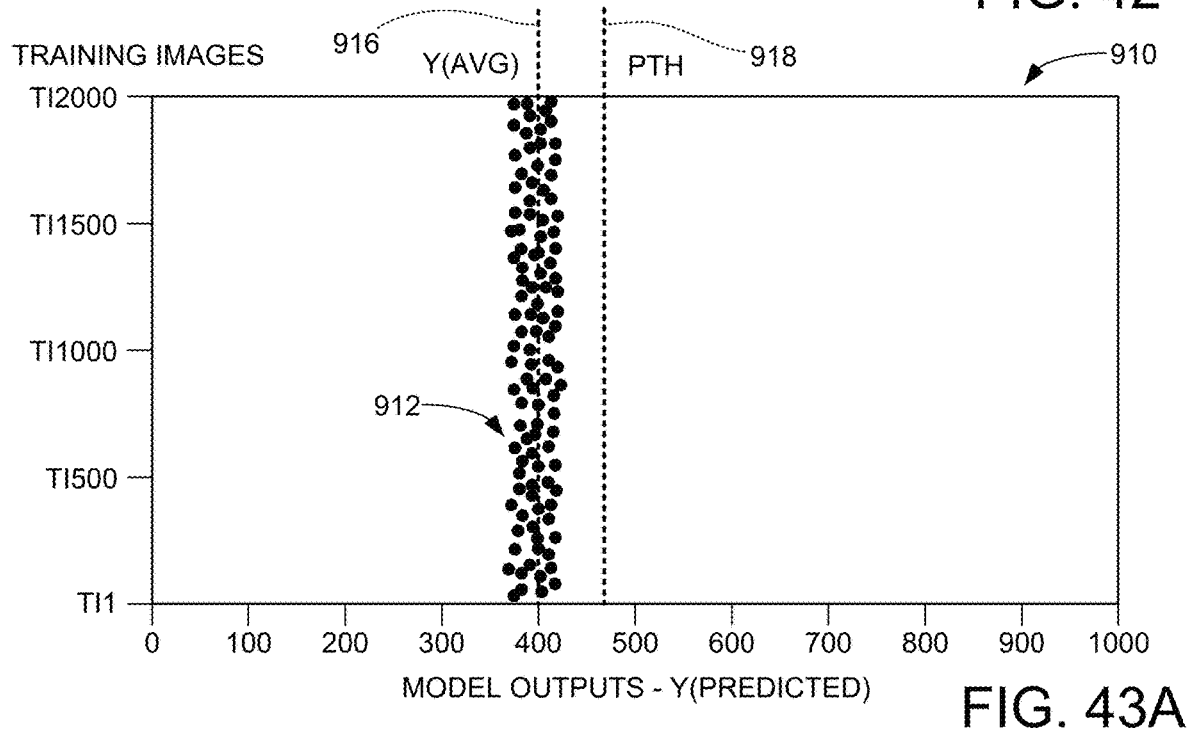
FIGS. 43A through 43C depict ongoing ATP processing using the data set from FIG. 42 in some embodiments.

Each dot 912 in FIG. 43A thus represents the output by the untrained network in response to the corresponding input training image. While 2000 training images are contemplated, less than that number of dots are shown in the simplified figure, for clarity of illustration. Of these "2000" dots, 200 will be "correct" dots and 1800 will be "incorrect" dots.

Because all of the nodes are arranged as modified weighted sum nodes with very similar parameters, a relatively narrow vertical band of outputs will be presented along the x-axis. In this case, the values are near the value Y(predicted)=400, but this is arbitrary; the resulting values have been found to appear at different locations, including positions both to the right and to the left of the position shown in FIG. 43A. This has no appreciable effect upon the operation of the ATP process.

A Y(Avg) value is calculated as the average of all of the outputs of the network by all 2000 training images. This average is represented by vertically extending, broken line 916.

A prediction threshold (PTH) is next calculated, as shown by PTH line 918. This PTH line can be empirically determined based on a number of factors, including the mix of correct to incorrect values within the training images. In this case, a PTH interval (Buffer) is set at about 60 increments, or about +6% of the overall interval from 0-1000 along the X axis, so the PTH is set equal to the sum of Y(Avg) and the Buffer value. Other values can be used, including lines to the left side of the dots 912 by subtracting the Buffer value from the Y(Avg). In this example, the Y(Avg) value is 400, the PTH is 460, and the Buffer is 60.

From a general conceptual standpoint, the training operation will involve migrating all of the correct dots to the left so as to cross the PTH line 918 while maintaining all of the incorrect dots on the right side of the PTH line 918. While all of the dots are shown to be the same color in FIG. 43A, the software visualization tool can assign different colors to the dots so that, for example, the migrating correct dots are red and the non-migrating incorrect dots are blue. It will be noted that the placement of the PTH to the right of the distribution means that 90% of the images are already correctly classified, since ultimately, outputs below the PTH value (e.g., Y(Predicted)<460) will be identified as "not-2" and outputs above the PTH value (e.g., Y(Predicted)>460) will be identified as "2" when the model is fully trained.

For other training data sets, such as the images 908 from FIG. 42 where about 50% of the training images are correct, the PTH line may be more appropriately placed closer to the Y(Avg) line, since about 50% of the images need to move across the line before the model is fully trained. In this case, the Buffer value would be set to zero or some other relatively small value. Other suitable Buffer values may represent 3%, 4%, 8%, or some other percentage of P.

The training of the system proceeds in a manner as described above (chain isolation optimization with random or step-wise selection of nodes for evaluation in successive batches, etc.). As before, a selected percentage of the nodes, such as 5% (or approximately 630 nodes out of the 12,587 nodes in the network) are selected in each batch, and updated error values are calculated at the end of each 10 batches.

Figure 43B:
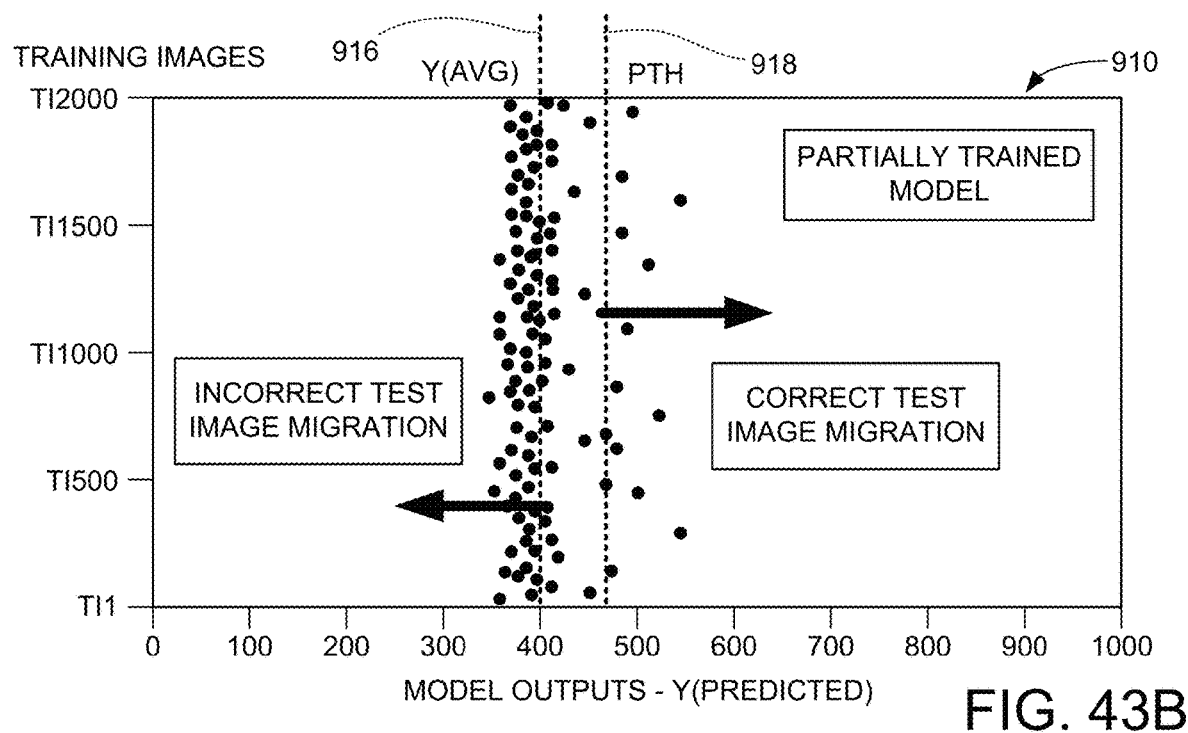

As the training proceeds, the correct dots will tend to migrate to the right across the PTH line 918 and the incorrect dots will tend stay in place on the left side of the PTH line. This is represented in FIG. 43B, which shows a partially trained model after some training batches have been completed.

Figure 43C:
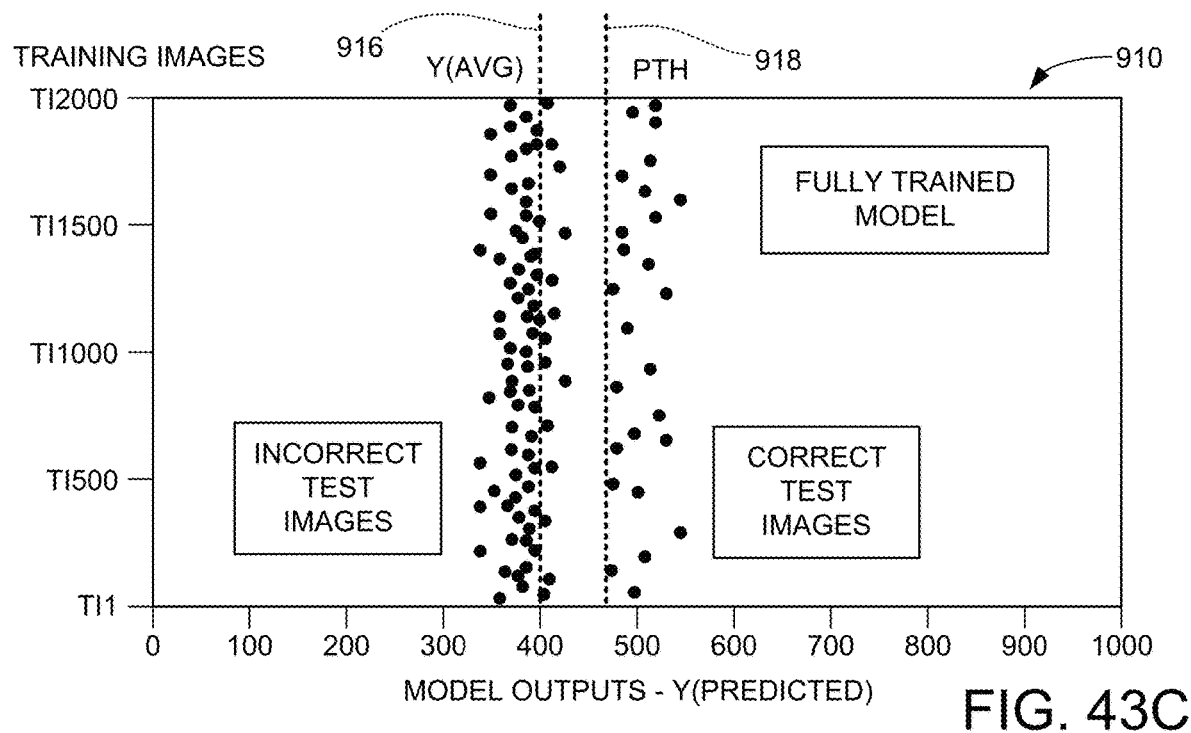

The finally trained model will exhibit a final state such as represented in FIG. 43C, with (ideally) all of the correct dots on the right side of the PTH line 918 and all of the incorrect dots on the left side of the PTH line. To the extent that the model does not exhibit 100% success (e.g., 0% error), some number of dots will be on the wrong side(s) of the PTH line (e.g., one or more blue dots will have crossed the line or one or more red dots will still be in the main bulk of dots on the left side of the line).

It is not necessary that the values be driven to the extreme ends of the graph. Rather, it is better that the fully trained model exhibits dots that are clustered near the opposing sides of the PTH line 918. An enhanced error function (EEF) to process the outputs of each tested node can be defined as follows:

For Incorrect Training Images ($Y(Act)=0$), (15)

If $Y(Predicted) < PTH - Buffer$

Error=0

Else

Error=$((Y(Predicted)-PTH+Buffer)(P))^N$

Where N is some positive exponent such as N=1.2. This function forces the output for incorrect training images to the left, as represented by curve 920 in FIG. 44, but does not continue to advance the output response for these samples substantially once the output values are left of the Y(AVG) line 916. Correct training images are handled as follows:

For Correct Training Images ($Y(Act)=1$), (16)

If $Y(Predicted) > PTH + Buffer$

Error=0

Else

Error=$(PTH-Y(Predicted)+Buffer)(P))^N$

Figure 44:
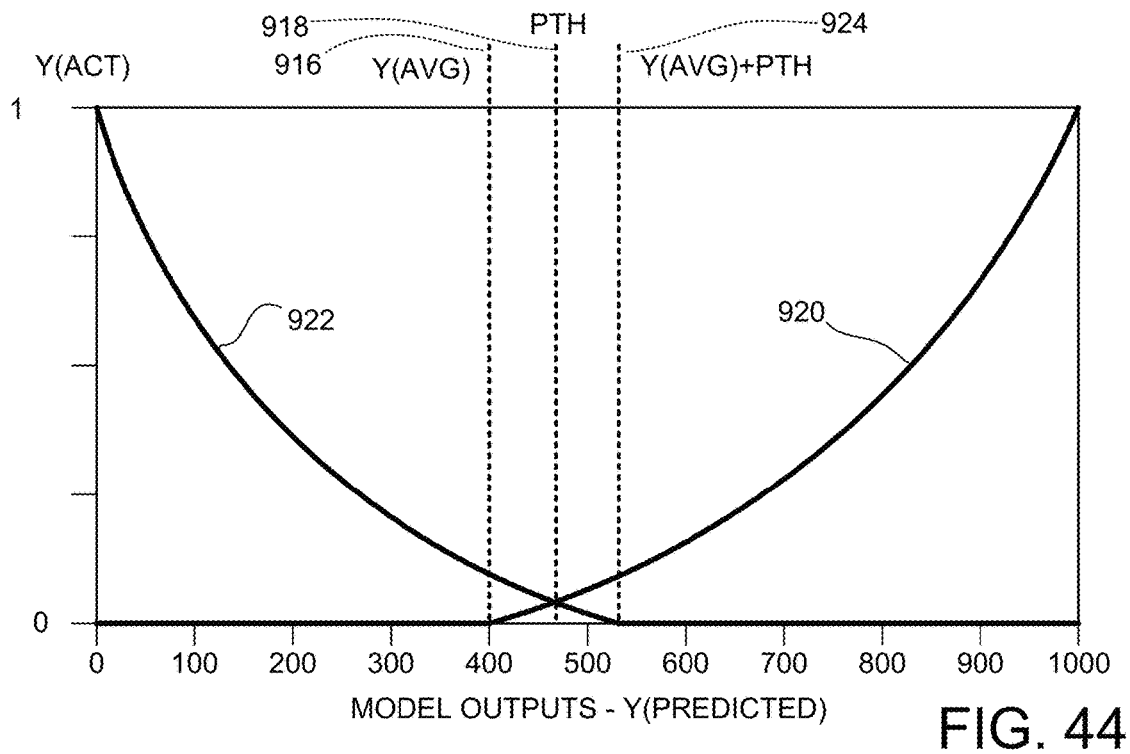
FIG. 44 graphically depicts respective enhanced error functions (EEF) used in accordance with some embodiments to migrate the respective outputs in FIGS. 43A-43C.

This function is represented by curve 922 in FIG. 44, and forces the output for correct training images past the PTH line 918 to line Y(AVG)+PTH 924, but does not continue to substantially advance the output response for these images beyond this level. Thereafter, the PTH line 918 is used as a threshold for the fully trained model. If the output of the model is above the PTH (e.g., 460), then the output is 1, otherwise, the output is 0.

This ATP processing as an enhanced error forcing function has demonstrated significantly low error rates approaching and even reaching 0% on a variety of data sets, including data sets with significant amounts of noise. The visualization provided during the ATP processing allows the ML designer to observe the behavior of the network, including which training or test samples are providing the most contribution to the remaining error and how the outputs for these samples migrate over time.

Figure 45:
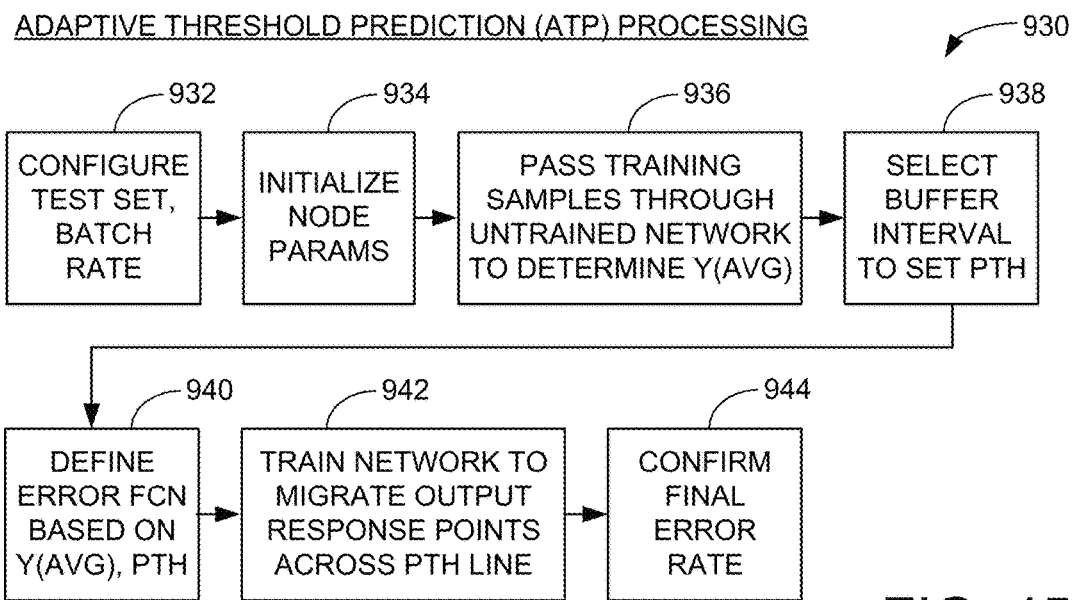
FIG. 45 is a sequence diagram to illustrate the ATP processing of FIGS. 42-44 in further embodiments.

The ATP processing can be summarized by sequence 930 in FIG. 45. The initial test data set (e.g., set 900 in FIG. 42) is identified and configured for batch testing at block 932. Included in this analysis will be a determination of which test samples (images or otherwise) are correct and which are incorrect, and the associated ratio therebetween.

At block 934, the network is initially configured based on the size of the input layer, and each of the nodes are initialized to some selected range of values. As noted previously, a modified weighted sum with Gaussian noise is particularly suitable but is not limiting. The training samples are passed through the untrained network at block 936 to determine an initial output response distribution having an average output value Y(Avg) (see line 916).

At block 938, a buffer interval (Buffer value) is selected based on the distribution of output response values, the percentage of correct samples within the entire population of training samples, and potentially other factors. In some cases, the buffer interval may be some selected percentage of P such as 3% to 8% in order to empirically evaluate different thresholds. The prediction threshold (PTH) is set as the sum of the output average Y(Avg) and the Buffer value (line 918).

An appropriate enhanced error function (EEF) is next selected at block 940 based on the foregoing values. Example functions are provided above in equations (15)-(16) and graphically represented in FIG. 44, although other configurations may be used as desired.

At this point, the network is ready for training, which commences at block 942. During this training, batches of the training samples are presented and adjustments made to individual nodes using chain isolation optimization techniques. Progress of the training is monitored via migration of the output response values across the PTH line, as in FIGS. 43A-C.

Once the training has completed, a final error rate may be determined at block 944 using a test data set made up of test samples. To the extent that further training is required, various techniques disclosed hereinabove may be applied (e.g., curve points, etc.), and the results graphically observed to provide insight into areas requiring adjustment. These same techniques can be employed during subsequent investigation into hallucinations or other sub-optimal model performance.

Expansion Layers

As noted previously, a standard 2-to-1 input/output interconnection architecture is used in for most, but not necessarily all, of the IGL-ANN node interconnections disclosed herein. Rather, localized convolution filters and fully interconnected layers (FILs) have been discussed above which provide more interconnections in a downstream layer beyond just a 2:1 interconnection ratio from one layer to the next. Nevertheless, even if localized convolution filters and/or localized FILs are inserted into the network, these techniques still provide a chain of nodes subjected to chain isolation optimization, with the caveat of additional calculations or table access operations to account for the additional nodes interconnected along the single chain path to the output node.

Another alternative interconnection architecture is contemplated where it may be advantageous to expand the number of nodes in a downstream layer, but not to the level of providing an FIL. This technique provides a so-called "expansion" layer, or "trumpet" layer, in that a localized increase in the number of interconnections are made from one layer to the next.

FIG. 46 illustrates an IGL-ANN 950 having an input layer 952, one or more upstream normally connected layers 954, an expansion layer 956, one or more downstream normally connected layers 958, and an output layer 960. FIG. 47 shows aspects of the network 950 in greater detail.

In FIG. 47, a selected normally connected node (NCN) 962 is within one of the upstream normally connected layers 954 from FIG. 46. An output switch (SW) 964 distributes the output from NCN 962 to multiple expansion nodes (EN) 966 in the expansion layer 956. In this example, the single output from NCN 962 is distributed to four (4) ENs 966, but other numbers of interconnections can be made. While not shown in FIG. 47, each EN 966 also receives another input from some other node or switch in the upstream layer 954.

The output from each EN 966 is connected as before to an associated NCN 968 in the next downstream normally connected layer 958, and these layers continue to connect in a 2-to-1 manner to downstream NCNs such as 970.

A single chain isolation path 972 extends from the upstream NCN 962 to the associated output Y node or nodes (not shown) in the output layer 960 (FIG. 46) as before. However, in the vicinity of the expansion layer 956, the single chain isolation path 972 encounters four parallel segments (subpaths) 972A, 972B, 972C and 972D, before combining back into a serial chain from NCN 970 forward. As with the FILS, the chain isolation optimization carried out by adjustments to NCN 962 (as well as any upstream nodes connected to NCN 962) will separately calculate the forward Y output responses along each of these subpaths.

An expansion layer such as 956 can be used as required at substantially any location within the network 950 to evaluate non-adjacent data points/streams from the input data. In some cases, random assignments of downstream interconnections can be made for both normally connected layers and expansion layers.

Input Layer Configuration

The use of normally connected 2-to-1 layers provides rapid conversion of node counts from the input layer to the output layer. Generally, this rate of convergence will be a geometric reduction by 50% in one dimension as shown in the table of FIG. 26A.

Another technique that can be used to increase the node count in a given network is to increase the number of inputs in the input layer, such as by providing an M×N array of the input images as a series of duplicates, such as discussed in the example of FIGS. 26A-C. Since the MNIST data samples are images of 28×28 pixels, the input layer 1 in FIG. 26C has a size of 112×56 images by duplicating each input 28×28 image in a 4×2 array.

In practice, any number of M×N samples can be arranged as adjacent duplicates in the input layer. The repeated images can all be identical, or pre-processing can be applied to the input samples including scaling, rotation, shifting, and data inversion.

FIG. 48A shows a 2×2 input layer configuration 980 where an initial image is presented four (4) times to the associated network. In this example, the base image is represented at 982 in the top left-hand corner. A smaller scaled image 984 (top right-hand corner), a rotated image 986 (bottom left-hand corner), and a shifted image 988 (bottom right-hand corner) are additionally provided. These pre-processing adjustments can be carried out in software and applied to each training, test and subsequent operational sample supplied to the network. The amounts of adjustment can be randomly or empirically selected.

FIG. 48B shows a second input layer configuration 990 with standard images 992 alternated with mirrored, or inverse images 994 that are subjected to a data inversion process. The inverted images 994 can be determined in a number of ways. One approach for the data inversion involves taking each input value for each pixel (or other data unit in the test sample) and inverting the relative intensity of this value by subtract the value from the selected P value for the network. In this way, a grey scale image with values of from 0 (black) to 255 (white) can be scaled so that the previously darker images are now lighter and vice versa. Other data inversions can be carried out (e.g., RGB data can be separately converted It has been found that these and other pre-processing adjustments to the various images can provide significant improvements in the training of an IGL-ANN, since the network is forced to train on the actual characteristics of the samples and not merely memorize the locations of the various elements being detected (or memorize the noise in the system).

CONCLUSION

The various embodiments as presented herein provide a number of benefits over the existing art. A specially configured IGL-ANN section can wholly eliminate the need for backpropagation and other gradient based training approaches. The use of chain isolation optimization techniques allows the effects of parametric adjustments to a single node be quickly evaluated with regard to the effect on the overall loss function of the network.

The specially configured LLO activation function, which may be non-differentiable, provides significant flexibility in modeling various Boolean functions, including difficult to model functions such as XOR, NAND, NOR, etc. as well as analog near-Boolean functions. The elimination of the need for floating point gate calculations and precision selection further reduce or eliminate the risk of vanishing gradients and saturation during the training process. In some cases, substantially all node calculations can be predetermined and stored in look up tables, allowing a fully table-based training and operational mode. It has been found that the various embodiments can provide superior performance to designs of the existing art both in terms of performance (in some cases, many orders of magnitude faster), processor utilization, energy consumption and cost.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A computerized method, comprising:
arranging an Artificial Neural Network (ANN) in a memory of a computer circuit comprising one or more programmable processors, the ANN comprising interconnected nodes arranged into an input layer, an output layer and at least one intervening hidden layer, each node having initial parameter values stored in the memory and a non-differentiable activation function configured to generate a node output value responsive to the initial parameter values and a plurality of node input values supplied to the node;

applying input data to the input layer;

storing, in the memory, the node input values, the node output values, and a loss function value at the output layer responsive to the applied input data;

choosing a selected node;

identifying a set of downstream nodes that are interconnected along a single chain path from the selected node to the output layer;

retrieving from the memory initial parameter values associated with the selected node;

adjusting the initial parameter values of the selected node to generate adjusted parameter values;

determining a new node output value for the selected node responsive to the adjusted parameter values and the stored node input values for the selected node;

generating an updated loss function value at the output layer by determining new node update values for the set of downstream nodes based on the new node output value for the selected node using chain isolation optimization without backpropagation; and comparing the updated loss function value to the loss function value to determine whether the adjusted parameter values generate reduced error by the ANN, and if so, replacing the initial parameter values with the adjusted parameter values in the memory for subsequent use by the selected node.

2. The method of claim 1, wherein the new node output value for the selected node is determined responsive to a calculation of a weighted sum of the stored node input values using the adjusted parameter values and responsive to an application of the calculated weighted sum to a linear logic output activation function, wherein the calculation of the weighted sum is carried out using an integer function with resolution from 0 to P, and wherein P is an integer of from 1000 to 1,000,000.

3. The method of claim 2, further comprising a prior step of pre-calculating and storing, in a set of look up tables in the memory, the calculated weighted sum for every combination of the adjusted parameter values and the stored node input values, wherein the determining step comprises accessing the set of look up tables to determine the new node output value without performing a separate mathematical operation to calculate the weighted sum.

4. The method of claim 1, wherein the selected node and each of the set of downstream nodes along the single chain path has a total of two inputs and one output.

5. The method of claim 1, wherein at least one of the downstream nodes comprises a node disposed in a selected one of a convolutional filter layer, a fully interconnected layer, or an expanded layer.

6. The method of claim 1, wherein the updated loss function is generated by steps comprising:

feeding forward the new node output value of the selected node to each set of downstream nodes along a single path to the output layer to generate a set of updated node output values for the downstream nodes; and recalculating the updated loss function by combining the new mode output value, the set of updated node output values, and a remaining portion of the stored node input values for remaining nodes not coupled to the selected node.

7. The method of claim 1, wherein the selected node is chosen randomly from among the input layer or the at least one hidden layer.

8. The method of claim 1, wherein the selected node is a first node, and the choosing, adjusting, determining and generating steps are repeated for each of a population of additional nodes in the input layer and the at least one hidden layer.

9. The method of claim 8, wherein the population of additional nodes comprises no more than 5% of all of the nodes in the ANN.

10. The method of claim 1, wherein the initial parameter values of each node comprise weight and bias values which are combined with the stored node input values for the selected node.

11. The method of claim 1, further comprising steps of:

storing, in the memory, a snapshot of the parameter values for each of the nodes in the ANN;

monitoring changes in the loss function value at the output layer responsive to a succession of additionally applied input data to the input layer; and resetting the ANN by replacing then-existing parameter values in each of the nodes in the ANN with the parameter values in the snapshot responsive to the monitored changes in the loss function value exceeding a predetermined ratcheting threshold value.

12. The method of claim 11, further comprising generating a plurality of additional snapshots of the parameter values for each of the nodes in the ANN and resetting the ANN using the plurality of additional snapshots to provide ratcheted improvements in a magnitude of the loss function value.

13. An apparatus comprising:

one or more programmable processors having a memory in which an Artificial Neural Network (ANN) is stored, the ANN comprising interconnected nodes arranged into an input layer, an output layer and at least one intervening hidden layer, each node configured with a non-differentiable activation function configured to emulate each of a plurality of different Boolean logic functions responsive to different parameter values stored in the memory to generate a node output value responsive to a plurality of node input values supplied to the node; and an ANN training circuit comprising one or more programmable processors configured to train the ANN by applying input data to the input layer of the ANN, storing the node input values and the node output values for each of the nodes and a loss function value at the output layer in the memory responsive to the applied input data, choosing a selected node from among the input layer or the at least one intervening hidden layer, retrieving initial parameter values associated with the selected node, adjusting the initial parameter values of the selected node to generate adjusted parameter values for the selected node, determining a new node output value for the selected node responsive to the adjusted parameter values and the stored node input values, generating an updated loss function value at the output layer responsive to the stored node input values and the new output value of the selected node by determining new node update values for the set of downstream nodes based on the new node output value for the selected node using chain isolation optimization without backpropagation, comparing the updated loss function value to the loss function value to determine a difference therebetween, discarding the adjusted parameter values for the selected node responsive to the difference having a magnitude less than a selected threshold, and replacing the initial parameter values with the adjusted parameter values responsive to the difference having a magnitude greater than the selected threshold.

14. The apparatus of claim 13, wherein the ANN is realized in a hardware integrated circuit device.

15. The apparatus of claim 13, characterized as at least one programmable processor which executes program instructions in a memory to implement the ANN and the ANN training circuit in the memory.

16. The apparatus of claim 13, wherein the new node output value for the selected node is determined responsive to a calculation of a weighted sum of the stored node input values using the adjusted parameter values, and responsive to an application of the calculated weighted sum to a linear logic output activation function, wherein the linear logic output activation function is non-differentiable.

17. The apparatus of claim 16, wherein the ANN training circuit comprises a control circuit which precalculates and stores, in a set of look up tables in the memory, the calculated weighted sum for every combination of the adjusted parameter values and the stored node input values, wherein the control circuit is configured to access the set of look up tables to determine the new node output value without performing a separate mathematical operation to calculate the weighted sum.

18. The apparatus of claim 13, wherein the ANN training circuit is further configured to generate the updated loss function value by feeding forward the new node output value of the selected node to each of a succession of downstream nodes along the single chain path to the output layer to generate a set of updated node output values for the downstream nodes, and by recalculating the updated loss function by combining the new mode output value, the set of updated node output values, and a remaining portion of the stored node input values for remaining nodes not coupled to the selected node.

19. The apparatus of claim 13, wherein the ANN training circuit generates an adaptive threshold prediction (ATP) threshold based on an average of the node output values responsive to the input data and a buffer interval, and wherein the ANN training circuit determines the loss function value responsive to the ATP threshold.

20. The apparatus of claim 13, wherein the ANN training circuit configures the input layer to provide an array of M×N duplicates of the input data and to apply pre-processing to at least one of the duplicates comprising scaling, rotation, displacement or data intensity inversion.

* * * * *